United States Patent
Kim et al.

(10) Patent No.: US 10,344,129 B2
(45) Date of Patent: Jul. 9, 2019

(54) METHODS AND SYSTEMS FOR GENERATING AQUEOUS POLYMER SOLUTIONS

(71) Applicant: Chevron U.S.A. Inc., San Ramon, CA (US)

(72) Inventors: Do Hoon Kim, Katy, TX (US); Dennis A. Alexis, Richmond, TX (US); Varadarajan Dwarakanath, Houston, TX (US); David R. Espinosa, Houston, TX (US); Taimur Malik, Houston, TX (US); Peter G. New, Aberdeen (GB); Adam C. Jackson, Aberdeen (GB); Christopher Michael Niemi, Aberdeen (GB)

(73) Assignee: Chevron U.S.A. Inc., San Ramon, CA (US)

( * ) Notice: Subject to any disclaimer, the term of this patent is extended or adjusted under 35 U.S.C. 154(b) by 3 days.

(21) Appl. No.: 15/835,020

(22) Filed: Dec. 7, 2017

(65) Prior Publication Data

US 2018/0155505 A1   Jun. 7, 2018

Related U.S. Application Data

(60) Provisional application No. 62/431,255, filed on Dec. 7, 2016.

(51) Int. Cl.
   *C09K 8/588* (2006.01)
   *C08J 3/00* (2006.01)
   (Continued)

(52) U.S. Cl.
   CPC .............. *C08J 3/005* (2013.01); *C09K 8/588* (2013.01); *E21B 43/16* (2013.01); *C08J 2300/00* (2013.01); *E21B 43/26* (2013.01)

(58) Field of Classification Search
   CPC ................. C09K 8/588; E21B 43/16
   (Continued)

(56) References Cited

U.S. PATENT DOCUMENTS

| | | | |
|---|---|---|---|
| 3,734,873 A | 5/1973 | Anderson et al. | |
| 3,893,510 A * | 7/1975 | Elphingstone | C09K 8/502 166/275 |

(Continued)

FOREIGN PATENT DOCUMENTS

| | | |
|---|---|---|
| CA | 832277 A | 1/1970 |
| DE | 2419764 A1 | 12/1975 |

(Continued)

OTHER PUBLICATIONS

International Search Report and Written Opinion issued in Application No. PCT/US16/65421, dated Feb. 16, 2017.
(Continued)

*Primary Examiner* — William D Hutton, Jr.
*Assistant Examiner* — Ashish K Varma
(74) *Attorney, Agent, or Firm* — Meunier Carlin & Curfman LLC

(57) ABSTRACT

Provided herein are liquid polymer (LP) compositions comprising a synthetic (co)polymer (e.g., an acrylamide (co)polymer), as well as methods for preparing aqueous polymer solutions by combining these LP compositions with an aqueous fluid. The resulting aqueous polymer solutions can have a concentration of a synthetic (co)polymer (e.g., an acrylamide (co)polymer) of from 50 to 15,000 ppm, and a filter ratio of 1.5 or less at 15 psi using a 1.2 μm filter. Also provided are methods of using these aqueous polymer solutions in oil and gas operations, including enhanced oil recovery.

21 Claims, 28 Drawing Sheets

(51) Int. Cl.
*E21B 43/16* (2006.01)
*E21B 43/26* (2006.01)

(58) Field of Classification Search
USPC ..................................................... 166/305.1
See application file for complete search history.

(56) References Cited

U.S. PATENT DOCUMENTS

| | | | |
|---|---|---|---|
| 4,034,809 A | 7/1977 | Phillips et al. | |
| 4,052,353 A | 10/1977 | Scanley et al. | |
| 4,331,787 A | 5/1982 | Fairchok et al. | |
| 4,439,332 A | 3/1984 | Frank et al. | |
| 4,473,689 A | 9/1984 | Login et al. | |
| 4,528,321 A | 7/1985 | Allen et al. | |
| 4,622,356 A | 11/1986 | Jarovitzky et al. | |
| 5,067,508 A | 11/1991 | Lee et al. | |
| 5,190,374 A | 3/1993 | Harms et al. | |
| 6,365,656 B1 | 4/2002 | Green et al. | |
| 6,833,406 B1 | 12/2004 | Green et al. | |
| 7,595,284 B2 | 9/2009 | Crews | |
| 7,770,641 B2 | 8/2010 | Dwarakanath et al. | |
| 7,939,472 B2 | 5/2011 | Crews | |
| 8,357,724 B2 | 1/2013 | Deroo et al. | |
| 8,360,152 B2 | 1/2013 | DeFosse et al. | |
| 8,383,560 B2 | 2/2013 | Pich et al. | |
| 8,865,632 B1* | 10/2014 | Parnell .................. | C09K 8/604 507/224 |
| 8,946,132 B2 | 2/2015 | Chang et al. | |
| 8,973,668 B2 | 3/2015 | Sanders et al. | |
| 9,580,639 B2 | 2/2017 | Chang et al. | |
| 9,988,571 B2 | 6/2018 | Salazar et al. | |
| 2005/0239957 A1 | 10/2005 | Pillsbury et al. | |
| 2007/0012447 A1* | 1/2007 | Fang ....................... | C09K 8/20 166/291 |
| 2008/0045422 A1* | 2/2008 | Hanes ..................... | C09K 8/68 507/224 |
| 2011/0118153 A1 | 5/2011 | Pich et al. | |
| 2011/0151517 A1 | 6/2011 | Therre et al. | |
| 2012/0071316 A1 | 3/2012 | Voss et al. | |
| 2013/0197108 A1 | 8/2013 | Koczo et al. | |
| 2014/0024731 A1 | 1/2014 | Blanc et al. | |
| 2014/0221549 A1 | 8/2014 | Webster et al. | |
| 2014/0287967 A1* | 9/2014 | Favero ..................... | C09K 8/12 507/120 |
| 2014/0326457 A1 | 11/2014 | Favero | |
| 2015/0197439 A1 | 7/2015 | Zou et al. | |
| 2015/0376998 A1 | 12/2015 | Dean et al. | |
| 2016/0122622 A1 | 5/2016 | Dwarakanath et al. | |
| 2016/0122623 A1 | 5/2016 | Dwarakanath et al. | |
| 2016/0122624 A1 | 5/2016 | Dwarakanath et al. | |
| 2016/0122626 A1 | 5/2016 | Dwarakanath et al. | |
| 2016/0289526 A1 | 10/2016 | Alwattari et al. | |
| 2017/0037299 A1 | 2/2017 | Li et al. | |
| 2017/0121588 A1 | 5/2017 | Chang et al. | |
| 2017/0158947 A1 | 6/2017 | Kim et al. | |
| 2017/0158948 A1 | 6/2017 | Kim et al. | |
| 2017/0321111 A1 | 11/2017 | Velez et al. | |

FOREIGN PATENT DOCUMENTS

| | | |
|---|---|---|
| GB | 1384470 A | 2/1975 |
| WO | 2009053029 A1 | 4/2009 |
| WO | 2012069438 A1 | 5/2012 |
| WO | 2012069477 A1 | 5/2012 |
| WO | 2012136613 A1 | 10/2012 |
| WO | 2012170373 A2 | 12/2012 |
| WO | 2013108173 A1 | 7/2013 |
| WO | 2014075964 A1 | 5/2014 |
| WO | 2016030341 A1 | 3/2016 |
| WO | 2017100327 A1 | 6/2017 |
| WO | 2017100329 A1 | 6/2017 |
| WO | 2017100331 A1 | 6/2017 |
| WO | 2017121669 A1 | 7/2017 |
| WO | 2017177475 A1 | 10/2017 |
| WO | 2017177476 A1 | 10/2017 |
| WO | 2018045282 A1 | 8/2018 |

OTHER PUBLICATIONS

International Preliminary Report on Patentability issued in Application No. PCT/US16/65421, dated Jun. 21, 2018.
International Search Report and Written Opinion issued in Application No. PCT/US16/65391, dated Feb. 21, 2017.
International Search Report and Written Opinion issued in Application No. PCT/US16/65394, dated Feb. 6, 2017.
International Search Report and Written Opinion issued in Application No. PCT/US16/65397, dated Apr. 4, 2017.
Croda. Hypermer 2296-LQ-(MV), MSDS.
Koh, H. "Experimental Investigation of the Effect of Polymers on Residual Oil Saturation". Ph.D. Dissertation, University of Texas at Austin, 2015.
Levitt, D. "The Optimal Use of Enhanced Oil Recovery Polymers Under Hostile Conditions". Ph.D. Dissertation, University of Texas at Austin, 2009.
Liu "Experimental Evaluation of Surfactant Application to Improve Oil Recovery", Liu, Experimental Evaluation of Surfactant Application to Improve Oil Recovery, Dissertation. Univ of Kansas, 2011 [Retrieved from the internet on Jan. 16, 2016] kuscholarworks.ke. eduhandle/1808/8378; abstract; table 5.1; p. 40, para. 4; p. 46, para. 2, 2011, abstract; table 5.1; p. 40, para. 4; p. 46, para. 2.
Magbagbeola, O.A. "Quantification of the Viscoelastic Behavior of High Molecular Weight Polymers used for Chemical Enhanced Oil Recovery". M.S. Thesis, University of Texas at Austin, 2008.
"Petroleum, Enhanced Oil Recovery," Kirk-Othmer, Encyclopedia of Chemical Technology, 2005, John Wiley and Sons, vol. 18, pp. 1-29.
Dwarakanath et al. "Permeability reduction due to use of liquid polymers and development of remediation options". SPE 179657, Society of Petroleum Engineers, SPE Improved Oil Recovery Conference, Apr. 11-13, Tulsa, Oklahoma, USA, 2016.
Hibbert et al. "Effect of mixing energy levels during batch mixing of cement slurries." SPE 25147-PA, Society of Petroleum Engineers, SPE Drilling & Completion, Mar. 1995, 10(01), 49-52.
Orban et al. "Specific mixing energy: a key factr for cement slurry quality." SPE-15578, Society of Petroleum Engineers, SPE Annual Technical Conference and Exhibition, Oct. 5-8, New Orleans, Louisiana, USA, 1986.
International Search Report and Written Opinion issued in Application No. PCT/US2017/065106, dated Feb. 13, 2018.

* cited by examiner

METHODS AND SYSTEMS FOR GENERATING AQUEOUS POLYMER SOLUTIONS

CROSS REFERENCE TO RELATED APPLICATIONS

This application claims benefit of U.S. Provisional Patent Application No. 62/431,255, filed Dec. 7, 2016, which is hereby incorporated herein by reference in its entirety.

BACKGROUND

Water-soluble polymers, such as polyacrylamide and copolymers of acrylamide with other monomers, are known to exhibit superior thickening properties when said polymers are dissolved in aqueous media. Particularly well-known for this purpose are the anionic carboxamide polymers such as acrylamide/acrylic acid copolymers, including those prepared by hydrolysis of polyacrylamide. Such polymers can be used as fluid mobility control agents in enhanced oil recovery (EOR) processes.

In the past, these polymers were made available commercially as powders or finely divided solids which were subsequently dissolved in an aqueous medium at their time of use. Because such dissolution steps are sometimes time consuming and often require rather expensive mixing equipment, such polymers are sometimes provided in water-in-oil emulsions wherein the polymer is dissolved in the dispersed aqueous phase. The water-in-oil emulsions can then be inverted to form oil-in-water emulsions at their time of use. Unfortunately for many applications, existing water-in-oil emulsions do not invert as readily as desired. Furthermore, the resulting inverted emulsions are often unable to pass through porous structures. This significantly limits their utility as, for example, fluid mobility control agents in EOR applications. In addition, existing water-in-oil emulsions often cannot be efficiently inverted using an aqueous medium containing dissolved salts, as is often the case for enhanced oil recovery practices.

Accordingly, improved methods for preparing aqueous polymer solutions are needed.

SUMMARY

Provided herein are methods for preparing aqueous polymer solutions. Methods for preparing aqueous polymer solutions can comprise combining a liquid polymer (LP) composition comprising one or more synthetic (co)polymers (e.g., one or more acrylamide (co)polymers) with an aqueous fluid in a single stage mixing process to provide an aqueous polymer solution having a concentration of one or more synthetic (co)polymers (e.g., one or more acrylamide (co)polymers) of from 50 to 15,000 ppm. The single stage mixing process can comprise applying a specific mixing energy of at least 0.10 kJ/kg (e.g., a specific mixing energy of from 0.10 kJ/kg to 1.50 kJ/kg, a specific mixing energy of from 0.15 kJ/kg to 1.40 kJ/kg, a specific mixing energy of from 0.15 kJ/kg to 1.20 kJ/kg) to the LP composition and the aqueous fluid. The resulting aqueous polymer solutions can exhibit a filter ratio of 1.5 or less (e.g., a filter ratio of 1.2, a filter ratio of 1.2 or less, and/or a filter ratio of from 1.1 to 1.3) at 15 psi using a 1.2 μm filter.

The LP composition can comprise a variety of suitable LP compositions. In some examples, the LP composition can comprises one or more hydrophobic liquids having a boiling point at least 100° C.; at least 39% by weight of the one or more synthetic (co)polymers; one or more emulsifier surfactants; and one or more inverting surfactants. In other examples, the LP composition can be in the form of an inverse emulsion comprising one or more hydrophobic liquids having a boiling point at least 100° C.; up to 38% by weight of one or more synthetic (co)polymers; one or more emulsifier surfactants; and one or more inverting surfactants. In still other examples, the LP composition can comprise a substantially anhydrous polymer suspension comprising a powder polymer having an average molecular weight of from 0.5 to 30 million Daltons suspended in a carrier having an HLB of greater than or equal to 8. In these embodiments, the carrier can comprise one or more surfactants. In these embodiments, the powder polymer and the carrier can be present in the substantially anhydrous polymer suspension at a weight ratio of from 20:80 to 80:20.

In some embodiments, the single stage mixing process can comprise a single mixing step. The single mixing step can comprise, for example, passing the LP polymer composition and the aqueous fluid through an in-line mixer having a mixer inlet and a mixer outlet to provide the aqueous polymer solution. The in-line mixer can be a static mixer or a dynamic mixer (e.g., an electrical submersible pump, a hydraulic submersible pump, or a progressive cavity pump). The in-line mixer can be positioned on the surface, subsurface, subsea, or downhole.

In other embodiments, the single stage mixing process can comprise a multiple mixing step. For example, in some cases, the single stage mixing process can comprise as a first mixing step, passing the LP polymer composition and the aqueous fluid through a first in-line mixer having a first mixer inlet and a first mixer outlet to provide a partially mixed aqueous polymer solution; and as a second step, passing the partially mixed aqueous polymer solution through a second in-line mixer having a second mixer inlet and a second mixer outlet to provide the aqueous polymer solution. The first in-line mixer and the second in-line mixer can each individually be a static mixer or a dynamic mixer (e.g., an electrical submersible pump, a hydraulic submersible pump, or a progressive cavity pump). In some cases, the first in-line mixer can comprise a dynamic mixer and the second in-line mixer can comprise a static mixer. In some cases, the first in-line mixer can comprise a static mixer and the second in-line mixer can comprise a dynamic mixer. In other cases, both the first in-line mixer and the second in-line mixer can comprise a dynamic mixer.

In other embodiments, the single stage mixing process can comprise parallel single mixing steps. The parallel single mixing steps can comprise combining the LP composition with an aqueous fluid in a polymer mixing system. In certain embodiments, the polymer mixing system can be positioned subsea. The polymer mixing system can comprise a main polymer feed line diverging to a plurality of polymer supply branches, a main aqueous feed line diverging to a plurality of aqueous supply branches, and a plurality of mixer arrangements, each of which comprises an in-line mixer having a mixer inlet and a mixer outlet. Each of the plurality of mixer arrangements in the polymer mixing system is supplied by one of the plurality of polymer supply branches and one of the plurality of aqueous supply branches. In some variations, the main polymer feed can be fluidly connected to the plurality of polymer supply branches via a polymer distribution manifold. Optionally, the polymer distribution manifold can independently control the fluid flow rate through each of the plurality of polymer supply branches.

Optionally, the mixing system can further comprise a flow control valve operably coupled to each the plurality of polymer supply branches to control fluid flow rate through each of the plurality of polymer supply branches. Optionally, the mixing system can further comprise a flow control valve operably coupled to each the plurality of aqueous supply branches to control fluid flow rate through each of the plurality of aqueous supply branches. In certain embodiments, the mixing system can further comprise a flow control valve operably coupled to each the plurality of polymer supply branches to control fluid flow rate through each of the plurality of polymer supply branches, and a flow control valve operably coupled to each the plurality of aqueous supply branches to control fluid flow rate through each of the plurality of aqueous supply branches. Examples of suitable flow control valves include, for example, choke valves, chemical injection metering valves (CIMVs), and control valves.

The LP composition and the aqueous fluid can be combined in the polymer mixing system by passing the LP polymer composition through the main polymer feed line and the plurality of polymer supply branches to reach each of the plurality of mixer arrangements. The LP polymer composition and the aqueous fluid can then flow through the in-line mixer of each of the plurality of mixer arrangements to provide a stream of the aqueous polymer solution.

In other embodiments, the single stage mixing process can comprise parallel multiple mixing steps. The parallel multiple mixing steps can comprise combining the LP composition with an aqueous fluid in a polymer mixing system. In certain embodiments, the polymer mixing system can be positioned subsea. The polymer mixing system can comprise a main polymer feed line diverging to a plurality of polymer supply branches, a main aqueous feed line diverging to a plurality of aqueous supply branches, and a plurality of mixer arrangements. In some variants, the main polymer feed line can be fluidly connected to the plurality of polymer supply branches via a polymer distribution manifold. The polymer distribution manifold can be configured to independently control the fluid flow rate through each of the plurality of polymer supply branches. Each of the plurality of mixer arrangements in the mixing system is supplied by one of the plurality of polymer supply branches and one of the plurality of aqueous supply branches. Each of the plurality of mixer arrangements can comprise a first in-line mixer having a first mixer inlet and a first mixer outlet in series with a second in-line mixer having a second mixer inlet and a second mixer outlet.

Optionally, the mixing system can further comprise a flow control valve operably coupled to each the plurality of polymer supply branches to control fluid flow rate through each of the plurality of polymer supply branches. Optionally, the mixing system can further comprise a flow control valve operably coupled to each the plurality of aqueous supply branches to control fluid flow rate through each of the plurality of aqueous supply branches. In certain embodiments, the mixing system can further comprise a flow control valve operably coupled to each the plurality of polymer supply branches to control fluid flow rate through each of the plurality of polymer supply branches, and a flow control valve operably coupled to each the plurality of aqueous supply branches to control fluid flow rate through each of the plurality of aqueous supply branches. Examples of suitable flow control valves include, for example, choke valves, chemical injection metering valves (CIMVs), and control valves.

The LP composition and the aqueous fluid can be combined in the polymer mixing system by passing the LP polymer composition through the main polymer feed line and the plurality of polymer supply branches to reach each of the plurality of mixer arrangements. The LP polymer composition and the aqueous fluid can then flow through the through a first in-line mixer having a first mixer inlet and a first mixer outlet, emerging as a stream of partially mixed aqueous polymer solution. The partially mixed aqueous polymer solution can comprise a concentration of synthetic (co)copolymer of from 50 to 15,000 ppm (e.g., from 500 to 5000 ppm, or from 500 to 3000 ppm). The stream of partially mixed aqueous polymer solution can then pass through a second in-line mixer having a second mixer inlet and a second mixer outlet, emerging as a stream of aqueous polymer solution.

Also provided herein are method for hydrocarbon recovery. The methods for hydrocarbon recovery can comprise providing a subsurface reservoir containing hydrocarbons there within; providing a wellbore in fluid communication with the subsurface reservoir; preparing an aqueous polymer solution according to the methods described herein; and injecting the aqueous polymer solution through the wellbore into the subsurface reservoir. The wellbore in the second step can be an injection wellbore associated with an injection well, and the method can further comprise providing a production well spaced apart from the injection well a predetermined distance and having a production wellbore in fluid communication with the subsurface reservoir. In these embodiments, injection of the aqueous polymer solution can increase the flow of hydrocarbons to the production wellbore. In some embodiments, the wellbore in the second step can be a wellbore for hydraulic fracturing that is in fluid communication with the subsurface reservoir.

DETAILED DESCRIPTION

Figure 1:
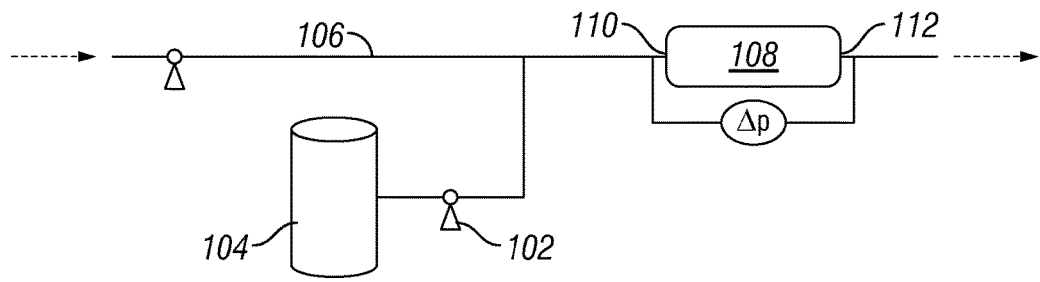
FIG. 1 is a process flow diagram schematically illustrating an example single stage mixing process for preparing an aqueous polymer solution. The example single stage mixing process comprises a single mixing step.

Provided herein are methods for preparing aqueous polymer solutions that comprise combining a liquid polymer (LP) composition with an aqueous fluid in a single stage mixing process. Also provided are methods of using these aqueous polymer solutions in oil and gas operations, including enhanced oil recovery (EOR).

The term "enhanced oil recovery" refers to techniques for increasing the amount of unrefined petroleum (e.g., crude oil) that may be extracted from an oil reservoir (e.g., an oil field). Using EOR, 40-60% of the reservoir's original oil can typically be extracted compared with only 20-40% using primary and secondary recovery (e.g., by water injection or natural gas injection). Enhanced oil recovery may also be referred to as improved oil recovery or tertiary oil recovery (as opposed to primary and secondary oil recovery). Examples of EOR operations include, for example, miscible gas injection (which includes, for example, carbon dioxide flooding), chemical injection (sometimes referred to as chemical enhanced oil recovery (CEOR), and which includes, for example, polymer flooding, alkaline flooding, surfactant flooding, conformance control operations, as well as combinations thereof such as alkaline-polymer flooding or alkaline-surfactant-polymer flooding), microbial injection, and thermal recovery (which includes, for example, cyclic steam, steam flooding, and fire flooding). In some embodiments, the EOR operation can include a polymer (P) flooding operation, an alkaline-polymer (AP) flooding operation, a surfactant-polymer (SP) flooding operation, an alkaline-surfactant-polymer (ASP) flooding operation, a conformance control operation, or any combination thereof. The terms "operation" and "application" may be used interchangeability herein, as in EOR operations or EOR applications.

For purposes of this disclosure, including the claims, the filter ratio (FR) can be determined using a 1.2 micron filter at 15 psi (plus or minus 10% of 15 psi) at ambient temperature (e.g., 25° C.). The 1.2 micron filter can have a diameter of 47 mm or 90 mm, and the filter ratio can be calculated as the ratio of the time for 180 to 200 ml of the inverted polymer solution to filter divided by the time for 60 to 80 ml of the inverted polymer solution to filter.

$$FR = \frac{t200\ ml - t180\ ml}{t80\ ml - t60\ ml}$$

For purposes of this disclosure, including the claims, the inverted polymer solution is required to exhibit a FR of 1.5 or less.

The formation of aqueous polymer solutions from a LP composition (e.g., by inversion of an LP composition such as an inverse emulsion polymer) can be challenging. For use in many applications, rapid and complete inversion of the inverse emulsion polymer composition is required. For example, for many applications, rapid and continuous inversion and dissolution (e.g., complete inversion and dissolution in five minutes or less) is required. For certain applications, including many oil and gas applications, it can be desirable to completely form an aqueous polymer solution (e.g., to invert and dissolve the emulsion or LP to a final concentration of from 500 to 5000 ppm) in an in-line system in a short period of time (e.g., less than five minutes).

For certain applications, including many enhanced oil recovery (EOR) applications, it can be desirable that the aqueous polymer solution flows through a hydrocarbon-bearing formation without plugging the formation. Plugging the formation can slow or inhibit oil production. This is an especially large concern in the case of hydrocarbon-bearing formations that have a relatively low permeability prior to tertiary oil recovery.

One test commonly used to determine performance of an aqueous polymer solution in such conditions involves measuring the time taken for given volumes/concentrations of solution to flow through a filter, commonly called a filtration quotient or Filter Ratio ("FR"). For example, U.S. Pat. No. 8,383,560 describes a filter ratio test method which measures the time taken by given volumes of a solution containing 1000 ppm of active polymer to flow through a filter. The solution is contained in a cell pressurized to 2 bars and the filter has a diameter of 47 mm and a pore size of 5 microns. The times required to obtain 100 ml (t100 ml), 200 ml (t200 ml), and 300 ml (t300 ml) of filtrate were measured. These values were used to calculate the FR, expressed by the formula below:

$$FR = \frac{t300\ ml - t200\ ml}{t200\ ml - t100\ ml}$$

The FR generally represents the capacity of the polymer solution to plug the filter for two equivalent consecutive volumes. Generally, a lower FR indicates better performance. U.S. Pat. No. 8,383,560, which is incorporated herein by reference, explains that a desirable FR using this method is less than 1.5.

However, polymer compositions that provide desirable results using this test method, have not necessarily provided acceptable performance in the field. In particular, many polymers that have an FR (using a 5 micron filter) lower than 1.5 exhibit poor injectivity—i.e., when injected into a formation, they tend to plug the formation, slowing or inhibiting oil production. A modified filter ratio test method using a smaller pore size (i.e., the same filter ratio test method except that the filter above is replaced with a filter having a diameter of 47 mm and a pore size of 1.2 microns) and lower pressure (15 psi) provides a better screening method.

The methods described herein can produce aqueous polymer solutions exhibiting a FR using the 1.2 micron filter of 1.5 or less via efficient single stage mixing processes. In field testing, these compositions can exhibit improved injectivity over commercially-available polymer compositions—including other polymer compositions having an FR (using a 5 micron filter) of less than 1.5. As such, the aqueous polymer solutions prepared by the methods described herein are suitable for use in a variety of oil and gas applications, including EOR.

LP Compositions

As discussed above, provided herein are methods for preparing aqueous polymer solutions that comprise combining a liquid polymer (LP) composition with an aqueous fluid in a single stage mixing process. The methods described herein can be used in conjunction with a variety of suitable LP compositions. Herein, the term "liquid polymer (LP) composition" is used to broadly refer to polymer compositions that are pumpable and/or flowable, so as to be compatible with the single stage mixing processes described herein.

In some examples, the LP composition can comprise a substantially anhydrous polymer suspension that comprises a powder polymer having an average molecular weight of 0.5 to 30 million Daltons suspended in a carrier having an HLB of greater than or equal to 8. In these polymer suspensions, the powder polymer and the carrier can be present in the substantially anhydrous polymer suspension at a weight ratio of from 20:80 to 80:20 (e.g., at a weight ratio of from 30:70 to 70:30, or at a weight ratio of from 40:60 to 60:40). The carrier can comprise at least one surfactant. In some cases, the carrier can be water soluble. In some cases, the carrier can be water soluble and oil soluble.

LP compositions of this type are known in the art, and are discussed in more detailed in the following cases having Chevron U.S.A. Inc. as an assignee: U.S. Patent Application Publication Nos. 2016/0122622, 2016/0122623, 2016/0122624, and 2016/0122626, each of which is incorporated herein by reference in its entirety. Other suitable LP compositions include compositions described, for example, in SPE 179657 entitled "Permeability Reduction Due to use of Liquid Polymers and Development of Remediation Options" by Dwarakanath et al. (SPE IOR symposium at Tulsa 2016), which is incorporated herein by reference in its entirety.

In some of these embodiments, the powder polymer for use in the suspension is selected or tailored according to the characteristics of the reservoir for EOR treatment such as permeability, temperature and salinity. Examples of suitable powder polymers include biopolymers such as polysaccharides. For example, polysaccharides can be xanthan gum, scleroglucan, guar gum, a mixture thereof (e.g., any modifications thereof such as a modified chain), etc. Indeed, the terminology "mixtures thereof" or "combinations thereof" can include "modifications thereof" herein. Examples of suitable powder synthetic polymers include polyacrylamides. Examples of suitable powder polymers include synthetic polymers such as partially hydrolyzed polyacrylamides (HPAMs or PHPAs) and hydrophobically-modified associative polymers (APs). Also included are co-polymers of polyacrylamide (PAM) and one or both of 2-acrylamido 2-methylpropane sulfonic acid (and/or sodium salt) commonly referred to as AMPS (also more generally known as acrylamido tertiobutyl sulfonic acid or ATBS), N-vinyl pyrrolidone (NVP), and the NVP-based synthetic may be single-, co-, or ter-polymers. In one embodiment, the powder synthetic polymer is polyacrylic acid (PAA). In one embodiment, the powder synthetic polymer is polyvinyl alcohol (PVA). Copolymers may be made of any combination or mixture above, for example, a combination of NVP and ATB S.

In some embodiments, the carrier can comprise a mixture of surfactants (e.g., a surfactant and one or more co-surfactants, such as a mixture of non-ionic and anionic surfactants). Examples suitable surfactants include ethoxylated surfactants, nonylphenol ethoxylates, alcohol ethoxylates, internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, alkyl sulfonate, α-olefin sulfonates (AOS), dihexyl sulfosuccinates, alkylpolyalkoxy sulfates, sulfonated amphoteric surfactants, and mixtures thereof.

In some embodiments, the carrier can further comprise a co-solvent (e.g., an alcohol, a glycol ether, or a combination thereof). In some cases, the co-solvent can comprise an alcohol ethoxylate (-EO-); an alcohol alkoxylate (-PO-EO-); an alkyl polyglycol ether; an alkyl phenoxy ethoxylate; an ethylene glycol butyl ether (EGBE); a diethylene glycol butyl ether (DGBE); a triethylene glycol butyl ether (TGBE); a polyoxyethylene nonylphenylether, or a mixture thereof. In some cases, the co-solvent can comprise an alcohol selected from the group of isopropyl alcohol (IPA), isobutyl alcohol (IBA) and secondary butyl alcohol (SBA).

In some embodiments, the carrier can comprise an ionic surfactant, non-ionic surfactant, anionic surfactant, cationic surfactant, amphoteric surfactant, ketones, esters, ethers, glycol ethers, glycol ether esters, lactams, cyclic ureas, alcohols, aromatic hydrocarbons, aliphatic hydrocarbons, alicyclic hydrocarbons, nitroalkanes, unsaturated hydrocarbons, halocarbons, alkyl aryl sulfonates (AAS), a-olefin sulfonates (AOS), internal olefin sulfonates (IOS), alcohol ether sulfates derived from propoxylated $C_{12}$-$C_{20}$ alcohols, ethoxylated alcohols, mixtures of an alcohol and an ethoxylated alcohol, mixtures of anionic and cationic surfactants, disulfonated surfactants, aromatic ether polysulfonates, isomerized olefin sulfonates, alkyl aryl sulfonates, medium alcohol (C10 to C17) alkoxy sulfates, alcohol ether [alkoxy] carboxylates, alcohol ether [alkoxy]sulfates, primary amines, secondary amines, tertiary amines, quaternary ammonium cations, cationic surfactants that are linked to a terminal sulfonate or carboxylate group, alkyl aryl alkoxy alcohols, alkyl alkoxy alcohols, alkyl alkoxylated esters, alkyl polyglycosides, alkoxy ethoxyethanol compounds, isobutoxy ethoxyethanol ("iBDGE"), n-pentoxy ethoxyethanol ("n-PDGE"), 2-methylbutoxy ethoxyethanol ("2-MB-DGE"), methylbutoxy ethoxyethanol ("3-MBDGE"), (3,3-dimethylbutoxy ethoxyethanol ("3,3-DMBDGE"), cyclohexylmethyleneoxy ethoxyethanol (hereafter "CHM-DGE"), 4-Methylpent-2-oxy ethoxyethanol ("MIBCDGE"), n-hexoxy ethoxyethanol (hereafter "n-HDGE"), 4-methyl-pentoxy ethoxyethanol ("4-MPDGE"), butoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol and ethoxy ethanol, n-methyl-2-pyrrolidone, dimethyl ethylene urea, and mixtures thereof.

"Substantially anhydrous" as used herein refers to a polymer suspension which contains only a trace amount of water. Trace amount means no detectable amount of water in one embodiment; less than or equal to 3 wt. % water in another embodiment; and containing less than or equal to any of 2.5%, 2%, 1%, 0.9%, 0.8%, 0.7%, 0.6%, 0.5%, 0.4%, 0.3%, 0.2%, 0.1%, 0.05% or 0.01% water in various embodiments. A reference to "polymer suspension" refers to a substantially anhydrous polymer suspension.

In other examples, LP compositions can comprise one or more synthetic (co)polymers (e.g., one or more acrylamide (co)polymers) dispersed or emulsified in one or more hydrophobic liquids. In some embodiments, the LP compositions can further comprise one or more emulsifying surfactants and one or more inverting surfactants. In some embodiments, the LP compositions can further comprise a small amount of water. For example, the LP compositions can further comprise less than 10% by weight (e.g., less than 5% by weight, less than 4% by weight, less than 3% by weight, less than 2.5% by weight, less than 2% by weight, or less than 1% by weight) water, based on the total weight of all the components of the LP composition. In certain embodiments, the LP compositions can be water-free or substantially water-free (i.e., the composition can include less than 0.5% by weight water, based on the total weight of the composition). The LP compositions can optionally include one or more additional components which do not substantially diminish the desired performance or activity of the composition. It will be understood by a person having ordinary skill in the art how to appropriately formulate the LP composition to provide necessary or desired features or properties.

In some embodiments, the LP composition can comprise one or more hydrophobic liquids having a boiling point at least 100° C.; at least 39% by weight of one or more synthetic co-polymers (e.g., acrylamide-(co)polymers); one or more emulsifier surfactants; and one or more inverting surfactants.

In some embodiments, the LP composition can comprise one or more hydrophobic liquids having a boiling point at least 100° C.; at least 39% by weight of particles of one or more acrylamide-(co)polymers; one or more emulsifier surfactants; and one or more inverting surfactants. In certain embodiments, when the composition is fully inverted in an aqueous fluid, the composition affords an aqueous polymer solution having a filter ratio (FR) (1.2 micron filter) of 1.5 or less. In certain embodiments, the aqueous polymer solution can comprise from 500 to 5000 ppm (e.g., from 500 to 3000 ppm) active polymer, and have a viscosity of at least 20 cP at 30° C.

In some embodiments, the LP compositions can comprise less than 10% by weight (e.g., less than 7% by weight, less than 5% by weight, less than 4% by weight, less than 3% by weight, less than 2.5% by weight, less than 2% by weight, or less than 1% by weight) water prior to combination with the aqueous fluid, based on the total weight of all the components of the LP composition. In certain embodiments, the LP composition, prior to combination with the aqueous fluid, comprises from 1% to 10% water by weight, or from 1% to 5% water by weight, based on the total amount of all components of the composition.

In some embodiments, the solution viscosity (SV) of a 0.1% solution of the LP composition can be greater than 3.0 cP, or greater than 5 cP, or greater than 7 cP. The SV of the LP composition can be selected based, at least in part, on the intended actives concentration of the aqueous polymer solution, to provide desired performance characteristics in the aqueous polymer solution. For example, in certain embodiments, where the aqueous polymer solution is intended to have an actives concentration of about 2000 ppm, it is desirable that the SV of a 0.1% solution of the LP composition is in the range of from 7.0 to 8.6, because at this level, the aqueous polymer solution has desired FR1.2 and viscosity properties. A liquid polymer composition with a lower or higher SV range may still provide desirable results, but may require changing the actives concentration of the aqueous polymer solution to achieve desired FR1.2 and viscosity properties. For example, if the liquid polymer composition has a lower SV range, it may be desirable to increase the actives concentration of the aqueous polymer solution.

In some embodiments, the LP composition can comprise one or more synthetic (co)polymers (e.g., one or more acrylamide (co)polymers) dispersed in one or more hydrophobic liquids. In these embodiments, the LP composition can comprise at least 39% polymer by weight (e.g., at least 40% by weight, at least 45% by weight, at least 50% by weight, at least 55% by weight, at least 60% by weight, at least 65% by weight, at least 70% by weight, or at least 75% by weight), based on the total amount of all components of the composition. In some embodiments, the LP composition can comprise 80% by weight or less polymer (e.g., 75% by weight or less, 70% by weight or less, 65% by weight or less, 60% by weight or less, 55% by weight or less, 50% by weight or less, 45% by weight or less, or 40% by weight or less), based on the total amount of all components of the composition.

The these embodiments, the LP composition can comprise an amount of polymer ranging from any of the minimum values described above to any of the maximum values described above. For example, in some embodiments, the LP composition can comprise from 39% to 80% by weight polymer (e.g., from 39% to 60% by weight polymer, or from 39% to 50% by weight polymer), based on the total weight of the composition.

In some embodiments, the LP composition can comprise one or more synthetic (co)polymers (e.g., one or more acrylamide (co)polymers) emulsified in one or more hydrophobic liquids. In these embodiments, the LP composition can comprise at least 10% polymer by weight (e.g., at least 15% by weight, at least 20% by weight, at least 25% by weight, or at least 30% by weight), based on the total amount of all components of the composition. In some embodiments, the LP composition can comprise less than 38% by weight polymer (e.g., less than 35% by weight, less than 30% by weight, less than 25% by weight, less than 20% by weight, or less than 15% by weight), based on the total amount of all components of the composition.

The these embodiments, the LP composition can comprise an amount of polymer ranging from any of the minimum values described above to any of the maximum values described above. For example, in some embodiments, the LP composition can comprise from 10% to 38% by weight polymer (e.g., from 10% to 35% by weight polymer, from 15% to 30% by weight polymer, from 15% to 35% by weight polymer, from 15% to 38% by weight polymer, from 20% to 30% by weight polymer, from 20% to 35% by weight polymer, or from 20% to 38% by weight polymer), based on the total weight of the composition.

Hydrophobic Liquid

In some embodiments, the LP composition can include one or more hydrophobic liquids. In some cases, the one or more hydrophobic liquids can be organic hydrophobic liquids. In some embodiments, the one or more hydrophobic liquids each have a boiling point at least 100° C. (e.g., at least 135° C., or at least 180° C.). If the organic liquid has a boiling range, the term "boiling point" refers to the lower limit of the boiling range.

In some embodiments, the one or more hydrophobic liquids can be aliphatic hydrocarbons, aromatic hydrocarbons, or mixtures thereof. Examples of hydrophobic liquids include but are not limited to water-immiscible solvents, such as paraffin hydrocarbons, naphthene hydrocarbons, aromatic hydrocarbons, olefins, oils, stabilizing surfactants, and mixtures thereof. The paraffin hydrocarbons can be saturated, linear, or branched paraffin hydrocarbons. Examples of suitable aromatic hydrocarbons include, but are not limited to, toluene and xylene. In certain embodiments, the hydrophobic liquid can comprise an oil, for example, a vegetable oil, such as soybean oil, rapeseed oil, canola oil, or a combination thereof, and any other oil produced from the seed of any of several varieties of the rape plant.

In some embodiments, the amount of the one or more hydrophobic liquids in the inverse emulsion or LP composition is from 20% to 60%, from 25% to 54%, or from 35% to 54% by weight, based on the total amount of all components of the LP composition.

Synthetic (Co)Polymers

In some embodiments, the LP composition includes one or more synthetic (co)polymers, such as one or more acrylamide containing (co)polymers. As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units. The term "polymer" as used herein is intended to include both the acid form of the polymer as well as its various salts.

In some embodiments, the one or more synthetic (co) polymers can be a polymer useful for enhanced oil recovery applications. The term "enhanced oil recovery" or "EOR" (also known as tertiary oil recovery), refers to a process for hydrocarbon production in which an aqueous injection fluid comprising at least a water soluble polymer is injected into a hydrocarbon bearing formation.

In some embodiments, the one or more synthetic (co) polymers comprise water-soluble synthetic (co)polymers. Examples of suitable synthetic (co)polymers include acrylic polymers, such as polyacrylic acids, polyacrylic acid esters, partly hydrolyzed acrylic esters, substituted polyacrylic acids such as polymethacrylic acid and polymethacrylic acid esters, polyacrylamides, partly hydrolyzed polyacrylamides, and polyacrylamide derivatives such as acrylamide tertiary butyl sulfonic acid (ATBS); copolymers of unsaturated carboxylic acids, such as acrylic acid or methacrylic acid, with olefins such as ethylene, propylene and butylene and their oxides; polymers of unsaturated dibasic acids and anhydrides such as maleic anhydride; vinyl polymers, such as polyvinyl alcohol (PVA), N-vinylpyrrolidone, and polystyrene sulfonate; and copolymers thereof, such as copolymers of these polymers with monomers such as ethylene, propylene, styrene, methylstyrene, and alkylene oxides. In some embodiments, the one or more synthetic (co)polymer can comprise polyacrylic acid (PAA), polyacrylamide (PAM), acrylamide tertiary butyl sulfonic acid (ATBS) (or AMPS, 2-acrylamido-2-methylpropane sulfonic acid), N-vinylpyrrolidone (NVP), polyvinyl alcohol (PVA), or a blend or copolymer of any of these polymers. Copolymers may be made of any combination above, for example, a combination of NVP and ATBS. In certain examples, the one or more synthetic (co)polymers can comprise acrylamide tertiary butyl sulfonic acid (ATBS) (or AMPS, 2-acrylamido-2-methylpropane sulfonic acid) or a copolymer thereof.

In some embodiments, the one or more synthetic (co) polymers can comprise acrylamide (co)polymers. In some embodiments, the one or more acrylamide (co)polymers comprise water-soluble acrylamide (co)polymers. In various embodiments, the acrylamide (co)polymers comprise at least 30% by weight, or at least 50% by weight acrylamide units with respect to the total amount of all monomeric units in the (co)polymer.

Optionally, the acrylamide-(co)polymers can comprise, besides acrylamide, at least one additional co-monomer. In example embodiments, the acrylamide-(co)polymer may comprise less than about 50%, or less than about 40%, or less than about 30%, or less than about 20% by weight of the at least one additional co-monomer. In some embodiments, the additional comonomer can be a water-soluble, ethylenically unsaturated, in particular monoethylenically unsaturated, comonomer. Suitable additional water-soluble comonomers include comonomers that are miscible with water in any ratio, but it is sufficient that the monomers dissolve sufficiently in an aqueous phase to copolymerize with acrylamide. In some cases, the solubility of such additional monomers in water at room temperature can be at least 50 g/L (e.g., at least 150 g/L, or at least 250 g/L).

Other suitable water-soluble comonomers can comprise one or more hydrophilic groups. The hydrophilic groups can be, for example, functional groups that comprise one or more atoms selected from the group of O-, N-, S-, and P-atoms. Examples of such functional groups include carbonyl groups >C—O, ether groups —O—, in particular polyethylene oxide groups —($CH_2$—$CH_2$—O—)$_n$—, where n is preferably a number from 1 to 200, hydroxy groups —OH, ester groups —C(O)O—, primary, secondary or tertiary amino groups, ammonium groups, amide groups —C(O)—NH— or acid groups such as carboxyl groups —COOH, sulfonic acid groups —$SO_3H$, phosphonic acid groups —$PO_3H_2$ or phosphoric acid groups —OP(OH)$_3$.

Examples of monoethylenically unsaturated comonomers comprising acid groups include monomers comprising —COOH groups, such as acrylic acid or methacrylic acid, crotonic acid, itaconic acid, maleic acid or fumaric acid, monomers comprising sulfonic acid groups, such as vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups, such as vinylphosphonic acid, allylphosphonic acid, N-(meth)acrylamidoalkylphosphonic acids or (meth)acryloyloxyalkyl-phosphonic acids. Of course the monomers may be used as salts.

The —COOH groups in polyacrylamide-copolymers may not only be obtained by copolymerizing acrylic amide and monomers comprising —COOH groups but also by hydrolyzing derivatives of —COOH groups after polymerization. For example, the amide groups —CO—$NH_2$ of acrylamide may hydrolyze thus yielding —COOH groups.

Also to be mentioned are derivatives of acrylamide thereof, such as, for example, N-methyl(meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate. N-vinyl derivatives can be hydrolyzed after polymerization to vinylamine units, vinyl esters to vinyl alcohol units.

Other example comonomers include monomers comprising hydroxy and/or ether groups, such as, for example, hydroxyethyl(meth)acrylate, hydroxypropyl(meth)acrylate, allyl alcohol, hydroxyvinyl ethyl ether, hydroxyl vinyl propyl ether, hydroxyvinyl butyl ether or polyethyleneoxide (meth)acrylates.

Other example comonomers are monomers having ammonium groups, i.e monomers having cationic groups. Examples comprise salts of 3-trimethylammonium propylacrylamides or 2-trimethylammonium ethyl(meth)acrylates, for example the corresponding chlorides, such as 3-trimethylammonium propylacrylamide chloride (DIMAPAQUAT) and 2-trimethylammonium ethyl methacrylate chloride (MADAME-QUAT).

Other example monoethylenically unsaturated monomers include monomers which may cause hydrophobic association of the (co)polymers. Such monomers comprise besides the ethylenic group and a hydrophilic part also a hydrophobic part. Such monomers are disclosed for instance in WO 2012/069477, which is incorporated herein by reference in its entirety.

Other example comonomers include N-alkyl acrylamides and N-alkyl quarternary acrylamides, where the alkyl group comprises, for example, a C2-C28 alkyl group.

In certain embodiments, each of the one or more acrylamide-(co)polymers can optionally comprise crosslinking monomers, i.e. monomers comprising more than one polymerizable group. In certain embodiments, the one or more acrylamide-(co)polymers may optionally comprise crosslinking monomers in an amount of less than 0.5%, or 0.1%, by weight, based on the amount of all monomers.

In an embodiment, each of the one or more acrylamide-(co)polymers comprises at least one monoethylenically unsaturated comonomer comprising acid groups, for example monomers which comprise at least one group selected from —COOH, —SO$_3$H or —PO$_3$H$_2$. Examples of such monomers include but are not limited to acrylic acid, methacrylic acid, vinylsulfonic acid, allylsulfonic acid or 2-acrylamido-2-methylpropanesulfonic acid, particularly preferably acrylic acid and/or 2-acrylamido-2-methylpropanesulfonic acid and most preferred acrylic acid or the salts thereof. The amount of such comonomers comprising acid groups can be from 0.1% to 70%, from 1% to 50%, or from 10% to 50% by weight based on the amount of all monomers.

In an embodiment, each of the one or more acrylamide-(co)polymers comprise from 50% to 90% by weight of acrylamide units and from 10% to 50% by weight of acrylic acid units and/or their respective salts, based on the total weight of all the monomers making up the copolymer. In an embodiment, each of the one or more acrylamide-(co)polymers comprise from 60% to 80% by weight of acrylamide units and from 20% to 40% by weight of acrylic acid units, based on the total weight of all the monomers making up the copolymer.

In some embodiments, the one or more synthetic (co)polymers (e.g., the one or more acrylamide (co)polymers) are in the form of particles, which are dispersed in the emulsion or LP. In some embodiments, the particles of the one or more synthetic (co)polymers can have an average particle size of from 0.4 µm to 5 µm, or from 0.5 µm to 2 µm. Average particle size refers to the $d_{50}$ value of the particle size distribution (number average) as measured by laser diffraction analysis.

In some embodiments, the one or more synthetic (co)polymers (e.g., the one or more acrylamide (co)polymers) can have a weight average molecular weight ($M_w$) of from 5,000,000 g/mol to 30,000,000 g/mol; from 10,000,000 g/mol to 25,000,000 g/mol; or from 15,000,000 g/mol to 25,000,000 g/mol.

In some embodiments, the LP composition can comprise one or more synthetic (co)polymers (e.g., one or more acrylamide (co)polymers) dispersed in one or more hydrophobic liquids. In these embodiments, the amount of the one or more synthetic (co)polymers (e.g., one or more acrylamide (co)polymers) in the LP composition can be at least 39% by weight, based on the total weight of the composition. In some of these embodiments, the amount of the one or more synthetic (co)polymers (e.g., one or more acrylamide-(co) polymers) in the LP composition can be from 39% to 80% by weight, or from 40% to 60% by weight, or from 45% to 55% by weight, based on the total amount of all components of the composition (before dilution). In some embodiments, the amount of the one or more synthetic (co)polymers (e.g., one or more acrylamide-(co)polymers) in the LP composition is 39%, 40%, 41%, 42%, 43%, 44%, 45%, 46%, 47%, 48%, 49%, 50%, 51%, 52%, 53%, 54%, 55%, 56%, 57%, 58%, 59%, 60%, or higher, by weight, based on the total amount of all components of the composition (before dilution).

In some embodiments, the LP composition can comprise one or more synthetic (co)polymers (e.g., one or more acrylamide (co)polymers) emulsified in one or more hydrophobic liquids. In these embodiments, the amount of the one or more synthetic (co)polymers (e.g., one or more acrylamide (co)polymers) in the LP composition can be less than 38% by weight, less than 35% by weight, or less than 30% by weight based on the total weight of the composition. In some of these embodiments, the amount of the one or more synthetic (co)polymers (e.g., one or more acrylamide-(co) polymers) in the LP composition can be from 10% to 35% by weight, from 10% to 38% by weight, from 15% to 30% by weight, from 15% to 38% by weight, from 20% to 38% by weight, or from 20% to 30% by weight, based on the total amount of all components of the composition (before dilution). In some embodiments, the amount of the one or more synthetic (co)polymers (e.g., one or more acrylamide-(co) polymers) in the LP composition is 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, or less, by weight, based on the total amount of all components of the composition (before dilution).

Emulsifying Surfactants

In some embodiments, the LP composition can include one or more emulsifying surfactants. In some embodiments, the one or more emulsifying surfactants are surfactants capable of stabilizing water-in-oil-emulsions. Emulsifying surfactants, among other things, in the emulsion, lower the interfacial tension between the water and the water-immiscible liquid so as to facilitate the formation of a water-in-oil polymer emulsion. It is known in the art to describe the capability of surfactants to stabilize water-in-oil-emulsions or oil-in-water emulsions by using the so called "HLB-value" (hydrophilic-lipophilic balance). The HLB-value usually is a number from 0 to 20. In surfactants having a low HLB-value the lipophilic parts of the molecule predominate and consequently they are usually good water-in-oil emulsifiers. In surfactants having a high HLB-value the hydrophilic parts of the molecule predominate and consequently they are usually good oil-in-water emulsifiers. In some embodiments, the one or more emulsifying surfactants are surfactants having an HLB-value of from 2 to 10, or a mixture of surfactant having an HLB-value of from 2 to 10.

Examples of suitable emulsifying surfactants include, but are not limited to, sorbitan esters, in particular sorbitan monoesters with C12-C18-groups such as sorbitan monolaurate (HLB approx. 8.5), sorbitan monopalmitate (HLB approx. 7.5), sorbitan monostearate (HLB approx. 4.5), sorbitan monooleate (HLB approx. 4); sorbitan esters with more than one ester group such as sorbitan tristearate (HLB approx. 2), sorbitan trioleate (HLB approx. 2); ethoxylated fatty alcohols with 1 to 4 ethyleneoxy groups, e.g. polyoxyethylene (4) dodecylether ether (HLB value approx. 9), polyoxyethylene (2) hexadecyl ether (HLB value approx. 5), and polyoxyethylene (2) oleyl ether (HLB value approx. 4).

Exemplary emulsifying surfactants include, but are not limited to, emulsifiers having HLB values of from 2 to 10 (e.g., less than 7). Suitable such emulsifiers include the sorbitan esters, phthalic esters, fatty acid glycerides, glycerine esters, as well as the ethoxylated versions of the above and any other well known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions thereof containing 1 to 10 moles of ethylene oxide per mole of the basic emulsifier. Thus, any emulsifier can be utilized which will permit the formation of the initial emulsion and stabilize the emulsion during the polymerization reaction. Examples of emulsifying surfactants also include modified polyester surfactants, anhydride substituted ethylene copolymers, N,N-dialkanol substituted fatty amides, and tallow amine ethoxylates.

In an embodiment, the inverse emulsion or LP composition comprises from 0% to 5% by weight (e.g., from 0.05% to 5%, from 0.1% to 5%, or from 0.5% to 3% by weight) of the one or more emulsifying surfactants, based on the total weight of the composition. These emulsifying surfactants can be used alone or in mixtures. In some embodiments, the inverse emulsion or LP composition can comprise less than 5% by weight (e.g., less than 4% by weight, or less than 3% by weight) of the one or more emulsifying surfactants, based on the total weight of the composition.

Process Stabilizing Agents

In some embodiments, the LP composition can optionally include one or more process stabilizing agents. The process stabilizing agents aim at stabilizing the dispersion of the particles of polyacrylamide-(co)polymers in the organic, hydrophobic phase and optionally also at stabilizing the droplets of the aqueous monomer phase in the organic hydrophobic liquid before and in course of the polymerization or processing of the LP composition. The term "stabilizing" means in the usual manner that the agents prevent the dispersion from aggregation and flocculation.

The process stabilizing agents can be any stabilizing agents, including surfactants, which aim at such stabilization. In certain embodiments, the process stabilizing agents can be oligomeric or polymeric surfactants. Due to the fact that oligomeric and polymeric surfactants can have many anchor groups they absorb very strongly on the surface of the particles and furthermore oligomers/polymers are capable of forming a dense steric barrier on the surface of the particles which prevents aggregation. The number average molecular weight Mn of such oligomeric or polymeric surfactants may for example range from 500 to 60,000 g/mol (e.g., from 500 to 10,000 g/mol, or from 1,000 to 5,000 g/mol). Suitable oligomeric and/or polymeric surfactants for stabilizing polymer dispersions are known to the skilled artisan. Examples of such stabilizing polymers comprise amphiphilic block copolymers, comprising hydrophilic and hydrophobic blocks, amphiphilic copolymers comprising hydrophobic and hydrophilic monomers and amphiphilic comb polymers comprising a hydrophobic main chain and hydrophilic side chains or alternatively a hydrophilic main chain and hydrophobic side chains.

Examples of amphiphilic block copolymers comprise block copolymers comprising a hydrophobic block comprising alkylacrylates having longer alkyl chains, e.g., C6 to C22-alkyl chains, such as for instance hexyl(meth)acrylate, 2-ethylhexyl(meth)acrylate, octyl(meth)acrylate, do-decyl(meth)acrylate, hexadecyl(meth)acrylate or octadecyl(meth)acrylate. The hydrophilic block may comprise hydrophilic monomers such as acrylic acid, methacrylic acid or vinyl pyrrolidone.

Inverting Surfactants

In some embodiments, the LP composition optionally can include one or more inverting surfactants. In some embodiments, the one or more emulsifying surfactants are surfactants which can be used to accelerate the formation of an aqueous polymer solution (e.g., an inverted (co)polymer solution) after mixing the inverse emulsion or LP composition with an aqueous fluid.

Suitable inverting surfactants are known in the art, and include, for example, nonionic surfactants comprising a hydrocarbon group and a polyalkylenoxy group of sufficient hydrophilic nature. In some cases, nonionic surfactants defined by the general formula $R^1$—O—$(CH(R^2)$—$CH_2$—$O)_n$H (I) can be used, wherein $R^1$ is a $C_8$-$C_{22}$-hydrocarbon group, such as an aliphatic $C_{10}$-$C_{18}$-hydrocarbon group, n is a number of ≥4, preferably ≥6, and $R^2$ is H, methyl or ethyl, with the proviso that at least 50% of the groups $R^2$ are H. Examples of such surfactants include polyethoxylates based on $C_{10}$-$C_{18}$-alcohols such as $C_{12/14}$-, $C_{14/18}$- or $C_{16/18}$-fatty alcohols, $C_{13}$- or $C_{13/15}$-oxoalcohols. The HLB-value can be adjusted by selecting the number of ethoxy groups. Specific examples include tridecylalcohol ethoxylates comprising from 4 to 14 ethylenoxy groups (e.g., tridecyalcohol-8 EO (HLB-value approx. 13-14)) or $C_{12/14}$ fatty alcohol ethoxylates (e.g., $C_{12/14}$.8 EO (HLB-value approx. 13)). Examples of emulsifying surfactants also include modified polyester surfactants, anhydride substituted ethylene copolymers, N,N-dialkanol substituted fatty amides, and tallow amine ethoxylates.

Other suitable inverting surfactants include anionic surfactants, such as, for example, surfactants comprising phosphate or phosphonic acid groups.

In some embodiments, the one or more inverting surfactants can comprise polyoxyethylene sorbitol tetraoleate, $C_{12-14}$ branched ethoxylated alcohol, polyethylene glycol monoleate. In certain embodiments, the one or more inverting surfactants can comprise from 1 to 20 mole % polyoxyethylene sorbitol tetraoleate, from 60 to 80 mole % $C_{12-14}$ branched ethoxylated alcohol and about 15 to about 25 mole % polyethylene glycol monoleate.

In some embodiments, the amount of the one or more inverting surfactants in the inverse emulsion or LP composition is from 1% to 10% (e.g., from 1% to 5%) by weight. based on the total amount of all components of the inverse emulsion or LP composition.

In certain embodiments, the one or more inverting surfactants can be added to the inverse emulsion or LP composition directly after preparation of the composition comprising the one or more acrylamide (co)polymers dispersed in one or more hydrophobic liquids, and optionally the one or more emulsifying surfactants (i.e., the inverse emulsion or liquid dispersion polymer composition which is transported from the location of manufacture to the location of use already comprises the one or more inverting surfactants). In another embodiment the one or more inverting surfactants may be added to the inverse emulsion or LP composition at the location of use (e.g., at an off-shore production site).

Other Components

Optional further components can be added to the inverse emulsion or LP composition. Examples of such components comprise radical scavengers, oxygen scavengers, chelating agents, biocides, stabilizers, or sacrificial agents.

Preparation of LP Compositions

In some embodiments, LP compositions can be synthesized as according to the following procedures.

In a first step, an inverse emulsion (water-in-oil emulsion) of acrylamide-(co)polymers can be synthesized using procedures known to the skilled artisan. Such inverse emulsions can be obtained by polymerizing an aqueous solution of acrylamide and other comonomers, such as water-soluble ethylenically unsaturated comonomers, emulsified in a hydrophobic oil phase. In a following step, water within such inverse emulsions can be reduced to an amount of less than 10%, or less than 5%, by weight. Suitable techniques are described for instance in U.S. Pat. No. 4,052,353, U.S. Pat. No. 4,528,321, or DE 24 19 764 A1, each of which is incorporated herein by reference in its entirety.

For the polymerization, an aqueous monomer solution comprising acrylamide and optionally other comonomers can be prepared. Acrylamide is a solid at room temperature and aqueous solutions comprising around 50% by weight of acrylamide are commercially available. If comonomers with acidic groups such as acrylic acid are used the acidic groups may be neutralized by adding aqueous bases such as aqueous sodium hydroxide. The concentration of all monomers together in the aqueous solution should usually be from 10% to 60% by weight based on the total of all components of the monomer solution, or from 30% to 50%, or from 35% to 45% by weight.

The aqueous solution of acrylamide and comonomers can be emulsified in the one or more hydrophobic liquids using one or more emulsifying surfactants. The one or more emulsifying surfactants may be added to the mixture or may be added to the monomer solution or the hydrophobic liquid before mixing. Other surfactants may be used in addition to the one or more emulsifying surfactants, such as a stabilizing surfactant. Emulsifying may be done in the usual manner, e.g. by stirring the mixture.

After an emulsion has been formed polymerization may be initiated by adding oil- and/or water soluble initiators for radical polymerization to the emulsion. The initiators may be dissolved in water or water miscible organic solvents such as for instance alcohols. It may also be added as emulsion. Exemplary polymerization initiators comprise organic peroxides such as tert-butyl hydroperoxide, sodium sulfite, sodium disulfite or organic sulfites, ammonium- or sodium peroxodisulfate, iron(II) salts or azo groups comprising initiators such as AIBN.

In certain embodiments, one or more chain transfer agents may be added to the mixture during polymerization. Generally, chain transfer agents have at least one weak chemical bond, which therefore facilitates the chain transfer reaction. Any conventional chain transfer agent may be employed, such as propylene glycol, isopropanol, 2-mercaptoethanol, sodium hypophosphite, dodecyl mercaptan, thioglycolic acid, other thiols and halocarbons, such as carbon tetrachloride. The chain transfer agent is generally present in an amount of from 0.001 percent to 10 percent by weight of the total emulsion, though more may be used.

The polymerization temperature usually is from 30° C. to 100° C., or from 30° C. to 70° C., or from 35° C. to 60° C. Heating may be done by external sources of heat and/or heat may be generated—in particular when starting polymerization—by the polymerization reaction itself. Polymerization times may for example be from about 0.5 h to about 10 h.

The polymerization yields an inverse emulsion comprising an aqueous phase of the one or more acrylamide-(co) polymers dissolved or swollen in water wherein the aqueous phase is emulsified in an organic phase comprising the one or more hydrophobic liquids.

In order to convert the inverse emulsion obtained to the LP compositions to be used in the methods described herein, after the polymerization, some or all of the water is distilled off from the emulsion thus yielding particles of the one or more acrylamide-(co)polymers emulsified in the one or more hydrophobic liquids.

For the liquid polymer compositions, the water is at least removed to a level of less than 10%, or less than 7%, or less than 5%, or less than 3% by weight. In exemplary embodiments, the removal of water is carried out by any suitable means, for example, at reduced pressure, e.g. at a pressure of 30 hPa to 500 hPa, preferably 50 hPa to 250 hPa. The temperature in course of water removal may typically be from 70° C. to 100° C., although techniques which remove water at higher temperatures may be used. In certain embodiments, one or more of the hydrophobic liquids used in the inverse emulsion may be a low boiling liquid, which may distill off together with the water as a mixture.

After removal of the amount of water desired, the one or more inverting surfactants, and other optional components, can be added.

In some embodiments, the manufacture of the liquid polymer compositions is carried out in a chemical production plant.

Preparation Aqueous Polymer Solutions

Provided herein are aqueous polymer solutions, as well as methods of preparing the aqueous polymer solutions from LP compositions, such as those described above, using a single stage mixing process.

Methods for preparing an aqueous polymer solution from an LP composition comprising one or more synthetic (co) polymers (e.g., one or more acrylamide (co)polymers) can comprise combining the LP composition with an aqueous fluid in a single stage mixing process to provide an aqueous polymer solution having a concentration of one or more synthetic (co)polymers (e.g., one or more acrylamide (co) polymers) of from 50 to 15,000 ppm.

In some embodiments, the aqueous polymer solution can have a concentration of one or more synthetic (co)polymers (e.g., one or more acrylamide (co)polymers) of at least 50 ppm (e.g., at least 100 ppm, at least 250 ppm, at least 500 ppm, at least 750 ppm, at least 1000 ppm, at least 1500 ppm, at least 2000 ppm, at least 2500 ppm, at least 3000 ppm, at least 3500 ppm, at least 4000 ppm, at least 4500 ppm, at least 5000 ppm, at least 5500 ppm, at least 6000 ppm, at least 6500 ppm, at least 7000 ppm, at least 7500 ppm, at least 8000 ppm, at least 8500 ppm, at least 9000 ppm, at least 9500 ppm, at least 10,000 ppm, at least 10,500 ppm, at least 11,000 ppm, at least 11,500 ppm, at least 12,000 ppm, at least 12,500 ppm, at least 13,000 ppm, at least 13,500 ppm, at least 14,000 ppm, or at least 14,500 ppm).

In some embodiments, the aqueous polymer solution can have a concentration of one or more synthetic (co)polymers (e.g., one or more acrylamide (co)polymers) of 15,000 ppm or less (e.g., 14,500 ppm or less, 14,000 ppm or less, 13,500 ppm or less, 13,000 ppm or less, 12,500 ppm or less, 12,000 ppm or less, 11,500 ppm or less, 11,000 ppm or less, 10,500 ppm or less, 10,000 ppm or less, 9,500 ppm or less, 9,000 ppm or less, 8,500 ppm or less, 8,000 ppm or less, 7,500 ppm or less, 7,000 ppm or less, 6,500 ppm or less, 6,000 ppm or less, 5,500 ppm or less, 5,000 ppm or less, 4500 ppm or less, 4000 ppm or less, 3500 ppm or less, 3000 ppm or less, 2500 ppm or less, 2000 ppm or less, 1500 ppm or less, 1000 ppm or less, 750 ppm or less, 500 ppm or less, 250 ppm or less, or 100 ppm or less).

The aqueous polymer solution can have a concentration of one or more synthetic (co)polymers (e.g., one or more acrylamide (co)polymers) ranging from any of the minimum values described above to any of the maximum values described above. For example, in some embodiments, the aqueous polymer solution can have a concentration of one or more synthetic (co)polymers (e.g., one or more acrylamide (co)polymers) of from 500 to 5000 ppm (e.g., from 500 to 3000 ppm, or from 500 to 1500 ppm).

In some embodiments, the aqueous polymer solution can be an aqueous unstable colloidal suspension. In other embodiments, the aqueous polymer solution can be an aqueous stable solution.

In some embodiments, the aqueous polymer solution can have a filter ratio of 1.5 or less (e.g., 1.45 or less, 1.4 or less, 1.35 or less, 1.3 or less, 1.25 or less, 1.2 or less, 1.15 or less, 1.1 or less, or less than 1.05) at 15 psi using a 1.2 μm filter. In some embodiments, the aqueous polymer solution can have a filter ratio of greater than 1 (e.g., at least 1.05, at least 1.1, at least 1.15, at least 1.2, at least 1.25, at least 1.3, at least 1.35, at least 1.4, or at least 1.45) at 15 psi using a 1.2 μm filter.

The aqueous polymer solution can a filter ratio at 15 psi using a 1.2 μm filter ranging from any of the minimum values described above to any of the maximum values described above. For example, in some embodiments, the aqueous polymer solution can have a filter ratio of from 1 to 1.5 (e.g., from 1.1 to 1.4, or from 1.1 to 1.3) at 15 psi using a 1.2 μm filter.

In certain embodiments, the aqueous polymer solution can have a viscosity based on shear rate, temperature, salinity, polymer concentration, and polymer molecular weight. In some embodiments, the aqueous polymer solution can have a viscosity of from 2 cP to 100 cP, where the 2 cP to 100 cP is an output using the ranges in the following table:

| | |
|---|---|
| Polymer viscosity (cP) | 2~100 |
| Shear rate (1/sec) | 0.1~1000 |
| Temperature (° C.) | 1~120 |
| Salinity (ppm) | 0~250,000 |
| Polymer concentration (ppm) | 50~15,000 |
| Polymer molecular weight (Dalton) | 2M~26M |

In some embodiments, the aqueous polymer solution can have a viscosity of from 25 cP to 35 cP at 30° C. In some embodiments, the aqueous polymer solution can have a viscosity of greater than 10 cP at 40° C. In certain embodiments, the aqueous polymer solution can have a viscosity of from 20 cP to 30 cP at 40° C.

In some embodiments, when the LP composition is combined with an aqueous fluid, providing an aqueous polymer solution having from 50 to 15,000 ppm, from 500 to 5,000 ppm, or from 500 to 3000 ppm, active polymer, the aqueous polymer solution has a viscosity of at least 20 cP at 40° C., and a filter ratio (FR) (1.2 micron filter) of 1.5 or less. In certain embodiments, when the LP composition is combined with in an aqueous fluid, providing an aqueous polymer solution having from 50 to 15,000 ppm, from 500 to 5000 ppm, or from 500 to 3000 ppm, active polymer, the aqueous polymer solution has a viscosity of at least 20 cP at 30° C., and a filter ratio (FR) (1.2 micron filter) of 1.5 or less.

In some cases, combining an LP composition with an aqueous fluid can comprise inverting the LP composition in an aqueous fluid to provide the aqueous polymer solution. In these embodiments, the aqueous polymer solution can be said to be an "inverted polymer solution." As used herein, "inverted" refers to the point at which the viscosity of the aqueous polymer solution has substantially reached a consistent viscosity. In practice, this may be determined for example by measuring viscosity of the aqueous polymer solution periodically over time and when three consecutive measurements are within the standard of error for the measurement, then the composition is considered inverted. In some embodiments, inversion of the LP forms an inverted polymer solution in 30 minutes or less (e.g., 15 minutes or less, 10 minutes or less, 5 minutes or less, or less).

As described above, methods for preparing an aqueous polymer solution from an LP composition comprising one or more synthetic (co)polymers (e.g., one or more acrylamide (co)polymers) can comprise combining the LP composition with an aqueous fluid in a single stage mixing process to provide an aqueous polymer solution having a concentration of one or more synthetic (co)polymers (e.g., one or more acrylamide (co)polymers) of from 50 to 15,000 ppm. The single stage mixing process can comprise applying a specific mixing energy of at least 0.10 kJ/kg to the LP composition and the aqueous fluid.

In some embodiments, the single stage mixing process can comprise applying a specific mixing energy of at least 0.10 kJ/kg (e.g., at least 0.15 kJ/kg, at least 0.20 kJ/kg, at least 0.25 kJ/kg, at least 0.30 kJ/kg, at least 0.35 kJ/kg, at least 0.40 kJ/kg, at least 0.45 kJ/kg, at least 0.50 kJ/kg, at least 0.55 kJ/kg, at least 0.60 kJ/kg, at least 0.65 kJ/kg, at least 0.70 kJ/kg, at least 0.75 kJ/kg, at least 0.80 kJ/kg, at least 0.85 kJ/kg, at least 0.90 kJ/kg, at least 0.95 kJ/kg, at least 1.00 kJ/kg, at least 1.05 kJ/kg, at least 1.10 kJ/kg, at least 1.15 kJ/kg, at least 1.20 kJ/kg, at least 1.25 kJ/kg, at least 1.30 kJ/kg, at least 1.35 kJ/kg, at least 1.40 kJ/kg, or at least 1.45 kJ/kg) to the LP composition and the aqueous fluid. In some embodiments, the single stage mixing process can comprise applying a specific mixing energy of 1.50 kJ/kg or less (e.g., 1.45 kJ/kg or less, 1.40 kJ/kg or less, 1.35 kJ/kg or less, 1.30 kJ/kg or less, 1.25 kJ/kg or less, 1.20 kJ/kg or less, 1.15 kJ/kg or less, 1.10 kJ/kg or less, 1.05 kJ/kg or less, 1.00 kJ/kg or less, 0.95 kJ/kg or less, 0.90 kJ/kg or less, 0.85 kJ/kg or less, 0.80 kJ/kg or less, 0.75 kJ/kg or less, 0.70 kJ/kg or less, 0.65 kJ/kg or less, 0.60 kJ/kg or less, 0.55 kJ/kg or less, 0.50 kJ/kg or less, 0.45 kJ/kg or less, 0.40 kJ/kg or less, 0.35 kJ/kg or less, 0.30 kJ/kg or less, 0.25 kJ/kg or less, 0.20 kJ/kg or less, or 0.15 kJ/kg or less) to the LP composition and the aqueous fluid.

The single stage mixing process can comprise applying a specific mixing energy to the LP composition and the aqueous fluid ranging from any of the minimum values described above to any of the maximum values described above. For example, in some embodiments, the single stage mixing process can comprise applying a specific mixing energy of from 0.10 kJ/kg to 1.50 kJ/kg (e.g., from 0.15 kJ/kg to 1.40 kJ/kg, from 0.15 kJ/kg to 1.20 kJ/kg) to the LP composition and the aqueous fluid.

The LP composition can be combined with an aqueous fluid in a batch process or a continuous process. In certain embodiments, the The LP composition is combined with an aqueous fluid in a continuous process. For example, the LP composition can be combined with an aqueous fluid as a continuous process to produce a fluid stream for injection into a hydrocarbon-bearing formation. A continuous process is a process that can be effected without the need to be intermittently stopped or slowed. For example, continuous processes can meet one or more of the following criteria: (a) materials for forming the aqueous polymer solution (e.g., the LP composition and the aqueous fluid) are fed into the system in which the aqueous polymer solution is produced at the same rate as the aqueous polymer solution is removed from the system; (b) the nature of the composition(s) introduced to the system in which the aqueous polymer solution is produced is a function of the composition(s) position with the process as it flows from the point at which the composition(s) are introduced to the system to the point at which the aqueous polymer solution is removed from the system; and/or (c) the quantity of aqueous polymer solution produced is a function of (i) the duration for which the process is operated and (ii) the throughput rate of the process.

As discussed above, methods for preparing an aqueous polymer solution from an LP composition can comprise combining the LP composition with an aqueous fluid in a single stage mixing process. As used herein, the phase "single stage mixing process" refers to mixing processes where an LP composition and an aqueous fluid are combined in their final proportions either before mixing or within a first mixer, such that the fluid exiting the first mixer includes all components of the final aqueous polymer solution at their final concentration. Optionally, the fluid exiting the first mixer can undergo additional mixing steps; however, additional volumes of the LP composition or the aqueous fluid are not added once the fluid exits the first mixer. In this context, single stage mixing processes can be distinguished from conventional dual-stage and multistage mixing processes commonly used to prepare aqueous polymer solutions. Dual-stage and multistage mixing processes generally involve the combination of an LP composition and an aqueous fluid either before mixing or within a first mixer to produce a concentrated composition, which must then be diluted with additional aqueous fluid after leaving the first mixer to produce a fluid that includes all of the components of the final aqueous polymer solution at their final concentrations.

The single stage mixing process can comprise a single mixing step, or a plurality of mixing steps (i.e., two or more steps). In single stage mixing processes that comprise a single mixing step, an LP composition and an aqueous fluid are combined in their final proportions (either before mixing or within a first mixer), mixed within a first mixer, and exit the first mixer as an aqueous polymer solution. For example, a polymer feed stream comprising the LP composition can be combined (e.g., in a fixed ratio) with an aqueous fluid stream upstream of or within an in-line mixer. The combined fluid stream can then pass through the in-line mixer, emerging as the aqueous polymer solution. In some embodiments, the in-line mixer can have a mixer inlet and a mixer outlet, and the difference in pressure between the mixer inlet and the mixer outlet can be from 15 psi to 400 psi (e.g., from 15 psi to 150 psi, from 15 psi to 100 psi, or from 15 psi to 75 psi).

An example system for the preparation of an aqueous polymer solution in a single mixing step is illustrated schematically in FIG. 1. As shown in FIG. 1, a pump 102 can be used to inject a stream of the LP composition 104 into a line 106 carrying the aqueous fluid stream. The combined fluid stream can then pass through an in-line mixer 108 having a mixer inlet 110 and a mixer outlet 112, emerging as the aqueous polymer solution. The pressure drop through the in-line mixer 108 ($\Delta p$) can be from 15 psi to 400 psi (e.g., from 15 psi to 150 psi, from 15 psi to 100 psi, or from 15 psi to 75 psi).

In other embodiments, the single stage mixing process comprise two or more mixing steps (e.g., a first mixing step in which an LP composition and an aqueous fluid are combined in their final proportions (either before mixing or within a first mixer), mixed within a first mixer, and exit the first mixer as a partially mixed aqueous polymer solution; and one or more additional mixing steps in which the partially mixed aqueous polymer solution is mixed within one or more additional mixers to produce the final aqueous polymer solution). For example, the single stage mixing process can comprise two, three, four, five, or more consecutive mixing steps. In certain cases, the single stage mixing process can comprise two mixing steps.

Figure 2:
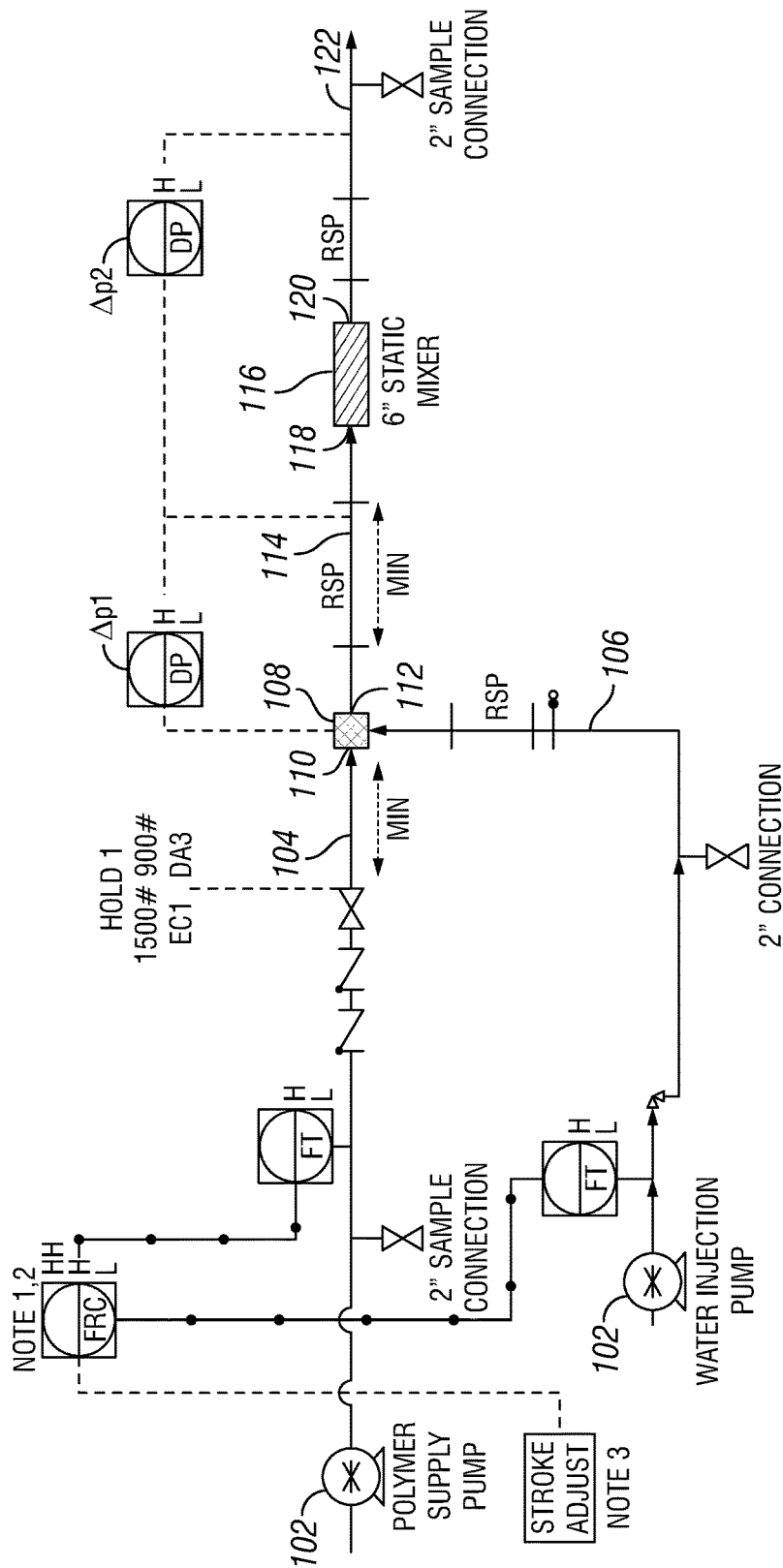
FIG. 2 is a process flow diagram schematically illustrating an example single stage mixing process for preparing an aqueous polymer solution. The example single stage mixing process comprises a two mixing steps.

An example system for the preparation of an aqueous polymer solution in two mixing steps is illustrated schematically in FIG. 2. As shown in FIG. 2, pumps 102 can be used to inject a stream of the LP composition 104 and a stream of aqueous fluid 106 through a first in-line mixer 108 having a first mixer inlet 110 and a first mixer outlet 112, emerging as a stream of partially mixed aqueous polymer solution 114. The partially mixed aqueous polymer solution can comprise a concentration of synthetic (co)copolymer of from 50 to 15,000 ppm (e.g., from 500 to 5000 ppm, or from 500 to 3000 ppm). The pressure drop through the first in-line mixer 108 ($\Delta p1$) can be from 15 psi to 400 psi (e.g., from 15 psi to 150 psi, from 15 psi to 100 psi, or from 15 psi to 75 psi). The stream of partially mixed aqueous polymer solution 114 can then pass through a second in-line mixer 116 having a second mixer inlet 118 and a second mixer outlet 120, emerging as a stream of aqueous polymer solution 122. The pressure drop through the second in-line mixer 116 ($\Delta p2$) can be from 15 psi to 400 psi (e.g., from 15 psi to 150 psi, from 15 psi to 100 psi, or from 15 psi to 75 psi). In some embodiments, the first in-line mixer can comprise a static mixer and the second in-line mixer can comprise a static mixer. In other examples, the first in-line mixer can comprise a static mixer and the second in-line mixer can comprise a dynamic mixer.

Figure 3:
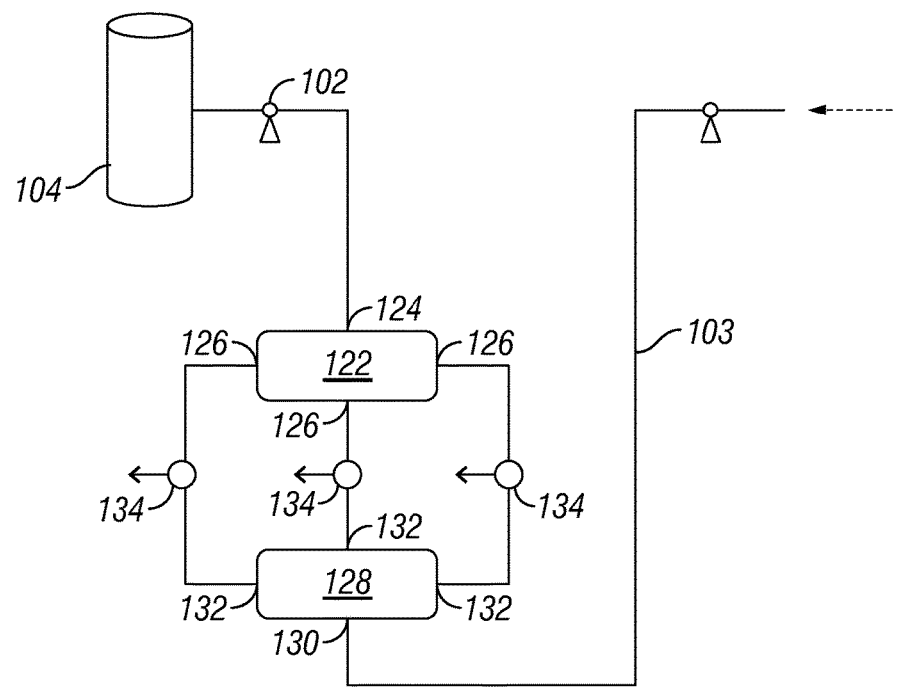
FIG. 3 is a process flow diagrams schematically illustrating an example single stage mixing process for preparing an aqueous polymer solution. The example single stage mixing process comprises a plurality of parallel mixing steps (e.g., parallel single mixing steps, parallel multiple mixing steps, or a combination thereof).

In some embodiments, the single stage mixing process for preparing an aqueous polymer solution can comprise parallel single mixing steps, parallel multiple mixing steps, or a combination thereof. An example system for the preparation of an aqueous polymer solutions using parallel mixing steps (e.g., parallel single mixing steps, parallel multiple mixing steps, or a combination thereof) is illustrated schematically in FIG. 3. As shown in FIG. 3, a pump 102 can be used to direct a stream of the LP composition 104 to LP manifold 122. LP manifold 122 can include an LP manifold inlet 124 through which the LP composition enters the LP manifold 122, and a plurality of LP manifold outlets 126 (in this example three manifold outlets) through which streams of the LP composition exit the LP manifold 122. The system can also include a main line 103 carrying an aqueous fluid stream to aqueous fluid manifold 128. The aqueous fluid manifold 128 can include an aqueous fluid manifold inlet 130 through which the aqueous fluid enters the aqueous fluid manifold 128, and a plurality of aqueous fluid manifold outlets 132 (in this example three manifold outlets) through which streams of the aqueous fluid exit the aqueous fluid manifold 128. Each stream of LP composition exiting LP manifold 122 can then be combined with a stream of aqueous fluid exiting the aqueous fluid manifold 128 in a different configuration of in-line mixers 134, thereby forming a plurality of streams of the aqueous polymer solution in parallel. Each configuration of in-line mixers 134 can include, independently, a single in-line mixer or a plurality of in-line mixers fluidly connected in series (e.g., as shown in FIGS. 1 and 2). By selecting appropriate configurations of in-line mixers 134, system for the preparation of an aqueous polymer solutions that employ parallel single steps, parallel multiple steps, or any combination thereof can be readily fabricated.

Figure 4A:
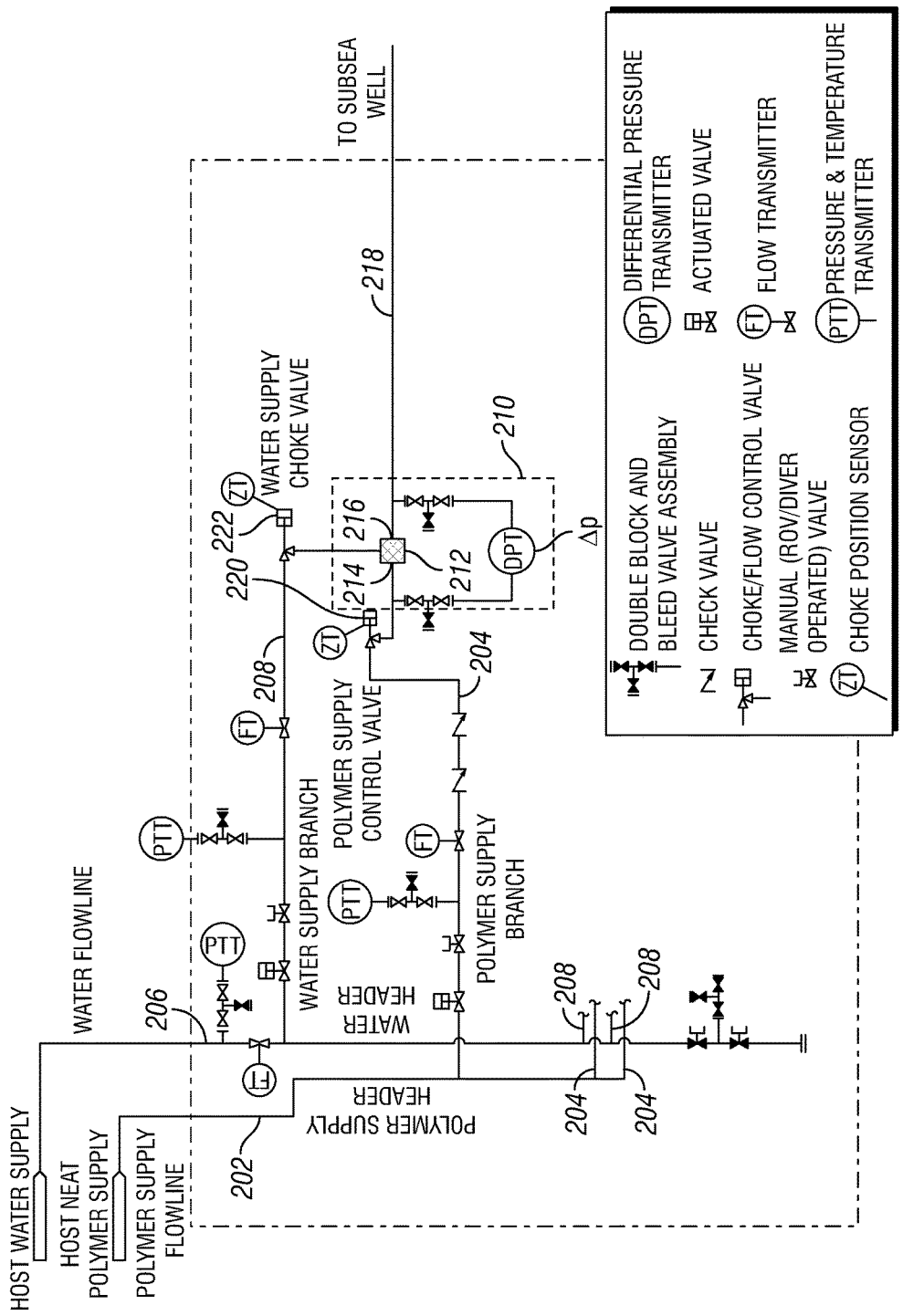
FIGS. 4A and 4B are process flow diagrams schematically illustrating example single stage mixing processes for preparing an aqueous polymer solution that comprise parallel single mixing steps carried out in a polymer mixing system (e.g., a subsea polymer mixing system).
Figure 4B:
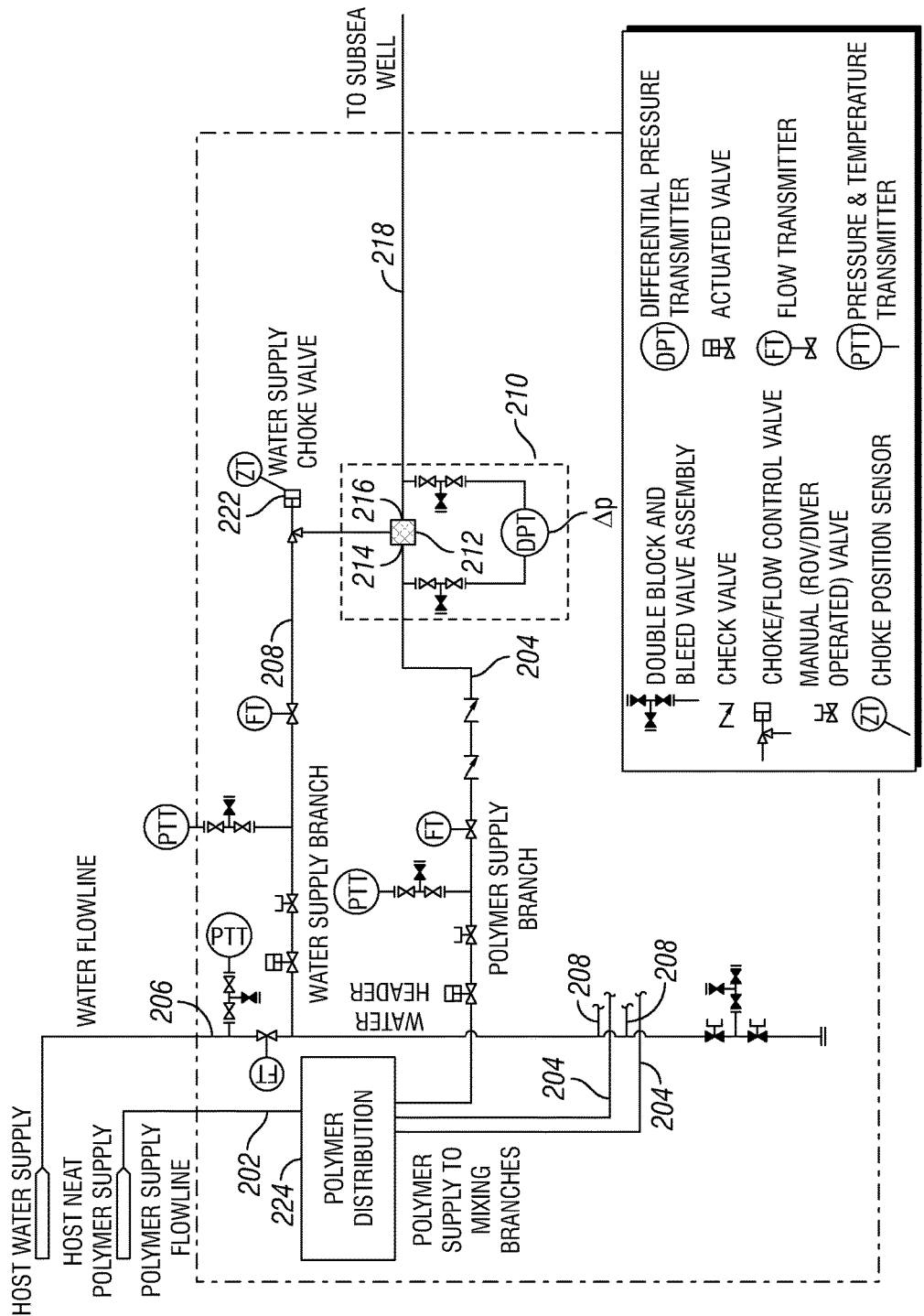

In some embodiments, the single stage mixing process can comprise parallel single mixing steps, parallel multiple mixing steps, or a combination thereof that are carried out in a polymer mixing system. In certain examples, the mixing system can be positioned subsea. Example polymer mixing systems that can be used to conduct a single stage mixing process comprising parallel single mixing steps are schematically illustrated in FIGS. 4A and 4B. As shown in FIG. 4A, the system can include a main polymer feed line 202 diverging to a plurality of polymer supply branches 204, a main aqueous feed line 206 diverging to a plurality of aqueous supply branches 208, and a plurality of mixer arrangements 210 (only one of which is illustrated in FIG. 4A for clarity). In other examples, as shown in FIG. 4B, the main polymer feed line 202 can be fluidly connected to the plurality of polymer supply branches 204 via a polymer distribution manifold 224. The polymer distribution manifold 224 can be configured to independently control the fluid flow rate through each of the plurality of polymer supply branches 204.

Referring again to FIG. 4A, each of the plurality of mixer arrangements 210 is supplied by one of the plurality of polymer supply branches 204 and one of the plurality of aqueous supply branches 208. Each of the plurality of mixer arrangements 210 can comprise an in-line mixer 212 having a mixer inlet 214 and a mixer outlet 216.

Optionally, the mixing system can further comprise a flow control valve 220 operably coupled to each the plurality of polymer supply branches 204 to control fluid flow rate through each of the plurality of polymer supply branches. Optionally, the mixing system can further comprise a flow control valve 222 operably coupled to each the plurality of aqueous supply branches 208 to control fluid flow rate through each of the plurality of aqueous supply branches. In certain embodiments, the mixing system can further comprise a flow control valve 220 operably coupled to each the plurality of polymer supply branches 204 to control fluid flow rate through each of the plurality of polymer supply branches, and a flow control valve 222 operably coupled to each the plurality of aqueous supply branches 208 to control fluid flow rate through each of the plurality of aqueous supply branches. Examples of suitable flow control valves include, for example, choke valves, chemical injection metering valves (CIMVs), and control valves.

Referring still to FIG. 4A, the LP composition and the aqueous fluid can be combined in the polymer mixing system by passing the LP polymer composition through the main polymer feed line 202 and the plurality of polymer supply branches 204 to reach each of the plurality of mixer arrangements 210. The LP polymer composition and the aqueous fluid can then flow through the in-line mixer 212 of each of the plurality of mixer arrangements 210 to provide a stream of the aqueous polymer solution 218. The pressure drop through the in-line mixer 212 ($\Delta p$) can be from 15 psi to 400 psi (e.g., from 15 psi to 150 psi, from 15 psi to 100 psi, or from 15 psi to 75 psi). In some embodiments, the LP polymer composition and the aqueous fluid can flow through the in-line mixer 212 of each of the plurality of mixer arrangements 210 at a velocity of from 1 m/s to 4 m/s.

Figure 5A:
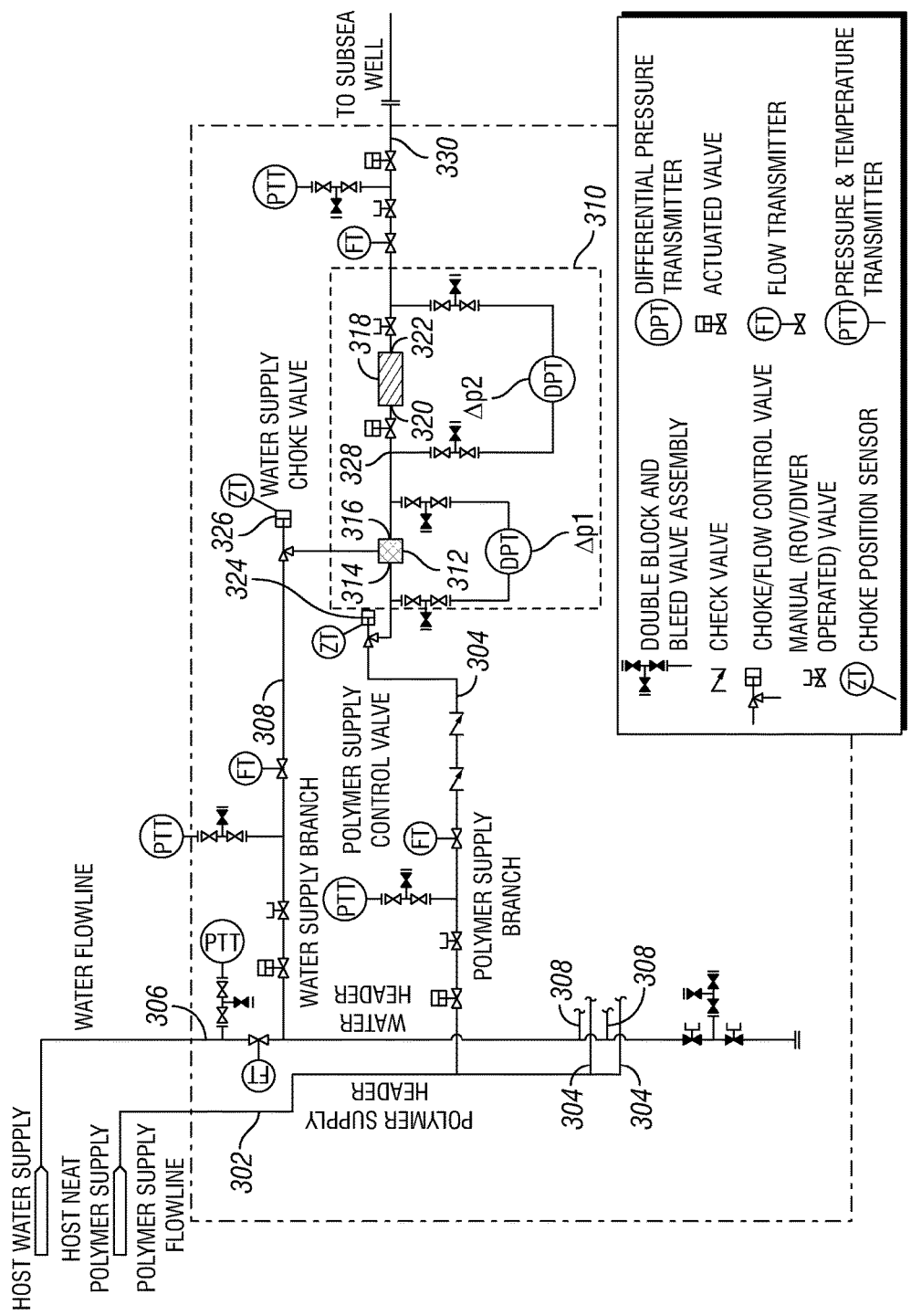
FIGS. 5A and 5B are process flow diagrams schematically illustrating example single stage mixing processes for preparing an aqueous polymer solution that comprise parallel multiple mixing steps carried out in a polymer mixing system (e.g., a subsea polymer mixing system).
Figure 5B:
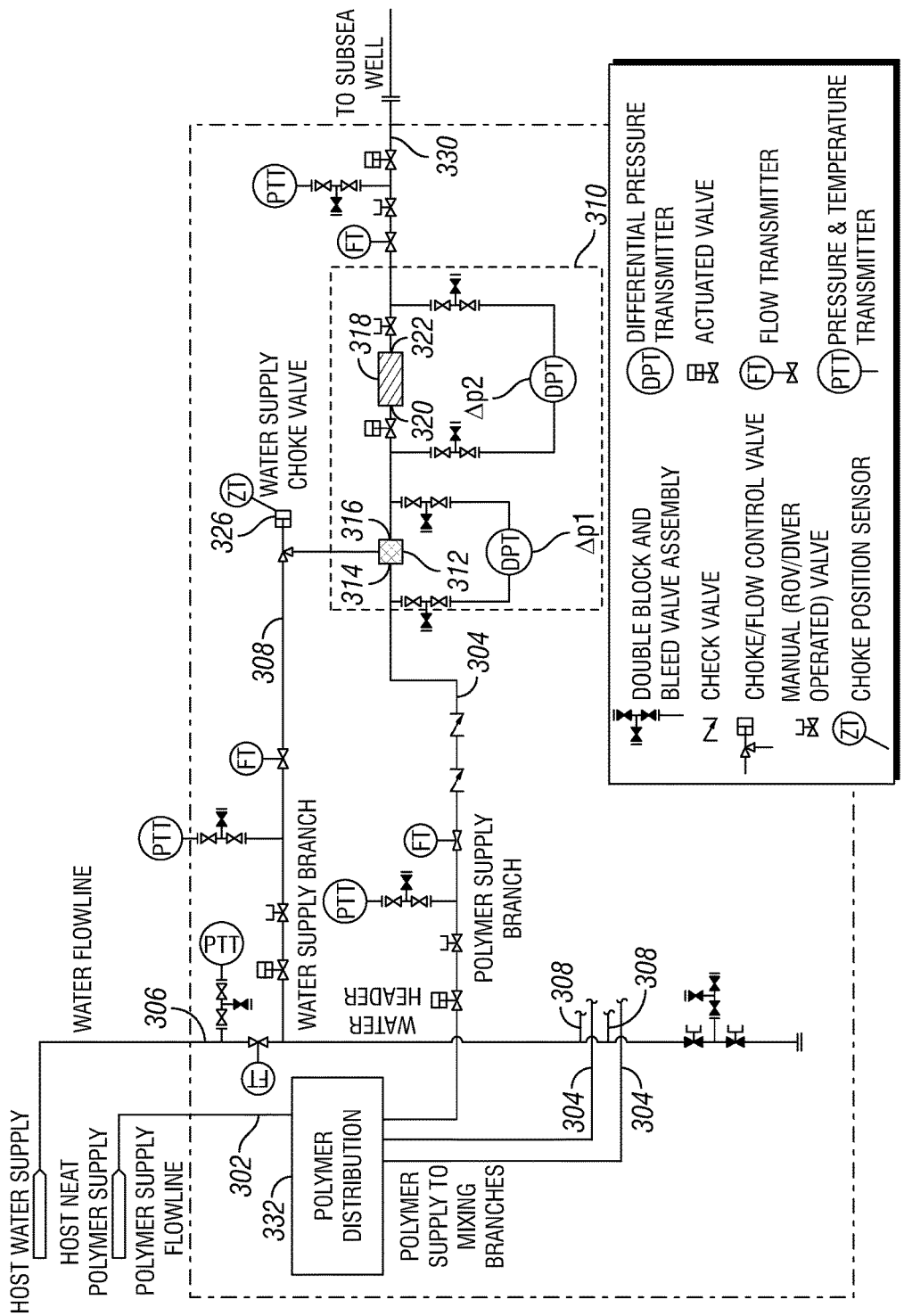

Example polymer mixing systems that can be used to conduct a single stage mixing process comprising parallel multiple mixing steps are schematically illustrated in FIGS. 5A and 5B. As shown in FIG. 5A, the system can include a main polymer feed line 302 diverging to a plurality of polymer supply branches 304, a main aqueous feed line 306 diverging to a plurality of aqueous supply branches 308, and a plurality of mixer arrangements 310 (only one of which is illustrated in FIG. 5A for clarity). In other examples, as shown in FIG. 5B, the main polymer feed line 302 can be fluidly connected to the plurality of polymer supply branches 304 via a polymer distribution manifold 332. The polymer distribution manifold 332 can be configured to independently control the fluid flow rate through each of the plurality of polymer supply branches 304.

Referring again to FIG. 5A, each of the plurality of mixer arrangements 310 is supplied by one of the plurality of polymer supply branches 304 and one of the plurality of aqueous supply branches 308. Each of the plurality of mixer arrangements 310 can comprise a first in-line mixer 312 having a first mixer inlet 314 and a first mixer outlet 316 in series with a second in-line mixer 318 having a second mixer inlet 320 and a second mixer outlet 322.

Optionally, the mixing system can further comprise a flow control valve 324 operably coupled to each the plurality of polymer supply branches 304 to control fluid flow rate through each of the plurality of polymer supply branches. Optionally, the mixing system can further comprise a flow control valve 326 operably coupled to each the plurality of aqueous supply branches 308 to control fluid flow rate through each of the plurality of aqueous supply branches. In certain embodiments, the mixing system can further comprise a flow control valve 324 operably coupled to each the plurality of polymer supply branches 304 to control fluid flow rate through each of the plurality of polymer supply branches, and a flow control valve 326 operably coupled to each the plurality of aqueous supply branches 308 to control fluid flow rate through each of the plurality of aqueous supply branches. Examples of suitable flow control valves include, for example, choke valves, chemical injection metering valves (CIMVs), and control valves.

Referring still to FIG. 5A, the LP composition and the aqueous fluid can be combined in the polymer mixing system by passing the LP polymer composition through the main polymer feed line 302 and the plurality of polymer supply branches 304 to reach each of the plurality of mixer arrangements 310. The LP polymer composition and the aqueous fluid can then flow through the through a first in-line mixer 312 having a first mixer inlet 314 and a first mixer outlet 316, emerging as a stream of partially mixed aqueous polymer solution 328. The partially mixed aqueous polymer solution can comprise a concentration of synthetic (co)copolymer of from 50 to 15,000 ppm (e.g., from 500 to 5000 ppm, or from 500 to 3000 ppm). The pressure drop through the first in-line mixer 312 ($\Delta p1$) can be from 15 psi to 400 psi (e.g., from 15 psi to 150 psi, from 15 psi to 100 psi, or from 15 psi to 75 psi). In some embodiments, the LP polymer composition and the aqueous fluid can flow through the first in-line mixer 312 of each of the plurality of mixer arrangements 310 at a velocity of from 1 m/s to 4 m/s. The stream of partially mixed aqueous polymer solution 328 can then pass through a second in-line mixer 318 having a second mixer inlet 320 and a second mixer outlet 322, emerging as a stream of aqueous polymer solution 330. The pressure drop through the second in-line mixer 318 ($\Delta p2$)

can be from 15 psi to 400 psi (e.g., from 15 psi to 150 psi, from 15 psi to 100 psi, or from 15 psi to 75 psi). In some embodiments, the partially mixed aqueous polymer solution 328 can flow through the second in-line mixer 318 of each of the plurality of mixer arrangements 310 at a velocity of from 1 m/s to 4 m/s. In some embodiments, the first in-line mixer can comprise a static mixer and the second in-line mixer can comprise a static mixer. In other examples, the first in-line mixer can comprise a static mixer and the second in-line mixer can comprise a dynamic mixer.

Any suitable in-line mixer(s) can be used in conjunction with the methods and systems described above. Each in-line mixer can be a dynamic mixer or a static mixer. Suitable dynamic mixers, which involve mechanical agitation of one type or another, are known in the art, and include impeller mixers, turbine mixers, rotor-stator mixers, colloid mills, pumps, and pressure homogenizers. In certain embodiment, the in-line mixer(s) can comprise a dynamic mixer such as an electrical submersible pump, hydraulic submersible pump, or a progressive cavity pump. In certain embodiments, the in-line mixer(s) can comprise static mixers. Static mixers are mixers that mix fluids in flow without the use of moving parts. Static mixers are generally constructed from a series of stationary, rigid elements that form intersecting channels to split, rearrange and combine component streams resulting in one homogeneous fluid stream. Static mixers provide simple and efficient solutions to mixing and contacting problems. More affordable than dynamic agitator systems, static mixing units have a long life with minimal maintenance and low pressure drop. Static mixers can be fabricated from metals and/or plastics to fit pipes and vessels of virtually any size and shape. In some cases, the static mixer can comprise a region of pipe, for example a serpentine region of pipe that facilitates mixing.

The aqueous fluid combined with the LP composition can comprise from 0 to 250,000 ppm; 15,000 to 160,000 ppm; from 15,000 to 100,000 ppm; from 10,000 to 50,000 ppm; from 15,000 to 50,000 ppm; from 30,000 to 40,000 ppm; from 10,000 to 25,000 ppm; from 10,000 to 20,000 ppm; or from 15,000 to 16,000 ppm total dissolved solids (tds). In an example embodiment, the aqueous fluid can comprise a brine having about 15,000 ppm tds. In one embodiment, the brine may be a synthetic seawater brine as illustrated in the table below.

| Composition of an Example Synthetic Seawater Brine ||
| Ions (ppm) | Synthetic Seawater Brine |
| --- | --- |
| Na+ | 10800 |
| K+ | 400 |
| Ca++ | 410 |
| Mg++ | 1280 |
| Cl- | 19400 |
| TDS | 32290 |

The aqueous fluid combined with the LP compositions can comprise produced reservoir brine, reservoir brine, sea water, fresh water, produced water, water, saltwater (e.g. water containing one or more salts dissolved therein), brine, synthetic brine, synthetic seawater brine, or any combination thereof. Generally, the aqueous fluid can comprise water from any readily available source, provided that it does not contain an excess of compounds that may adversely affect other components in the aqueous polymer solution or render the aqueous polymer solution unsuitable for its intended use (e.g., unsuitable for use in an oil and gas operation such as an EOR operation). If desired, aqueous fluids obtained from naturally occurring sources can be treated prior to use. For example, aqueous fluids can be softened (e.g., to reduce the concentration of divalent and trivalent ions in the aqueous fluid) or otherwise treated to adjust their salinity. In certain embodiments, the aqueous fluid can comprise soft brine or hard brine. In certain embodiments, the aqueous fluid can comprise produced reservoir brine, reservoir brine, sea water, or a combination thereof.

In one embodiment, seawater is used as the aqueous fluid, since off-shore production facilities tend to have an abundance of seawater available, limited storage space, and transportation costs to and from an off-shore site are typically high. If seawater is used as the aqueous fluid, it can be softened prior to the addition of the suspended polymer, thereby removing multivalent ions in the water (e.g., specifically $Mg^{2+}$ and $Ca^{2+}$).

In some embodiments, the aqueous fluid can have a temperature of from 1° C. to 120° C. In other embodiments, the aqueous fluid can have a temperature of from 45° C. to 95° C.

The methods described herein can be specifically adapted for use in a particular oil and gas operation. For example, in some embodiments, the processes for preparing aqueous polymer solutions described herein can be performed as a continuous process to produce a fluid stream for injection into a hydrocarbon-bearing formation.

In some cases, the in-line mixer (or one or more in-line mixers in the case of methods that include multiple mixing steps, parallel single mixing steps, or parallel multiple mixing steps) can be arranged downstream from pumping equipment at the surface (e.g., on land, on a vessel, or on an offshore platform) that pumps the LP composition and the aqueous fluid. In certain embodiments, the in-line mixer (or one or more in-line mixers in the case of methods that include multiple mixing steps, parallel single mixing steps, or parallel multiple mixing steps) can be positioned at or near the wellhead of a well. In certain embodiments, the in-line mixer can be arranged downhole. In certain embodiments, the in-line mixer (or one or more in-line mixers in the case of methods that include multiple mixing steps, parallel single mixing steps, or parallel multiple mixing steps) can be positioned subsurface, subsea, or downhole.

In certain embodiments, the hydrocarbon-bearing formation can be a subsea reservoir. In these embodiments, the in-line mixer (or one or more in-line mixers in the case of methods that include multiple mixing steps, parallel single mixing steps, or parallel multiple mixing steps) can be arranged downstream from pumping equipment at the surface (e.g., on shore, on a vessel, or on an offshore platform) that pumps the LP composition and/or the aqueous fluid. In certain embodiments, the in-line mixer (or one or more in-line mixers in the case of methods that include multiple mixing steps, parallel single mixing steps, or parallel multiple mixing steps) can be positioned subsea. Thus, depending on the oil and gas operation, for example, an in-line mixer can be positioned on the surface, subsurface, subsea, or downhole.

As discussed above, the aqueous polymer solutions described herein can be used oil and gas operations, such as EOR operations. For example, the aqueous polymer solutions described above can be used in polymer flooding operations. In some cases, the aqueous polymer solution further includes one or more additional agents to facilitate hydrocarbon recovery. For example, the aqueous polymer solution can further include a surfactant, an alkalinity agent, a co-solvent, a chelating agent, or any combination thereof.

As such, the aqueous polymer solution can be used in polymer (P), alkaline-polymer (AP), surfactant-polymer (SP), and/or in alkaline-surfactant-polymer (ASP)-type EOR operations. When present, these additional components can be incorporated into the aqueous fluid prior to combination with the LP composition, such that the resulting aqueous polymer solution formed by combination of the aqueous fluid and the LP composition includes one or more of these additional components. Likewise, these additional components can also be incorporated to the LP composition prior to combination with the aqueous fluid, such that the resulting aqueous polymer solution formed by combination of the aqueous fluid and the LP composition includes one or more of these additional components. Alternatively, these additional components can be incorporated to the aqueous polymer solutions following combination with the LP composition.

For chemical enhanced oil recovery (CEOR) operations, the LP composition can be combined with an effective amount of aqueous fluid to provide an aqueous polymer solution (e.g., which can serve as an injection stream) with a target hydrated polymer concentration and particle size. The target concentration varies according to the type of polymer employed, as well as the characteristics of the reservoir, e.g., petrophysical rock properties, reservoir fluid properties, reservoir conditions such as temperature, permeability, water compositions, mineralogy and/or reservoir location, etc. In some cases, the aqueous polymer solutions described herein are suitable for use in reservoirs with a permeability of from 10 millidarcy to 40,000 millidarcy.

The hydrated polymer molecules in the aqueous polymer solution can have a particle size (radius of gyration) ranging from 0.01 to 10 μm in one embodiment. One reservoir characteristic is the median pore throats, which correspond to the permeability of the reservoirs. Depending on the reservoir, the median pore throats in reservoirs may range from 0.01 μm to several hundred micrometers. Since the size of hydrated polymers in water range from 0.01 micrometer to several micrometers depending on the species, molecules, and reservoir conditions, in one embodiment, appropriate polymers are selected for LP composition to afford an aqueous polymer solution where the particle size of the hydrated polymer is <10% of the median pore throat parameters. This can allow the hydrated polymer particles to flow through the porous medium in an uninhibited manner. In another embodiment, the hydrated polymer particles have an average particle size ranging from 2 to 8% of the median pore throat size.

Surfactants can be included to lower the interfacial tension between the oil and water phase to less than about 10-2 dyne/cm (for example) and thereby recover additional oil by mobilizing and solubilizing oil trapped by capillary forces. Examples of surfactants that can be utilized include, but are not limited to, anionic surfactants, cationic surfactants, amphoteric surfactants, non-ionic surfactants, or a combination thereof. Anionic surfactants can include sulfates, sulfonates, phosphates, or carboxylates. Such anionic surfactants are known and described in the art in, for example, U.S. Pat. No. 7,770,641, incorporated herein by reference in its entirety. Examples of specific anionic surfactants include internal olefin sulfonates, isomerized olefin sulfonates, alkyl aryl sulfonates, medium alcohol (C10 to C17) alkoxy sulfates, alcohol ether [alkoxy] carboxylates, and alcohol ether [alkoxy] sulfates. Example cationic surfactants include primary, secondary, or tertiary amines, or quaternary ammonium cations. Example amphoteric surfactants include cationic surfactants that are linked to a terminal sulfonate or carboxylate group. Example non-ionic surfactants include alcohol alkoxylates such as alkylaryl alkoxy alcohols or alkyl alkoxy alcohols. Other non-ionic surfactants can include alkyl alkoxylated esters and alkyl polyglycosides. In some embodiments, multiple non-ionic surfactants such as non-ionic alcohols or non-ionic esters are combined. As a skilled artisan may appreciate, the surfactant(s) selection may vary depending upon such factors as salinity, temperature, and clay content in the reservoir.

Suitable alkalinity agents include basic, ionic salts of alkali metals or alkaline earth metals. Alkalinity agents can be capable of reacting with an unrefined petroleum acid (e.g. the acid or its precursor in crude oil (reactive oil)) to form soap (a surfactant which is a salt of a fatty acid) in situ. These in situ generated soaps can serve as a source of surfactants causing a reduction of the interfacial tension of the oil in water emulsion, thereby reducing the viscosity of the emulsion. Examples of alkali agents include alkali metal hydroxides, carbonates, or bicarbonates, including, but not limited to, sodium carbonate, sodium bicarbonate, sodium hydroxide, potassium hydroxide, sodium silicate, tetrasodium EDTA, sodium metaborate, sodium citrate, and sodium tetraborate. In some cases, the alkalinity agent can be present in the inverted polymer solution in an amount of from 0.3 to 5.0 weight percent of the solution, such as 0.5 to 3 weight percent.

The aqueous polymer solution can optionally include a co-solvent. A "co-solvent" refers to a compound having the ability to increase the solubility of a solute in the presence of an unrefined petroleum acid. In embodiments, the co-solvents provided herein have a hydrophobic portion (alkyl or aryl chain), a hydrophilic portion (e.g. an alcohol) and optionally an alkoxy portion. Co-solvents as provided herein include alcohols (e.g. $C_1$-$C_6$ alcohols, $C_1$-$C_6$ diols), alkoxy alcohols (e.g. $C_1$-$C_6$ alkoxy alcohols, $C_1$-$C_6$ alkoxy diols, and phenyl alkoxy alcohols), glycol ether, glycol and glycerol. The term "alcohol" is used according to its ordinary meaning and refers to an organic compound containing an —OH groups attached to a carbon atom. The term "diol" is used according to its ordinary meaning and refers to an organic compound containing two —OH groups attached to two different carbon atoms. The term "alkoxy alcohol" is used according to its ordinary meaning and refers to an organic compound containing an alkoxy linker attached to a —OH group.

The aqueous polymer solution can optionally include a chelant or chelating agent. Chelants may be used to complex with the alkali metal and soften brines. If desired, the salinity of the aqueous polymer solution may be optimized for a particular subterranean reservoir by adjusting a number of chelating ligands in the chelating agent, such as alkoxylate groups if the chelant is EDTA ("ethylenediaminetetraacetic acid"). EDTA is just one example of a suitable chelant, another example of a chelant is MGDA ("methylglycinediacetic acid").

If desired, other additives can also be included in aqueous polymer solutions described herein, such as biocides, oxygen scavengers, and corrosion inhibitors.

Variants of the methods described above can also be used to prepare aqueous polymer solutions that include biopolymers, such as polysaccharides (e.g., xanthan gum, scleroglucan, guar gum, derivatives thereof including one or more chemical modifications to the backbone of these polymers, and blends thereof). These methods can comprise providing a liquid polymer (LP) composition comprising one or more biopolymers; and combining the LP composition with an aqueous fluid in a single stage mixing process described above to provide the aqueous polymer solution, wherein the aqueous polymer solution comprises a concentration of biopolymer of from 50 to 15,000 ppm; and wherein the aqueous polymer solution has a filter ratio of 1.5 or less at 15 psi using a 1.2 µm filter.

In methods used to prepare aqueous polymer solutions that include biopolymers, the single stage mixing process can comprise applying a specific mixing energy of at least 0.10 kJ/kg to the LP composition and the aqueous fluid.

In some of these embodiments, the single stage mixing process can comprise applying a specific mixing energy of at least 0.10 kJ/kg (e.g., at least 0.25 kJ/kg, at least 0.50 kJ/kg, at least 0.75 kJ/kg, at least 1.0 kJ/kg, at least 1.5 kJ/kg, at least 2.0 kJ/kg, at least 2.5 kJ/kg, at least 3.0 kJ/kg, at least 3.5 kJ/kg, at least 4.0 kJ/kg, at least 4.5 kJ/kg, at least 5.0 kJ/kg, at least 6.0 kJ/kg, at least 7.0 kJ/kg, at least 8.0 kJ/kg, at least 9.0 kJ/kg, at least 10 kJ/kg, at least 11 kJ/kg, at least 12 kJ/kg, at least 13 kJ/kg, at least 14 kJ/kg, at least 15 kJ/kg, at least 16 kJ/kg, at least 17 kJ/kg, at least 18 kJ/kg, or at least 19 kJ/kg) to the LP composition and the aqueous fluid. In some of these embodiments, the single stage mixing process can comprise applying a specific mixing energy of 20 kJ/kg or less (e.g., 19 kJ/kg or less, 18 kJ/kg or less, 17 kJ/kg or less, 16 kJ/kg or less, 15 kJ/kg or less, 14 kJ/kg or less, 13 kJ/kg or less, 12 kJ/kg or less, 11 kJ/kg or less, 10 kJ/kg or less, 9.0 kJ/kg or less, 8.0 kJ/kg or less, 7.0 kJ/kg or less, 6.0 kJ/kg or less, 5.0 kJ/kg or less, 4.5 kJ/kg or less, 4.0 kJ/kg or less, 3.5 kJ/kg or less, 3.0 kJ/kg or less, 2.5 kJ/kg or less, 2.0 kJ/kg or less, 1.5 kJ/kg or less, 1.0 kJ/kg or less, 0.75 kJ/kg or less, 0.50 kJ/kg or less, or 0.25 kJ/kg or less) to the LP composition and the aqueous fluid.

In some of these embodiments, the single stage mixing process can comprise applying a specific mixing energy to the LP composition and the aqueous fluid ranging from any of the minimum values described above to any of the maximum values described above. For example, in some of these embodiments, the single stage mixing process can comprise applying a specific mixing energy of from 0.10 kJ/kg to 20 kJ/kg (e.g., from 0.10 kJ/kg to 10 kJ/kg, from 1.0 kJ/kg to 20 kJ/kg, from 1.0 kJ/kg to 15 kJ/kg, from 1.0 kJ/kg to 10 kJ/kg, or from 5.0 kJ/kg to 15 kJ/kg) to the LP composition and the aqueous fluid.

Variants of the methods described above can also be used to prepare aqueous polymer solutions from solid polymer powders, such as solid polyacrylamide polymer powders. These methods can comprise combining the solid polymer powder with an aqueous fluid in a mixing process to provide the aqueous polymer solution, wherein the aqueous polymer solution comprises a concentration of polymer of from 50 to 15,000 ppm; and wherein the aqueous polymer solution has a filter ratio of 1.5 or less at 15 psi using a 1.2 µm filter.

In methods used to prepare aqueous polymer solutions from solid polymer powders, the mixing process can comprise applying a specific mixing energy of at least 1.0 kJ/kg to the solid polymer powder and the aqueous fluid.

In some of these embodiments, the mixing process can comprise applying a specific mixing energy of at least 1.0 kJ/kg (e.g., at least 1.25 kJ/kg, at least 1.5 kJ/kg, at least 2.0 kJ/kg, at least 2.5 kJ/kg, at least 3.0 kJ/kg, at least 3.5 kJ/kg, at least 4.0 kJ/kg, at least 4.5 kJ/kg, at least 5.0 kJ/kg, at least 6.0 kJ/kg, at least 7.0 kJ/kg, at least 8.0 kJ/kg, at least 9.0 kJ/kg, at least 10 kJ/kg, at least 11 kJ/kg, at least 12 kJ/kg, at least 13 kJ/kg, at least 14 kJ/kg, at least 15 kJ/kg, at least 16 kJ/kg, at least 17 kJ/kg, at least 18 kJ/kg, or at least 19 kJ/kg) to the solid polymer powder and the aqueous fluid. In some of these embodiments, the mixing process can comprise applying a specific mixing energy of 20 kJ/kg or less (e.g., 19 kJ/kg or less, 18 kJ/kg or less, 17 kJ/kg or less, 16 kJ/kg or less, 15 kJ/kg or less, 14 kJ/kg or less, 13 kJ/kg or less, 12 kJ/kg or less, 11 kJ/kg or less, 10 kJ/kg or less, 9.0 kJ/kg or less, 8.0 kJ/kg or less, 7.0 kJ/kg or less, 6.0 kJ/kg or less, 5.0 kJ/kg or less, 4.5 kJ/kg or less, 4.0 kJ/kg or less, 3.5 kJ/kg or less, 3.0 kJ/kg or less, 2.5 kJ/kg or less, 2.0 kJ/kg or less, 1.5 kJ/kg or less, or 1.25 kJ/kg or less) to the solid polymer powder and the aqueous fluid.

In some of these embodiments, the mixing process can comprise applying a specific mixing energy to the solid polymer powder and the aqueous fluid ranging from any of the minimum values described above to any of the maximum values described above. For example, in some of these embodiments, the mixing process can comprise applying a specific mixing energy of from 1.0 kJ/kg to 20 kJ/kg (e.g., from 1.0 kJ/kg to 15 kJ/kg, from 1.0 kJ/kg to 10 kJ/kg, from 1.25 kJ/kg to 20 kJ/kg, from 1.25 kJ/kg to 15 kJ/kg, from 1.25 kJ/kg to 10 kJ/kg, from 1.5 kJ/kg to 20 kJ/kg, from 1.5 kJ/kg to 15 kJ/kg, or from 1.5 kJ/kg to 10 kJ/kg) to the solid polymer powder and the aqueous fluid.

In some of these embodiments, the mixing process can comprise a single stage mixing process described herein. In some cases, the solid powder polymer can be a synthetic polymer, such as a polyacrylamide, a partially hydrolyzed polyacrylamide, a hydrophobically-modified associative polymer, a 2-acrylamido 2-methylpropane sulfonic acid or a salt thereof, an N-vinyl pyrrolidone, a polyacrylic acid, a polyvinyl alcohol, or a mixture thereof.

Methods of Use

The aqueous polymer solutions described herein can be used in a variety of oil and gas operations, including an EOR operation (e.g., an improved oil recovery (IOR) operation, a polymer flooding operation, an AP flooding operation, a SP flooding operation, an ASP flooding operation, a conformance control operation, or any combination thereof). Moreover, the aqueous polymer solutions described herein can be used in a variety of oil and gas operations, including a hydraulic fracturing operation, as a drag reducer that reduces friction during transportation of a fluid in a pipeline, or any combination thereof. Transportation of a fluid in a pipeline can refer to any movement of a fluid through a conduit or pipe. As such, transportation of a fluid in a pipeline includes, for example, the pipeline transport of fluids as well as passage of fluids through pipes such as wellbores during the course of an oil recovery operation. The aqueous polymer solutions can even be used in water treatment operations associated with oil and gas operations.

In one embodiment, the aqueous polymer solution can be used as an injection fluid. In another embodiment, the aqueous polymer solution can be included in an injection fluid. In another embodiment, aqueous inverted polymer solution can be used as a hydraulic fracturing fluid. In another embodiment, the aqueous polymer solution can be included in a hydraulic fracturing fluid. In another embodiment, the aqueous polymer solution can be used as a drag reducer that reduces friction during transportation of a fluid in a pipeline. In another embodiment, the aqueous polymer solution can be included in a drag reducer that reduces friction during transportation of a fluid in a pipeline. In short, in certain embodiments, the aqueous polymer solutions described herein can be used in hydrocarbon recovery.

Methods of hydrocarbon recovery can comprise providing a subsurface reservoir containing hydrocarbons therewithin; providing a wellbore in fluid communication with the subsurface reservoir; preparing an aqueous polymer solution using the methods described above; and injecting the aqueous polymer solution through the wellbore into the subsurface reservoir. For example, the subsurface reservoir can be a subsea reservoir and/or the subsurface reservoir can have a permeability of from 10 millidarcy to 40,000 millidarcy.

The wellbore in the second step can be an injection wellbore associated with an injection well, and the method can further comprise providing a production well spaced-apart from the injection well a predetermined distance and having a production wellbore in fluid communication with the subsurface reservoir. In these embodiments, injection of the aqueous polymer solution can increase the flow of hydrocarbons to the production wellbore.

In some embodiments, methods of hydrocarbon recovery can further include a recycling step. For example, in some embodiments, methods of hydrocarbon recovery can further comprise producing production fluid from the production well, the production fluid including at least a portion of the injected aqueous polymer solution; and combining the production fluid to with additional LP composition, for example, to form a second aqueous polymer solution. The second aqueous polymer solution can then be injected into at least one wellbore (e.g., an injection well, the same wellbore discussed in the second step or a different wellbore, etc.). Thus, in some embodiments, the aqueous polymer solution is included in an injection fluid.

The wellbore in the second step can be a wellbore for hydraulic fracturing that is in fluid communication with the subsurface reservoir. Thus, in one embodiment, the aqueous polymer solution injected in the fourth step functions as a drag reducer that reduces friction during injection in the fourth step. By doing so, the aqueous polymer solution is used as a drag reducer that reduces friction during transportation of a fluid (e.g., the hydraulic fracturing fluid) in a pipeline (e.g., the wellbore or components thereof). In another embodiment, the aqueous polymer solution is included in a hydraulic fracturing fluid.

By way of non-limiting illustration, examples of certain embodiments of the present disclosure are given below.

EXAMPLES

Methods and Materials

Brine Composition and Hydration.

A synthetic brine was used as base brine. The synthetic brine included the following: $Na^+$, $Ca^{2+}$, $Mg^{2+}$, $Cl^-$, and a TDS of about 15,000 ppm as shown in Table 1. Since the neat liquid polymer (LP) was provided as an oil-continuous polymer dispersion with an activity of 50%, the LP polymer was inverted and diluted to target concentration of 2000 ppm in the synthetic brine by mixing at 500 rpm using an overhead mixer. In the laboratory, 50% neat liquid polymer was inverted to 1% LP solution in the synthetic brine using the overhead mixer at 500 rpm for 2 hours. Then, the 1% inverted LP solution was diluted to the targeted 0.2% LP solution in the synthetic brine using the overhead mixer at 500 rpm for 2 hours to 24 hours. 50% neat liquid polymer was also directly inverted to the target concentration of 0.2% LP polymer in the synthetic brine using the overhead mixer for 3 hours to 24 hours.

TABLE 1

Composition of the synthetic seawater brine used in the examples.

| Ions (ppm) | Synthetic seawater brine |
| --- | --- |
| Na+ | 5,048 |
| Ca++ | 569 |
| Mg++ | 210 |
| Cl- | 9,403 |
| TDS | 15,230 |

Filter Ratio Test.

Polymer filter ratio tests were carried out to identify the effectiveness of the polymer mixing (hydration/dilutions) in the source brine and therefore provide an indication of how effectively that polymer can be injected through a porous medium without any plugging or retention. The filter ratio (FR) of the polymer solutions was determined using the standard procedure described, for example, in Koh, H. *Experimental Investigation of the Effect of Polymers on Residual Oil Saturation*. Ph.D. Dissertation, University of Texas at Austin, 2015; Levitt, D. *The Optimal Use of Enhanced Oil Recovery Polymers Under Hostile Conditions*. Ph.D. Dissertation, University of Texas at Austin, 2009; and Magbagbeola, O. A. Quantification of the Viscoelastic Behavior of High Molecular Weight Polymers used for Chemical Enhanced Oil Recovery. M. S. Thesis, University of Texas at Austin, 2008, each of which is hereby incorporated by reference in its entirety.

Briefly, a 300 ml solution of 2000 ppm inverted LP solution in synthetic brine was filtered through a 5.0 μm and 1.2 μm ISOPORE™ polycarbonate filter with a diameter of 47 mm at 15 psi (plus or minus 10% of 15 psi) pressure and ambient temperature (25° C.). As expressed in the formula below, the FR was calculated as the ratio of the time for 180 to 200 ml of the polymer solution to filter divided by the time for 60 to 80 ml of the polymer solution to filter.

$$FR = \frac{t200 \text{ ml} - t180 \text{ ml}}{t80 \text{ ml} - t60 \text{ ml}}$$

Ideally, a filtration ratio of 1.0 indicates that the polymer solution is homogeneous and hydrated so as to flow through accessible pore throats without any plugging. For the composition to qualify for further testing, the composition was required to exhibit a FR of less than or equal to 1.2 through both filters. As the 1.2 FR was a strict laboratory requirement for polymer qualification, clean, laboratory-grade filtered water was used when necessary.

Rheological Measurements.

For all polymers, the basic rheology in terms of viscosity versus concentration, viscosity versus shear rate, neat polymer viscosity were measured. Steady-state shear viscosities were measured in the range of 0.1 s-1 to 1000 s-1 at 25° C., and 31° C. using double-wall couette geometry with a TA Instruments ARES-G2 rheometer.

Long Term Injectivity Experiments.

Polymer injectivity tests were performed separately using 2000 ppm polymer solution in a 2000 mD Bentheimer sandstone at 31° C. Briefly, the cores were setup vertically with water being injected from the bottom. The initial permeability was measured with synthetic brine, followed by tracer tests to ensure that cores were acceptably homogeneous. On completion of the tracer tests, 2000 ppm polymer solution was injected at a rate of approximately 5 ft/day for more than 25 PV to establish plugging tendencies.

The differential pressure drop between inlet and outlet (i.e., across the whole core) was measured using Rosemount differential pressure transducers. In some cases, pressure taps near the inlet measured face plugging.

Oil Recovery Experiments.

Oil recovery experiments were performed using 2000 ppm LP using an approximately 5000 mD unconsolidated-sand pack at 31° C. The flow rate was set at 0.5 mL/min, corresponding to ~4 ft/day. The differential pressure drop between inlet and outlet was measured using Rosemount differential transducers. A viscous crude oil (80 cP at 31° C.) was selected in this experiment.

Polymer Loop Yard Tests.

Upon successful mixing and performance in laboratory scale, polymer loop yard tests were performed to validate larger scale mixing and performance at semi-field scale using multiple configurations of static mixers. Liquid polymer was mixed through a conventional two stage mixing process as well as a single stage mixing process. The performance of the inverted liquid polymers through static mixers was investigated by measuring FR, viscosity and short-term injectivity tests on-site.

Field Portable Measurement Unit (PMU).

A portable measurement unit (PMU) was used for on-site surveillance in field. The PMU was configured to measure polymer rheology, filterability and long-term core injectivity. Polymer rheology was measured using a series of capillary tubes with pressure measurements. Filterability was measured through a 1.2 um filter at 15 psi with pre-filtration to remove large oil droplets and suspended solids. Filterability was also measured without pre-filtration. Finally, long-term injectivity was measured using an epoxy-coated Bentheimer core with a pressure tap to determine face-plugging. The PMU allowed for native injection fluids to be monitored and analyzed under anaerobic conditions to ensure the project's success despite the challenges of being in a remote site.

Results and Discussion

Figure 7:
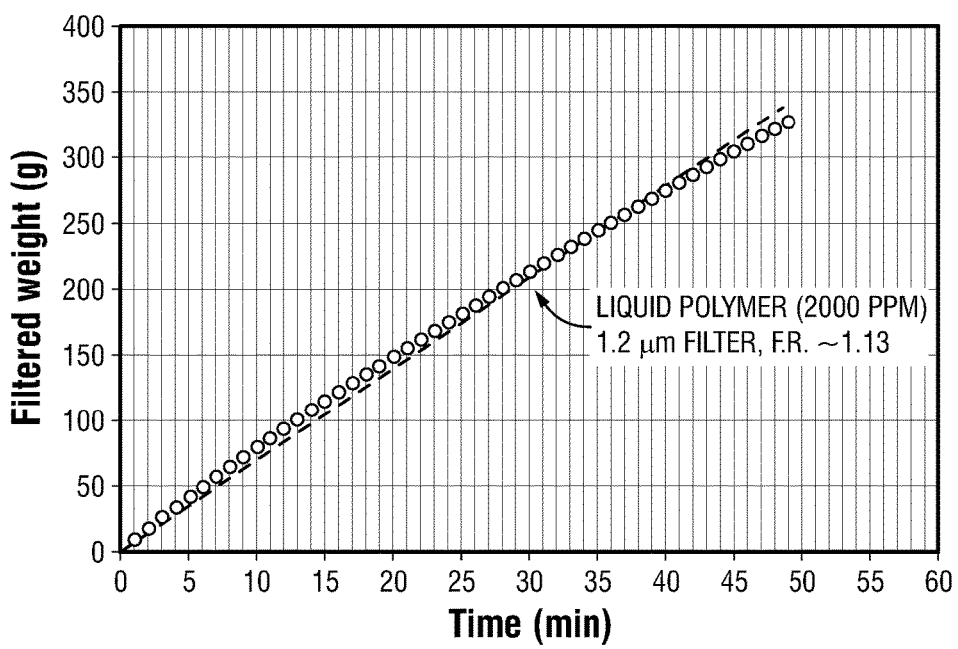
FIG. 7 is a plot of the filtration ratio test performed using a 1.2 micron filter for an inverted polymer solution. The inverted polymer solution (2000 ppm polymer) passes through 1.2 micron filter with a filter ratio of less than 1.2, which shows improved filterability of the inverted polymer solution.

FR Test:

FIG. 7 shows a plot of the FR test performed for an inverted polymer solution using a 1.2 micron filter with a diameter of 47 mm at 15 psi pressure and 25° C. temperature. As shown in FIG. 7 and Table 2, the inverted LP solution (2000 ppm polymer) passes through 1.2 micron filter with a FR of less than or equal to 1.5. More specifically, FIG. 7 illustrates a FR of 1.2 or less. Even more specifically, FIG. 7 illustrates a FR of 1.13. This result indicates the improved filterability of the inverted polymer solution.

Figure 8:
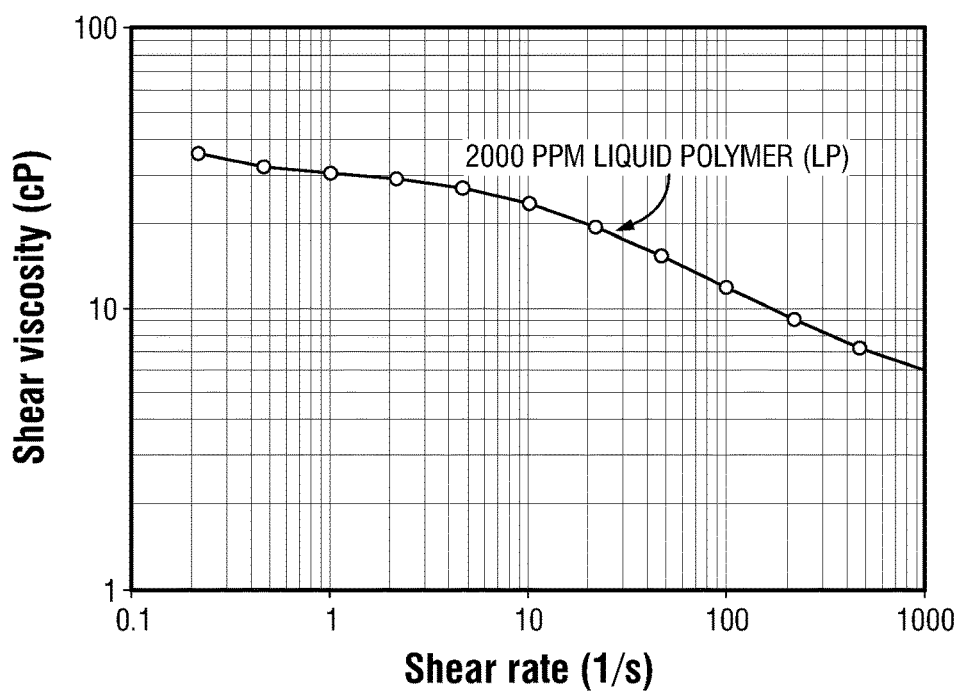
FIG. 8 is a viscosity plot in the wide range of shear rate for an inverted polymer solution (2000 ppm polymer in synthetic brine, measured at 31° C.). The viscosity of the inverted polymer solution shows a typical shear-thinning behavior in the wide range of shear rate. The viscosity is measured as 24 cP at 10 s-1 and 31° C.
Figure 9:
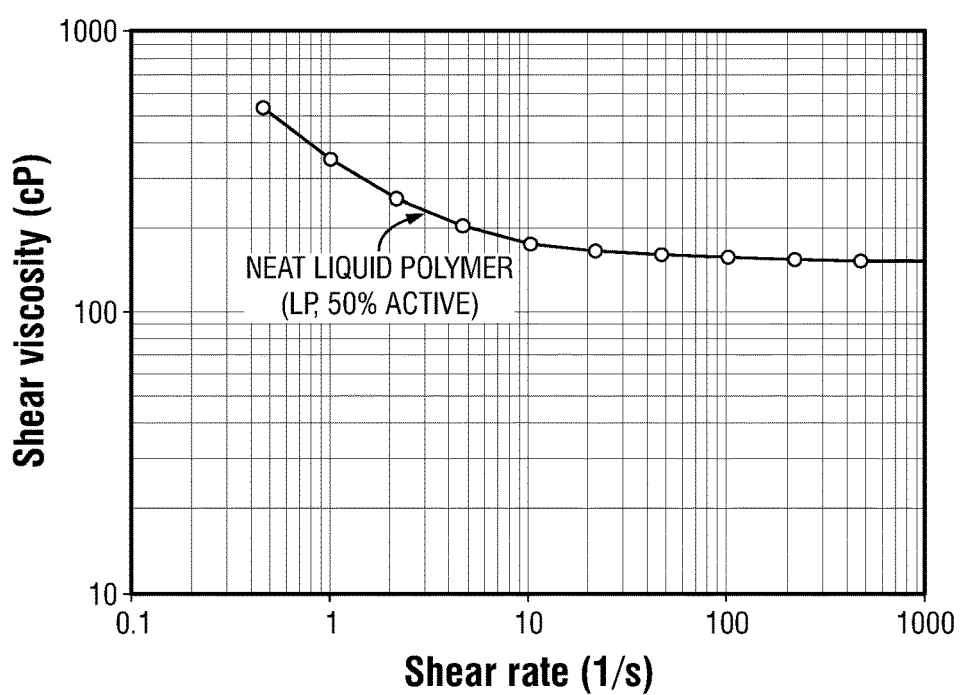
FIG. 9 is a viscosity plot in the wide range of shear rate for neat LP composition activity of the neat LP composition test here is 50% and the viscosity of LP is measured at 180 cP at 10 $s^{-1}$ and 25° C. Low viscosity with high activity makes the LP composition easy to handle in the field.

Viscosity Measurement:

FIG. 8 shows a viscosity plot for a wide range of shear rates for an inverted polymer solution (2000 ppm polymer in synthetic brine, measured at 31° C.). The viscosity of the inverted polymer solution illustrates a typical shear-thinning behavior in the wide range of shear rate. The viscosity is measured as 24 cP at 10 s-1 and 31° C.

Figure 6:
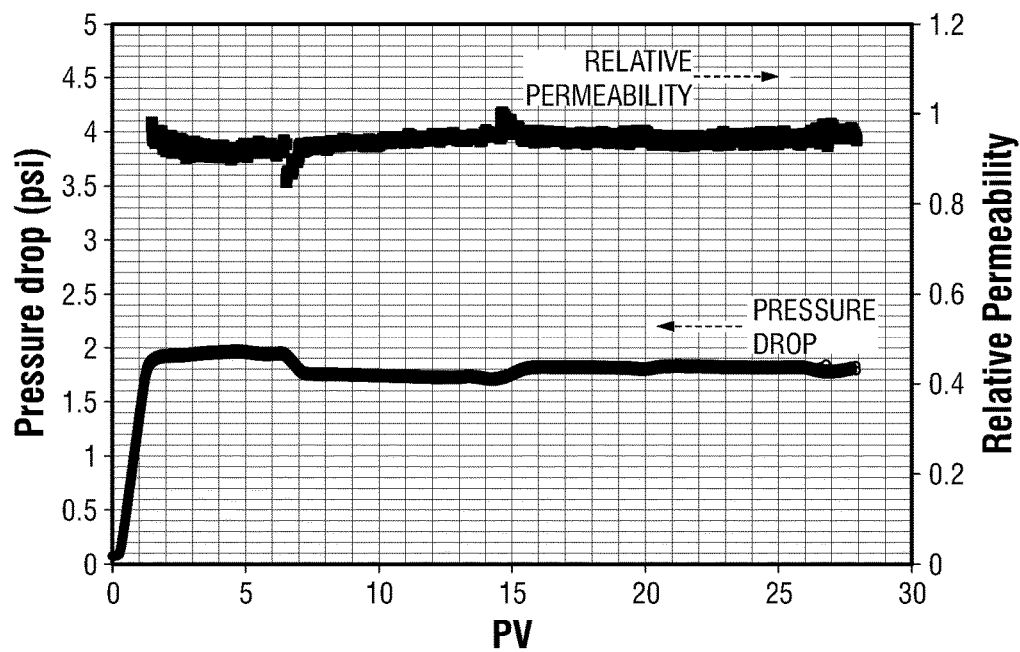
FIG. 6 is a plot of the pressure drop and relative permeability upon injection of an inverted polymer solution in a sandstone core. The steady pressure drop and steady relative permeability observed upon injection of the inverted polymer solution are consistent with no plugging of the sandstone core.

Injectivity Test:

The inverted polymer solution was injected into outcrop Bentheimer sandstones. The purpose of the polymer injection was to evaluate the injectivity of the inverted polymer solution in the porous medium. Around 30 PV of 2000 ppm LP polymer in synthetic brine was injected into Bentheimer sandstone at flow rate of 0.5 ml/min corresponding to 6 ft./day at the temperature of 31° C. As shown in FIG. 6, the pressure drop for the inverted polymer solution reaches steady-state after 2 pore volume (PV) which indicates no plugging. The corresponding relative permeability history is also plotted in FIG. 6. The relative permeability of the inverted polymer solution after 28 PV was ~1 which confirms core plugging.

Figure 10:
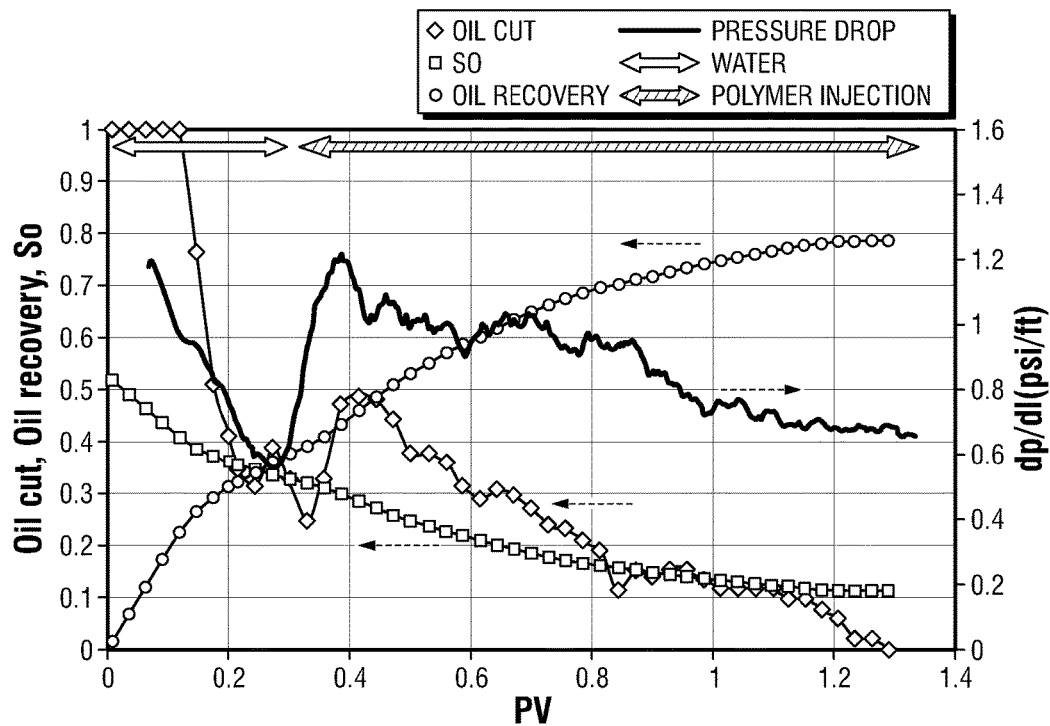
FIG. 10 is an oil recovery and pressure drop plot for an inverted LP solution (2000 ppm polymer) in unconsolidated-sand pack. Oil recovery increases as the inverted LP is injected while pressure drop for LP injection shows steady-state and low at the end of the experiment. The steady-state low pressure drop from LP at the end of the experiment indicates improved behavior as the LP solutions do not plug the core during oil recovery.

Oil Recovery Experiment:

The ability of the inverted polymer solution to displace oil and improve recovery was tested in Bentheimer sandstone in the presence of crude oil. A viscous crude oil (80 cP at 31° C.) was chosen for the test. The inverted polymer solution was injected at the end of water flooding in separate core flooding experiments. The oil recovery and pressure drop is plotted in FIG. 10. As seen in Figures, oil recovery improves as the inverted LP solution is injected while pressure drop for LP injection shows steady-state and low at the end of the experiment. The steady-state low pressure drop for LP solution at the end of the experiment indicates improved behavior as the LP solution do not plug the core during oil recovery

TABLE 2

Summary of properties of inverted LP composition.

| Polymer | Polymer Concentration (ppm) | 5 μm filter (15 psi, 25° C.) | | 1.2 μm filter (15 psi, 25 C.) | | Viscosity (cP) @ 31° C. 10 s⁻¹ |
|---|---|---|---|---|---|---|
| | | F.R | Time to 200 g (min) | F.R | Time to 200 g (min) | |
| LP | 2000 | 1.00 | 5.0 | 1.13 | 27 | 22 |
| | 2000 | 1.01 | 4.4 | 1.19 | 25 | 21 |
| | 2000 | 1.04 | 5.7 | 1.18 | 24 | 25 |

Validation of Filtration Test and Viscosity Measurements Using Pilot-Scale LP Samples:

Additional filtration ratio test and viscosity measurements were performed using larger-scale produced samples. These include pilot-scale and commercial field-scale samples compared with previous lab-scale manufactured samples. The results of filtration ratio and viscosity measurement have been summarized in Table 3. 2000 ppm inverted polymer solutions were prepared using different pilot-scale batches of LP solutions (M1 through M5) and filtration tests were performed as described above. The average activity of neat polymer is measured as 50.9±0.9%. Viscosity of neat polymer is 207±148 cP at room temperature. 2000 ppm of the inverted polymer solution shows a viscosity of 21±3 cP at 10 sec-1, 31° C.

Figure 11:
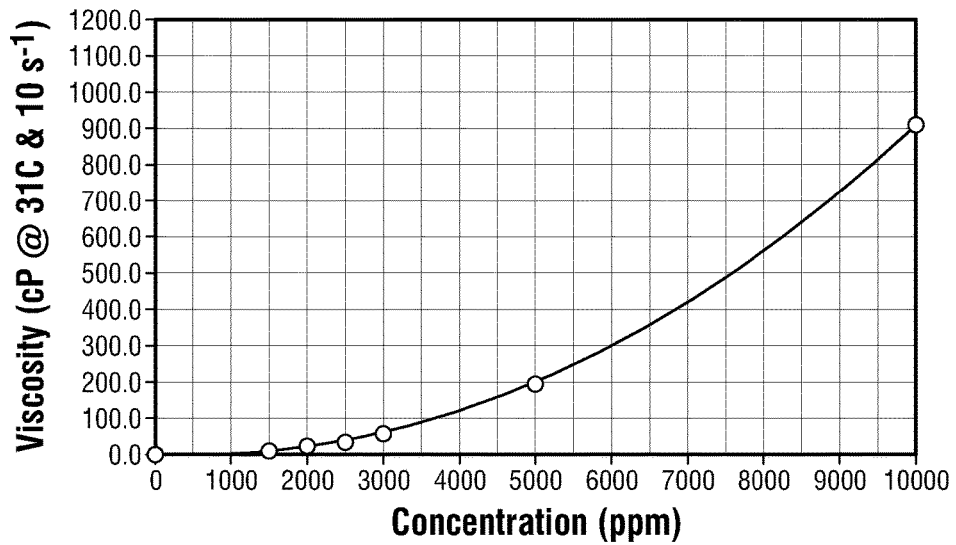
FIG. 11 is a plot showing the LP viscosity as a function of concentration at a temperature of 31° C. and shear rate of 10 $sec^{-1}$.
Figure 12:
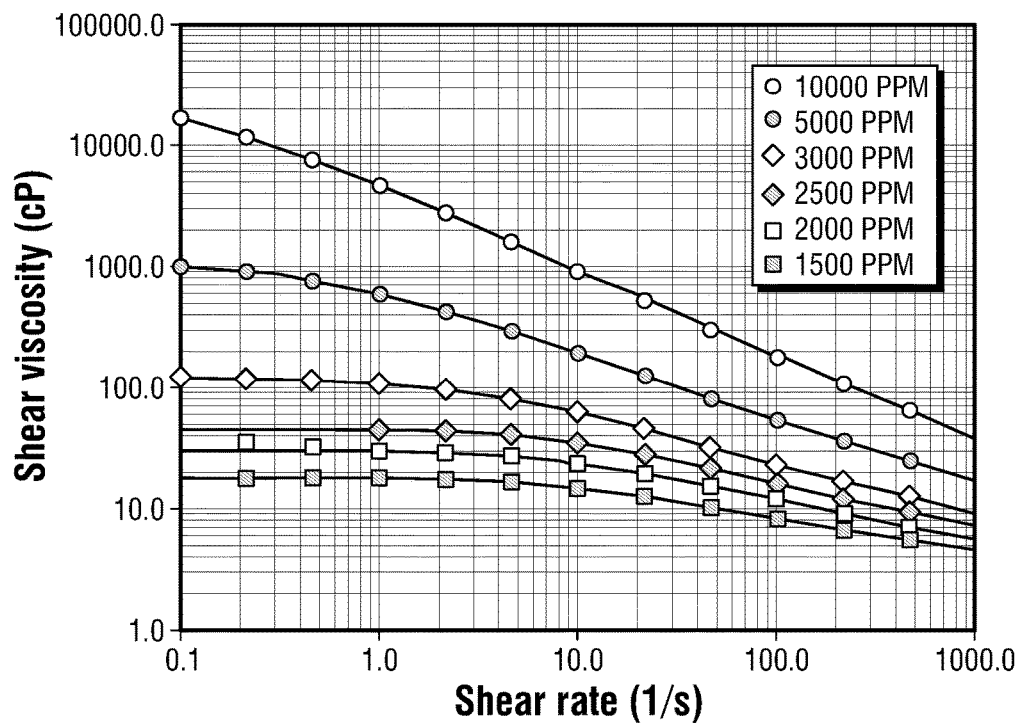
FIG. 12 is a plot of LP shear viscosities as a function of shear rate at a temperature of 31° C.

The viscosity yield as a function of concentration of polymer used was measured at 31° C. FIG. 11 shows the viscosity yield curve as a function of concentration. Mother solution of 10,000 ppm concentrate was prepared from 52% active neat polymer. From this mother solution, appropriate dilutions were made and viscosities measured between 0.1 sec$^{-1}$ and 1000 sec$^{-1}$. The viscosity values in FIG. 11 correspond to a shear rate of 10 sec$^{-1}$. At a concentration of 2000 ppm inverted polymer solution, the viscosity is about 23 cP and the viscosity yield of 10,000 ppm inverted polymer solution is approximately 900 cP. FIG. 12 shows the polymer viscosity as a function of shear rate. As shown in FIG. 12 shear thinning behavior of polymer solutions was observed. As the polymer concentrations increased, the shear thinning behavior changed from less shear thinning to more shear thinning.

TABLE 3

Summary of filtration and viscosity data using pilot-scale samples.

| | | Viscosity (cP) @ 10 s−1 | | Filtration Ration Test @ 15 psi, 25 C. | | | |
|---|---|---|---|---|---|---|---|
| Sample | Activity | Neat (25 C.) | 2k ppm (31 C.) | F.R. (5 um) | time to 200 g (m) | F.R. (1.2 um) | time to 200 g (m) |
| S-1 | 52.4% | 179 | 25 | 1.04 | 5.7 | 1.18 | 24 |
| | | | 22 | 1 | 5 | 1.13 | 27 |
| | | | 21 | 1.01 | 4.4 | 1.19 | 25 |
| M-1 | 52.1% | 152 | 26 | 1.05 | 6.2 | 1.32 | 28.4 |
| | | | | 1.03 | 6.0 | 1.22 | 25.2 |
| | | | | | | 1.43 | 30.0 |
| M-2 | 51.8% | 128 | 25 | 1.04 | 6.1 | 1.44 | 30.8 |
| M-3 | 50.3% | 104 | 24 | 1.04 | 6.3 | 1.24 | 29.4 |
| | | | | | | 1.31 | 27.4 |
| | | | 16 | | | 1.34 | 13.2 |
| | | | 20 | | | 1.50 | 21.0 |
| M-5 | 50.5% | 101 | 21 | 1.04 | 5.0 | 1.24 | 24.0 |
| | | | | | | 1.39 | 26.2 |
| | | | 19 | | | 1.22 | 14.4 |
| | | | 19 | | | 1.30 | 16.5 |
| M-6 | 51.2% | 107 | 21 | 1.03 | 4.8 | 1.31 | 26.0 |
| | | | | | | 1.37 | 27.8 |
| | | | 18 | | | 1.21 | 16.0 |
| PL#5 | 50.0% | 241 | 22 | | | 1.13 | 16.0 |
| PL#6 | 50.0% | 252 | 20 | | | 1.27 | 16.0 |
| TL#2 | 50.0% | 599 | 24 | | | 1.24 | 20.5 |
| Mean | | 207 | 21 | 1.04 | 5.51 | 1.28 | 23.1 |
| Std. Dev | | 148 | 3 | 0.02 | 0.66 | 0.10 | 5.5 |

Figure 13A:
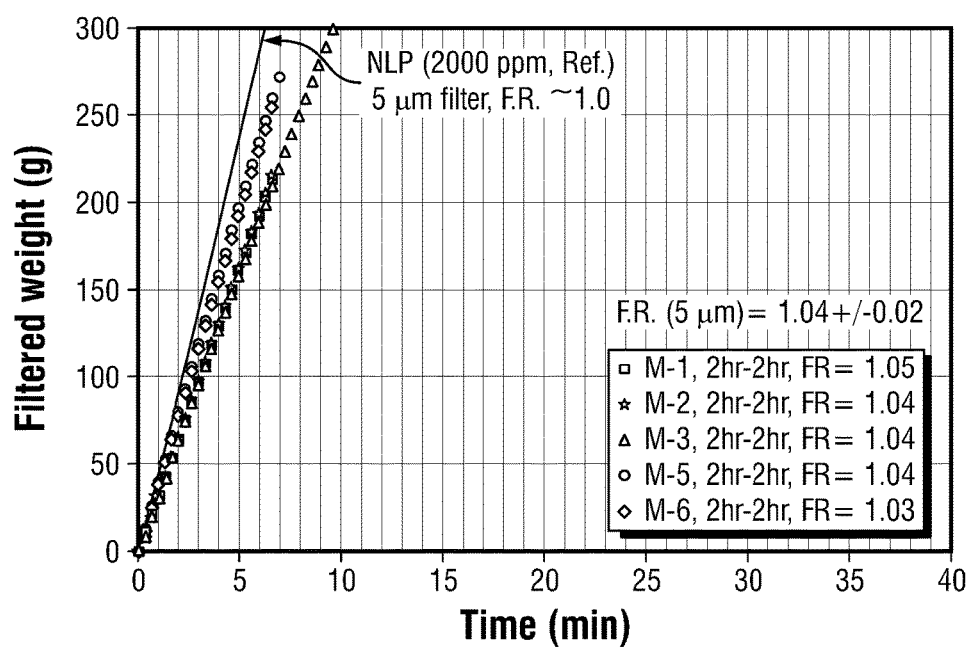
FIGS. 13A and 13B are plots of filtration ratio tests performed using a 5 micron filter (FIG. 13A) and 1.2 micron filter (FIG. 13B) for inverted polymer solutions M1-M6. The inverted polymer solution (2000 ppm polymer) passes through 1.2 micron filter with a filter ratio of less than 1.5, which shows improved filterability of the inverted polymer solution.
Figure 13B:
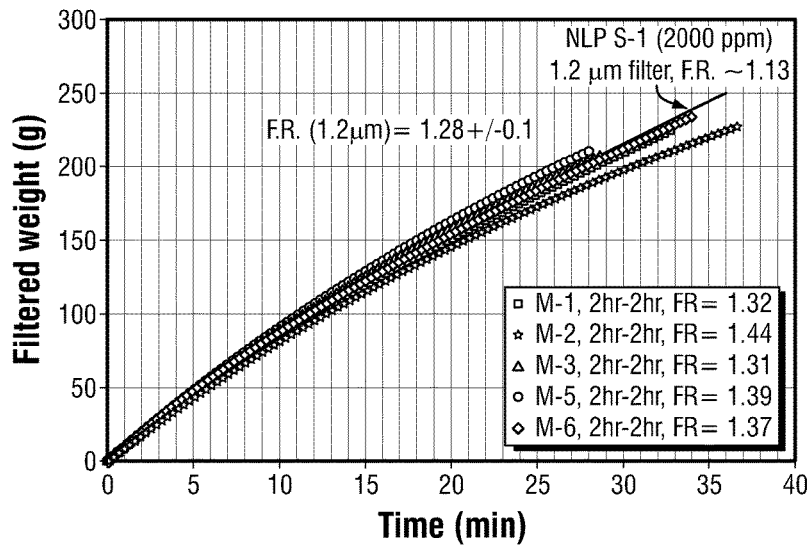

2000 ppm inverted polymer solutions were prepared using different pilot-scale batches of LP solutions (M1 through M5) and filtration tests were performed as described above. FIGS. 13A and 13B show the results of filtration ratio tests performed with different pilot-scale batches of LP solutions using a 5 micron filter (FIG. 13A) and 1.2 micron filter (FIG. 13B) at 15 psi. As shown in FIGS. 13A and 13B, the LP solutions produce a FR of 1.04+/−0.02 for a 5 micron filter and 1.28+/−0.1 for a 1.2 micron filter.

Figure 14:
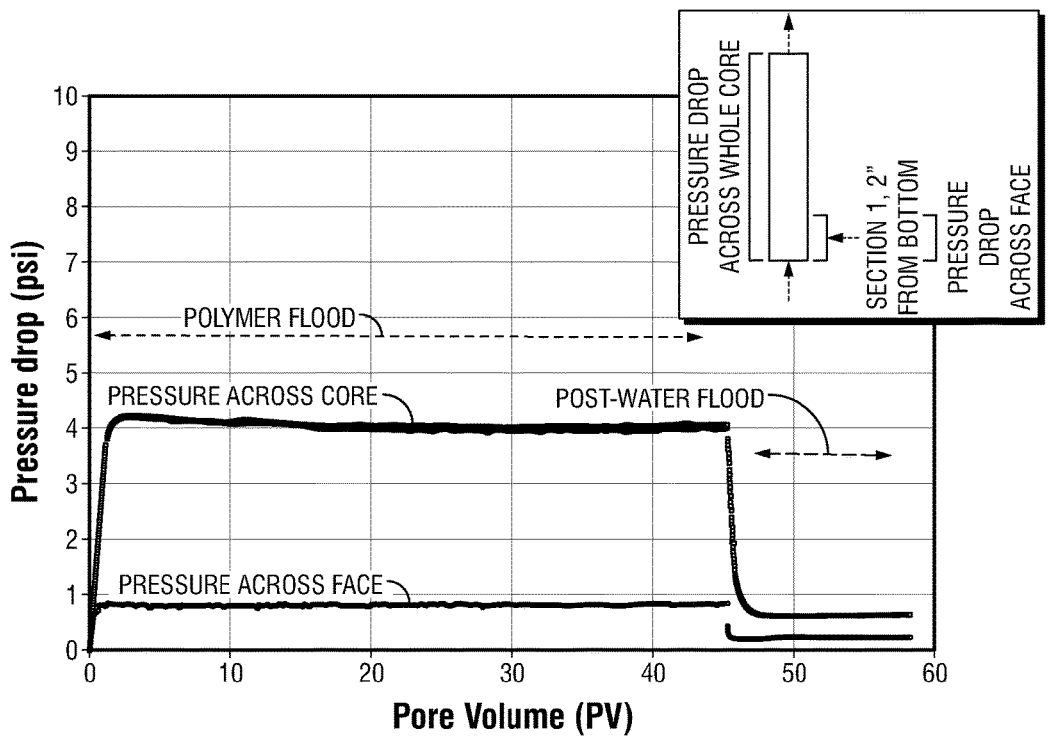
FIG. 14 is a plot of the pressure drop upon injection of an inverted polymer solution (2000 ppm) in a sandstone core (1.2 D) with a pressure tab attached at 2" from the inlet to monitor face plugging. The steady pressure drop observed upon injection of the inverted polymer solution in both whole and $1^{st}$ section in the core are consistent with no significant plugging of the sandstone core. The inverted polymer was injected up to 45 PV followed by post-water flood. The pressure drop during the post-water flood also showed that injection of the inverted polymer solution did not plug the core.

FIG. 14 shows a long-term injectivity test of single phase inverted polymer solution in a core. The core included a pressure tap two inches from the face, providing a pressure differential across the injection face of the core. As shown in FIG. 14, the steady-state pressure drop showed no significant signal consistent with plugging of the sandstone core. Analysis of the pressure drop during the post-water flood also showed no plugging.

Figure 15A:
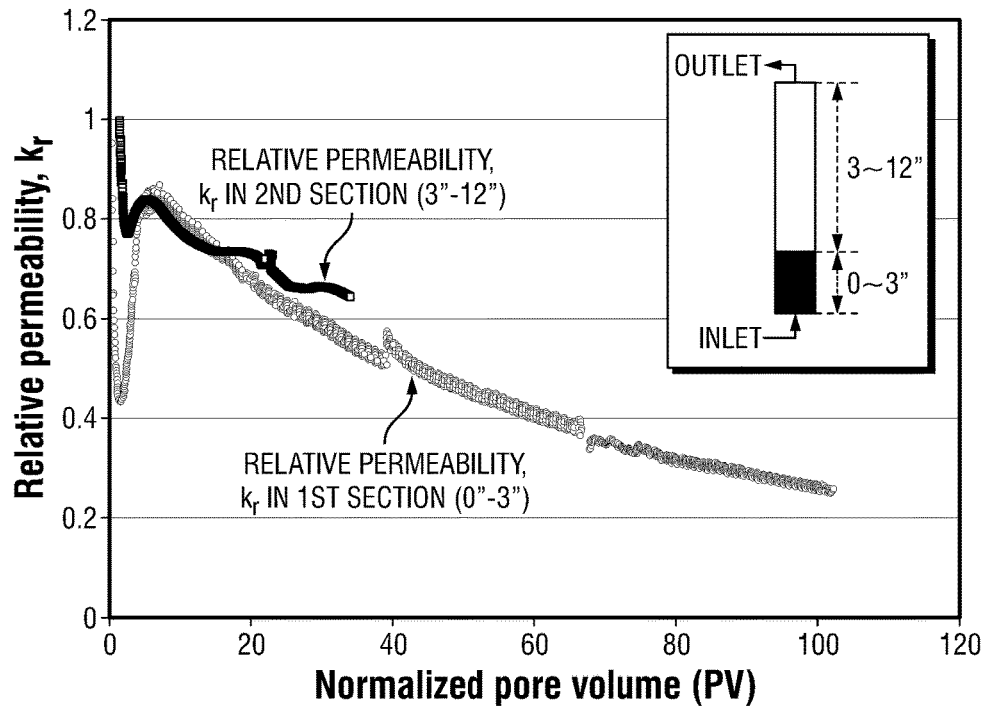
FIG. 15A is a plot of the normalized permeability reduction of an inverted conventional liquid polymer LP#1 (2000 ppm) in a sandstone with a pressure tap (3") showing face plugging at the inlet.
Figure 15B:
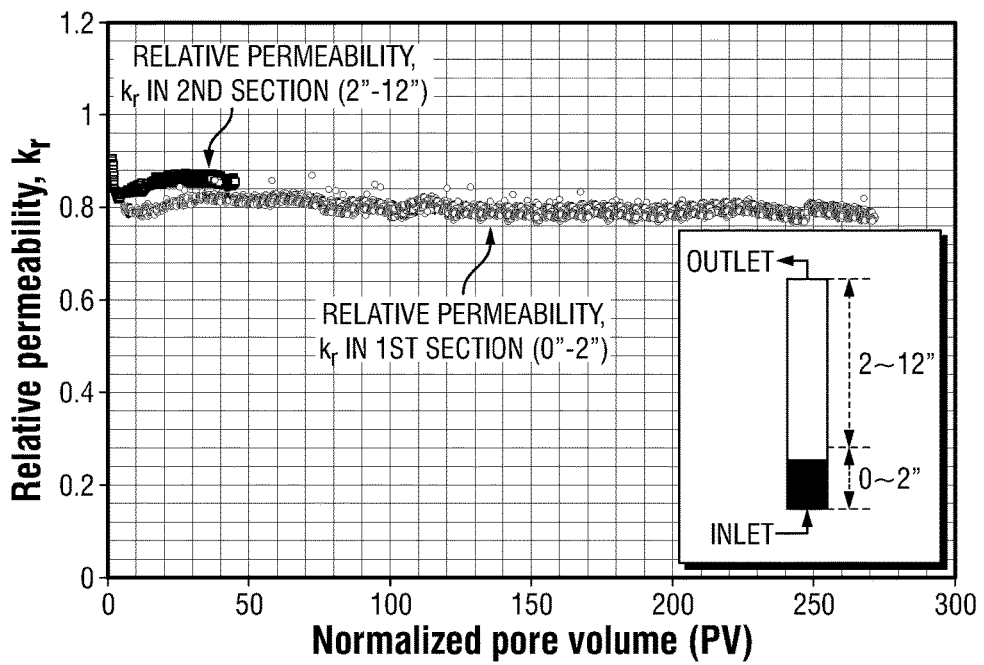
FIG. 15B is a plot of the normalized permeability reduction of the inverted LP composition (2000 ppm) in a sandstone with a pressure tap (2") showing no significant plugging above 250 PV of injection at inlet.

To verify the long-term injectivity performance of the inverted LP solutions, the relative permeability of the single phase polymer flood was normalized using methods known in the art (see SPE 179657, SPE IOR symposium at Tulsa 2016, which is incorporated herein by reference in its entirety). FIG. 15A shows the relative plugging when the results are normalized for each section with total pore volumes injected for a conventional emulsion polymer. These results indicate that the plugging rate is faster near the injection face compared to subsequent sections of the core. In contrast, as shown in FIG. 15B, the inverted LP solutions do not exhibit any significant signs of plugging.

Figure 16:
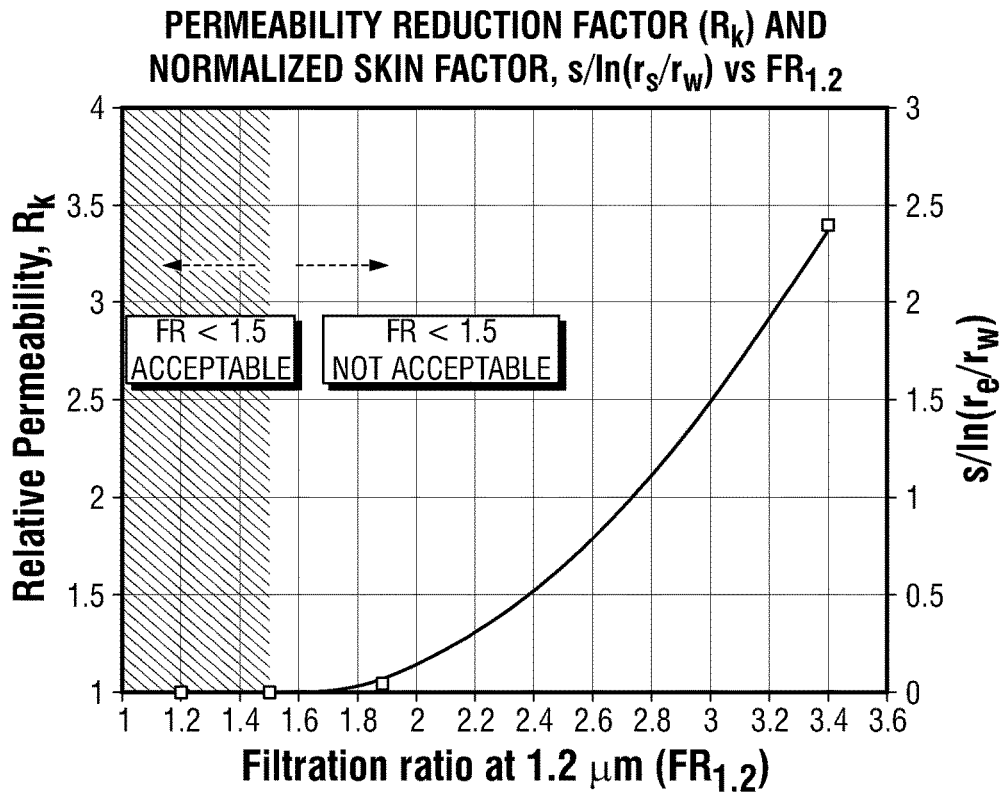
FIG. 16 is a plot of the Permeability Reduction Factor ($R_k$) and Normalized Skin Factor, $s/\ln(r_e/r_w)$ as a function of the filtration ratio at 1.2 μm ($FR_{1.2}$). $R_k$ and skin factor were calculated at 25 PV of injection into sandstone core.

FIG. 16 shows the permeability Reduction Factor (Rk) and Normalized Skin Factor, $s/\ln(r_s/r_w)$ vs. filtration ratio at 1.2 μm (FR 1.2). As shown in FIG. 16, Rk and skin factor both increase when FR is greater than 1.5. These results suggest that injection of a polymer solution with a FR greater than 1.5 plugs the core, while injection of a polymer solution with a FR of 1.5 or less causes no plugs to the core.

Polymer Loop Yard Tests:

With polymer mixing and performance in laboratory conditions validated, the next step was to evaluate the mixing efficiency of the neat solution in brine to a final 2000 ppm polymer concentration in larger scale yard tests. The goal of the yard tests was to demonstrate that acceptable viscosity yield and filtration ratio could be achieved using single step configuration mixers and multi-step configuration mixers (with and without dynamic mixers) as described in FIGS. 1 and 2.

Experimental results using a single step mixer configuration are summarized in Table 4 and experimental results using a multi-step mixer configuration are summarized in Table 5. Each experiment was performed using different size static mixer elements and different configurations including dynamic mixer, different flow rate and different ratio of neat polymer and brine. The samples were collected after each run, and filtration tests and viscosity measurements were performed to verify the hydration of the LP including inversion and dilution through the designed mixing system.

TABLE 4

Summary of polymer loop yard test - example of single step mixing.

| Run # | Mixing Scheme | Mixer 1st stage (Inversion) | Mixer 2nd stage (Dilution) | Flow rate gpm | Velocity (m/s) | Dynamic mixer | Viscosity (cP, 31 C.) 7.3 s−1 | Viscosity (cP, 31 C.) 10 s−1 | FR (1.2 μm) | Filtration Time (min, 200 g) | Pressure across the mixer (psi) |
|---|---|---|---|---|---|---|---|---|---|---|---|
| S-1 | Single step | 1"φ:15 elements | | 30 | 3.7 | Y | 21.7 | 18.8 | 1 | 120 | 120 |
| S-2 | Single step | 1"φ:15 elements | | 30 | 3.7 | N | 21.2 | 19.5 | 1.14 | 83 | 125 |
| S-3 | Single step | 2"φ:15 elements | | 95 | 3 | Y | 26.7 | 23.3 | 1 | 120 | 120 |
| S-4 | Single step | 2"φ:15 elements | | 95-100 | 3.1 | N | 26.7 | 23.6 | 1.07 | 100 | 180 |

TABLE 5

Summary of polymer loop yard test - example of multistep mixing.

| Run # | Mixing Scheme | Mixer 1st stage (Inversion) | Mixer 2nd stage (Dilution) | Flow rate gpm | Velocity (m/s) | Dynamic mixer | Viscosity (cP, 31 C.) 7.3 s−1 | Viscosity (cP, 31 C.) 10 s−1 | FR (1.2 μm) | Filtration Time (min, 200 g) | Pressure across the mixer (psi) |
|---|---|---|---|---|---|---|---|---|---|---|---|
| M-1 | Two step | 1"φ:15 elements | 2"φ:15 elements | 125-130 | 3.4/3.9 | N | 26.2 | 23 | 1.3 | 95 | 140 |
| M-2 | Two step | 1"φ:15 elements | 2"φ:15 elements | 125 | 3.4/3.9 | Y | 23 | 20.1 | 1.13 | 99 | 140 |
| M-3 | Two step | 1"φ:15 elements | 2"φ:15 elements | 100 | 2.5/3.1 | Y | 23 | 20 | 1.2 | 85 | 100 |

Figure 17:
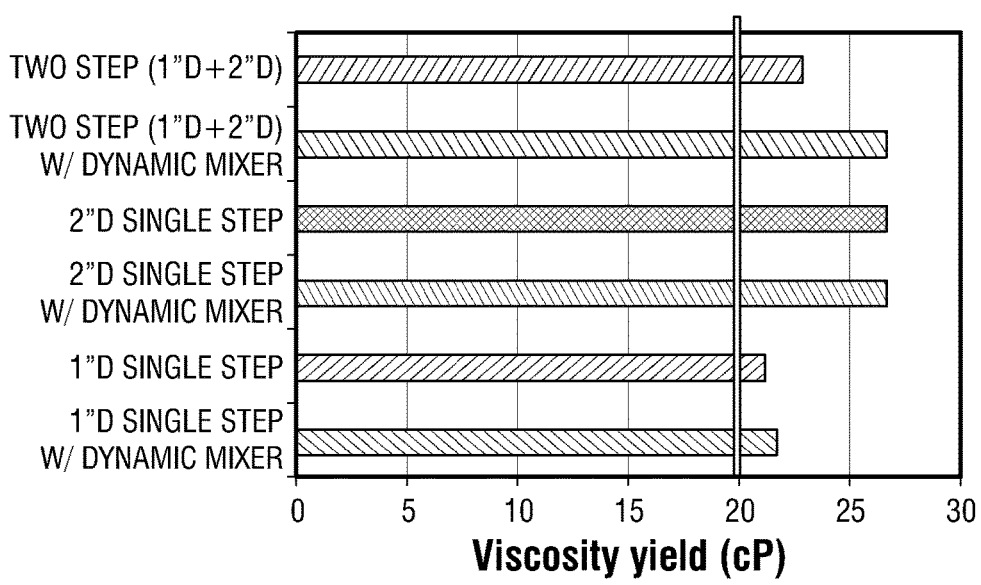
FIG. 17 is a bar graph illustrating the viscosity yield achieving using multi-step (two) mixing configurations and single step mixing configurations with and without a dynamic mixer.
Figure 18A:
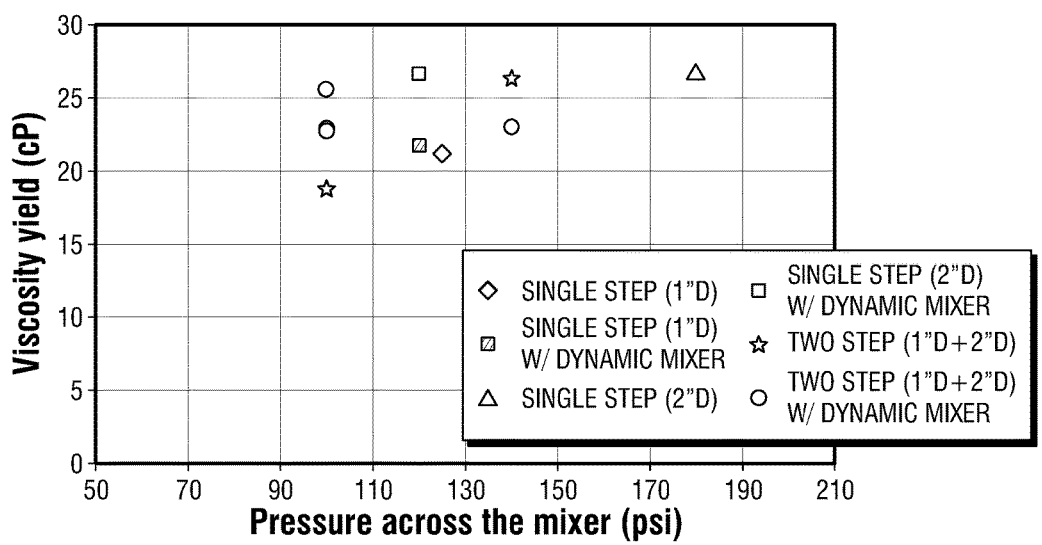
FIG. 18A is a plot of the viscosity yield as a function of the pressure drop across the static mixer(s).
Figure 18B:
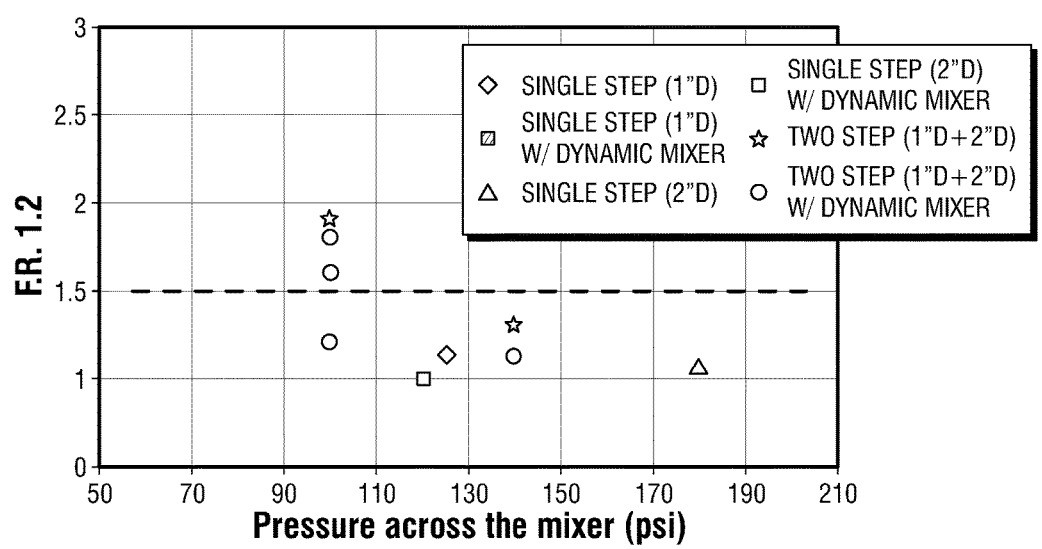
FIG. 18B is a plot of the filtration ration as a function of the pressure drop across the static mixer(s).

As shown in FIG. 17, viscosity yields were measured above 20 cP in both multi-step (two) mixing configuration and single step mixing configuration with and without the dynamic mixer. This shows that the LP properly hydrates through the static mixers in both a single-step or in multi-step configuration. FIGS. 18A and 18B show the viscosity yield as a function of pressure drop across the static mixers (FIG. 18A) and filtration ratio as a function of pressure drop across the static mixers (FIG. 18B). To hydrate the LP and provide a suitable viscosity yield and filterability, a FR of 1.5 or less at 1.2 micron should be used.

Overall, the polymer loop yard tests demonstrate that successful viscosity yields can be achieved with a suitable filtration ratio using either a single step or multi-step mixing process. Furthermore, injectivity experiments through surrogate rock showed no appreciable plugging behavior.

Figure 19:
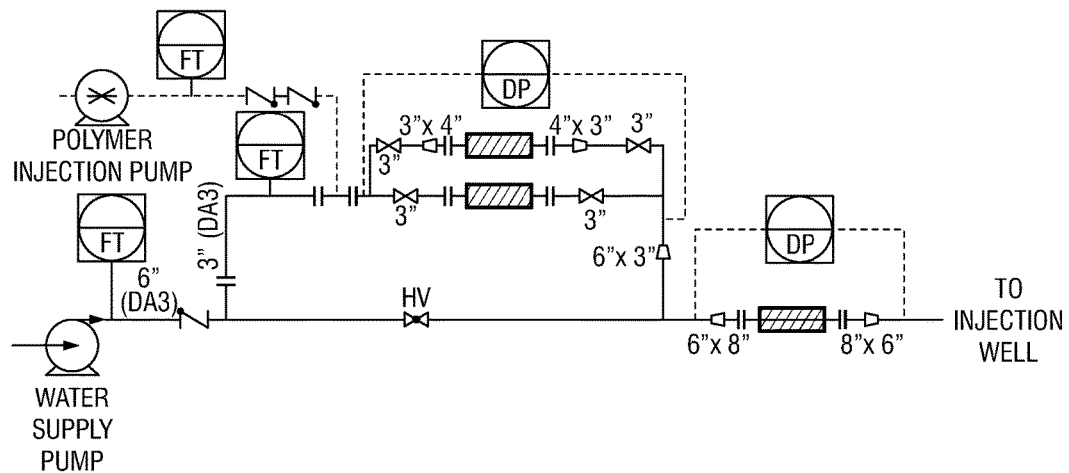
FIG. 19 is a process flow diagram schematically illustrating traditional two-stage mixing processes used to prepare aqueous polymer solutions from LP compositions.

Development of Mixing Configurations for Field-Scale Applications:

Traditionally, aqueous polymer solutions are prepared from LP compositions using a two-stage mixing process. An example two stage mixing process is schematically illustrated in FIG. 19. In the first (inversion) stage, LP polymer composite was mixed with a slipstream of the injection water to be inverted to a mother solution of 10,000 ppm. The mother solution concentration was controlled by varying the slipstream flow using a globe valve on the water injection flowline. The inversion mixer is a static in-line mixer with a recommended differential pressure range of 3-10 barg. Either a 3" or 4" mixer could be selected to maintain the recommended differential pressure across the anticipated range of injection flowrates. In the second (dilution) stage the mother solution was mixed with the main injection stream to achieve a polymer solution concentration of 1750-2000 ppm. The dilution mixer was a static in-line mixer with a 1~3 barg pressure drop. The polymer solution concentration was controlled by varying the polymer injection pump stroke length.

Field trials were conducted using this two-stage mixing process, but had to be suspended due to irreversible loss of injectivity. Studies demonstrated that the loss of injectivity was due to near wellbore damage mechanisms associated with the hPAM liquid emulsion prepared using the two-stage mixing process. These problems were traced back to certain operational issues associated with the two-stage mixing process described above, including operation of the inversion mixer outside of its preferred operating envelope, and blockage of inversion mixer due to overinjection of polymer.

To remedy these issues, an alternative mixing configuration was developed which eliminated the two-stage mixing process while still achieving the desired FR specification (an FR of 1.5 or less at 15 psi using a 1.2 μm filter) and viscosity target. This simpler, single stage mixing configuration significantly reduced the possibility of out-of-specification injection during normal injection.

Figure 21:
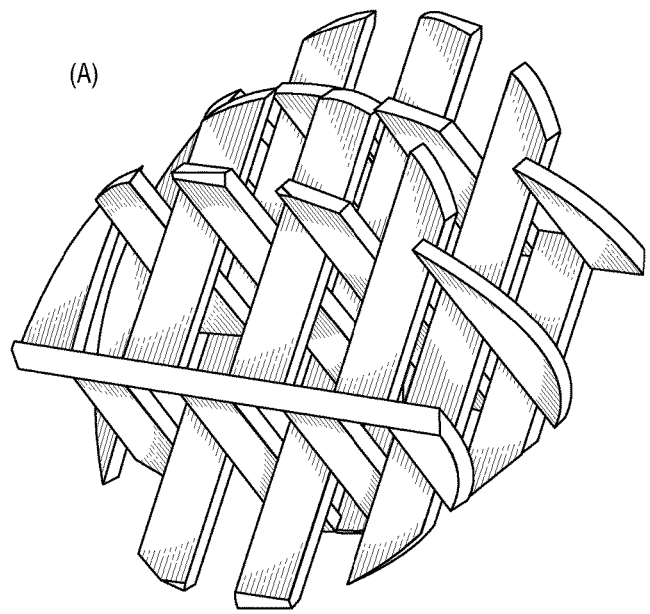
FIG. 21 is a schematic illustration of the internal elements of the 6" SCH 120 static in-line Sulzer SMX mixer.
Figure 20:
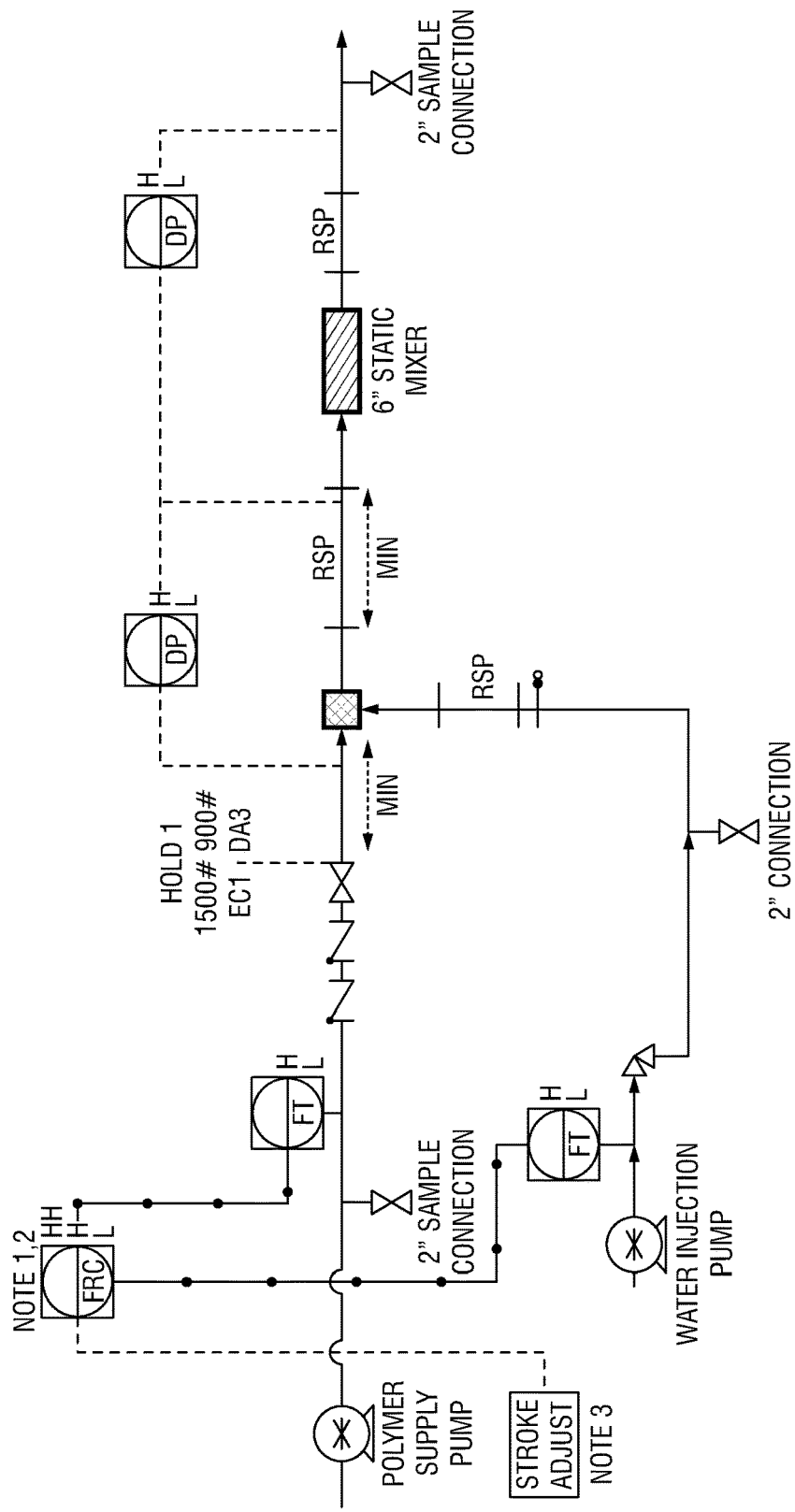
FIG. 20 is a process flow diagram schematically illustrating a single stage mixing processes used to prepare aqueous polymer solutions from LP compositions.

The single stage mixing configuration is schematically illustrated in FIG. 20. The system included two mixers operating in series, and eliminated the requirement for a two-stage inversion/dilution process. LP composition was introduced to the water injection stream via a 6" dynamic mixer. A 6" SCH 120 static in-line Sulzer SMX mixer was installed directly downstream from the dynamic mixer. The static mixer included 12 elements oriented as shown in FIG. 21. The 6" mixer sizing was selected to facilitate injection of a design rate of 30,000 bpd at 1800 ppm. The mixing configuration was sized such that fluid velocity was limited to less than ca. 3.8 m/s to avoid unnecessary shearing of the solution while maintaining a reasonable pressure drop.

Performance of Single-Stage Mixing Process in Yard Trial and Field Pilot Applications:

Table 6 includes the viscosity data and filtration data for liquid polymer solution prepared using an overhead mixer in a laboratory as a reference. Tables 7 and 8 show the mixing condition and results of liquid polymer mixing using the single stage mixing process at a yard-scale. Table 9 shows the mixing condition and results of liquid polymer mixing using the single stage mixing process in a field pilot application.

TABLE 6

Results of Lab experiments for various samples mixed in overhead mixer.

| Sample | Viscosity (cP) 2000 ppm (31° C.) | Filtration Ratio F.R. (1.2 μm) | time to 200 g (m) | E/M (kJ/kg) |
|---|---|---|---|---|
| S-1 | 25 | 1.18 | 24 | 1.10 |
|  | 22 | 1.13 | 27 | 1.10 |
|  | 21 | 1.19 | 25 | 1.10 |
| M-1 | 26 | 1.32 | 28.4 | 1.10 |
|  |  | 1.22 | 25.2 | 6.58 |
| M-2 | 25 | 1.44 | 30.8 | 1.10 |
| M-3 | 24 | 1.24 | 29.4 | 1.10 |
| CA-1 | 24 | 1.0 | 15 | 0.55 |
| SE-1 | 18 | 1.0 | 45 | 0.27 |
| SE-2 | 24 | 1.0 | 60 | 0.14 |

TABLE 7

Summary of yard test data: Example of single stage mixing.

| Run # | Mixing Scheme | Static Mixer 1st stage (Inversion) | Static Mixer 2nd stage (Dilution) | Dynamic mixer, DM | Field flow rate (bbl/day) | Total flow rate gpm | Pressure drop (psi) DM | Pressure drop (psi) SM | Filtration ratio $FR_{1.2}$ (1.2 μm) | time (min, 200 g) | Viscosity (cP) 7.3 $s^{-1}$ | Viscosity (cP) 10 $s^{-1}$ | E/M kJ/kg |
|---|---|---|---|---|---|---|---|---|---|---|---|---|---|
| S-1 | Single Step | 2"φ:15 elements | | N | 40,000 | 148 | | 154.8 | 1.31 | 120 | 34.4 | 30.6 | 1.07 |
| S-2 | Single Step | 2"φ:15 elements | | N | 30,000 | 111 | | 87.6 | 1.4 | 165 | 32 | 29.3 | 0.60 |
| S-3 | Single Step | 2"φ:15 elements | | N | 30,000 | 111 | | 88 | 1.19 | 127 | 34.4 | 31.4 | 0.61 |
| S-4 | Single Step | 2"φ:15 elements | | N | 15,000 | 49 | | 17.9 | 2.22 | 225 | 31.8 | 29.3 | 0.12 |
| S-5 | Single Step | 2"φ:15 elements | | N | 15,000 | 49 | | 17.7 | 1.3 | 144 | 35.6 | 31.9 | 0.12 |
| S-6 | Single Step | 2"φ:15 elements | | N | 10,000 | 32.69 | | 8.2 | 1.9 | 127 | 34.7 | 31.7 | 0.06 |
| S-7 | Single Step | 2"φ:15 elements | | N | 7,500 | 24.5 | | 4.7 | 2.95 | 164 | 37.1 | 33 | 0.03 |
| S-8 | Single Step | 2"φ:15 elements | | N | 5,000 | 16.8 | | 2.2 | 2.65 | 225 | 35.1 | 32.2 | 0.02 |
| S-9 | Single Step | 2"φ:15 elements | | Yes (2"φ) | 40,000 | 149 | 25.4 | 154.7 | 1.12 | 120 | 34.7 | 32.4 | 1.07 |
| S-10 | Single Step | 2"φ:15 elements | | Yes (2"φ) | 30,000 | 112 | 14.4 | 87.7 | 1.13 | 115 | 37 | 33.51 | 0.60 |
| S-11 | Single Step | 2"φ:15 elements | | Yes (2"φ) | 15,000 | 50 | 3.1 | 19.8 | 1.24 | 128 | 36.3 | 33.5 | 0.14 |
| S-12 | Single Step | 2"φ:15 elements | | Yes (2"φ) | 10,000 | 33.5 | 1.5 | 9.6 | 1.43 | 186 | 36.9 | 33.6 | 0.07 |
| S-13 | Single Step | 2"φ:15 elements | | Yes (2"φ) | 7,500 | 25 | 0.9 | 5.9 | 1.76 | 197 | 39.3 | 34.9 | 0.04 |
| S-14 | Single Step | 2"φ:15 elements | | Yes (2"φ) | 5,000 | 16.7 | 0.6 | 3 | 2.31 | 153 | 36.2 | 33.3 | 0.02 |
| S-15 | Single Step | 3"φ:15 elements | | Yes (3"φ) | 30,000 | 242 | 22.2 | 104.9 | 1.25 | 119 | 30.8 | 18.7 | 0.72 |
| S-16 | Single Step | 3"φ:15 elements | | Yes (3"φ) | 15,000 | 111 | 4.6 | 22.9 | 1.1 | 161 | 34.8 | 17.7 | 0.16 |
| S-17 | Single Step | 3"φ:15 elements | | Yes (3"φ) | 10,000 | 69 | 1.9 | 9.6 | 1.08 | 211 | 35.2 | 17.7 | 0.07 |
| S-18 | Single Step | 3"φ:15 elements | | Yes (3"φ) | 7,500 | 53 | 2.6 | 5.5 | 1.62 | 160 | 35.8 | 18.3 | 0.04 |
| S-19 | Single Step | 3"φ:15 elements | | Yes (3"φ) | 5,000 | 34 | 0.5 | 2.6 | 1.89 | 233 | 36.7 | 18.4 | 0.02 |

TABLE 8

Summary of yard test data: Example of two stage mixing.

| Run # | Mixing Scheme | Mixer 1st stage (Inversion) | Mixer 2nd stage (Dilution) | Dynamic mixer, DM | Field flow rate (bbl/day) | Total flow rate gpm | Pressure drop (psi) DM | Pressure drop (psi) 1st SM | Pressure drop (psi) 2nd SM | Filtration ratio $FR_{1.2}$ (1.2 μm) | time (min, 200 g) | Viscosity (cP) 7.3 $s^{-1}$ | Viscosity (cP) 10 $s^{-1}$ | E/M kJ/kg |
|---|---|---|---|---|---|---|---|---|---|---|---|---|---|---|
| T-1 | Two step | 1"φ:15 elements | 2"φ:15 elements | N | 30,000 | 111 | | 46 | 159 | 1 | 179 | 20 | 19 | 1.41 |
| T-2 | Two step | 1"φ:15 elements | 2"φ:15 elements | Yes (1"φ) | 30,000 | 110 | 8 | 60 | 158 | 1 | 650* | 18 | 17 | 1.51 |
| T-3 | Two step | 1"φ:15 elements | 2"φ:15 elements | Yes (1"φ) | 15,000 | 49 | 0 | 8 | 53 | 2 | 105 | 36 | 34 | 0.42 |

TABLE 9

Summary of field test data: Example of single step mixing.

| | | Mixer | | | Pressure drop | | $FR_{1.2}$ | Viscosity (cP) | | E/M |
|---|---|---|---|---|---|---|---|---|---|---|
| Run # | Mixing Scheme | 1st stage (Inversion) | 2nd stage (Dilution) | Field flow rate (bbl/day) | Bar | psi | 1.2 μm | 7.3 s$^{-1}$ | 10 s$^{-1}$ | kJ/kg |
| T-1 | Single step | 6"φ:12 elements | | 14780 | 2.4 | 40 | 1.1 | 20 | 19 | 0.27 |
| T-2 | Single step | 6"φ:12 elements | | 19963 | 4.3 | 71 | 1.4 | 18 | 17 | 0.49 |
| T-3 | Single step | 6"φ:12 elements | | 24768 | 6.5 | 106 | 1.4 | 36 | 34 | 0.73 |
| T-4 | Single step | 6"φ:12 elements | | 17914 | 3.5 | 57 | 1.4 | 36 | 34 | 0.39 |
| T-5 | Single step | 6"φ:12 elements | | 10630 | 1.3 | 21 | 1.4 | 36 | 34 | 0.15 |

Figure 22:
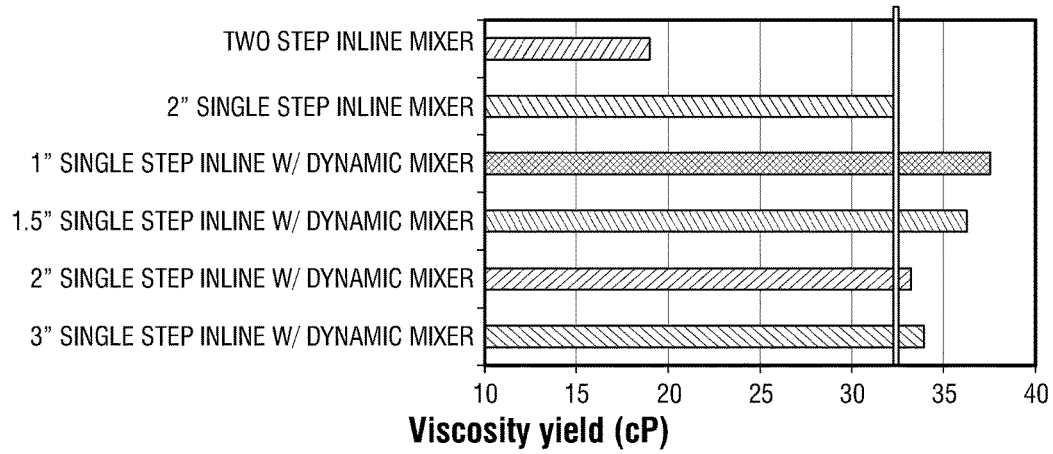
FIG. 22 is a plot showing the average viscosity yield across a 10,000-30,000 bpd flow rate range associated with various yard-scale mixer configurations.

The ability of the single stage mixing process to meet reservoir specifications was assessed at yard scale conditions. FIG. 22 shows the viscosity yield achieved using various mixer configurations. To meet reservoir specifications, a polymer solution viscosity of 32 cP (@ 10 s$^{-1}$ and 20° C.) was expected. For the two-stage mixing process, the average viscosity was limited to ca. 20 cP. However, the single stage mixing process was able to ensure a viscosity yield >32 cP across all tested mixer sizes.

Figure 23:
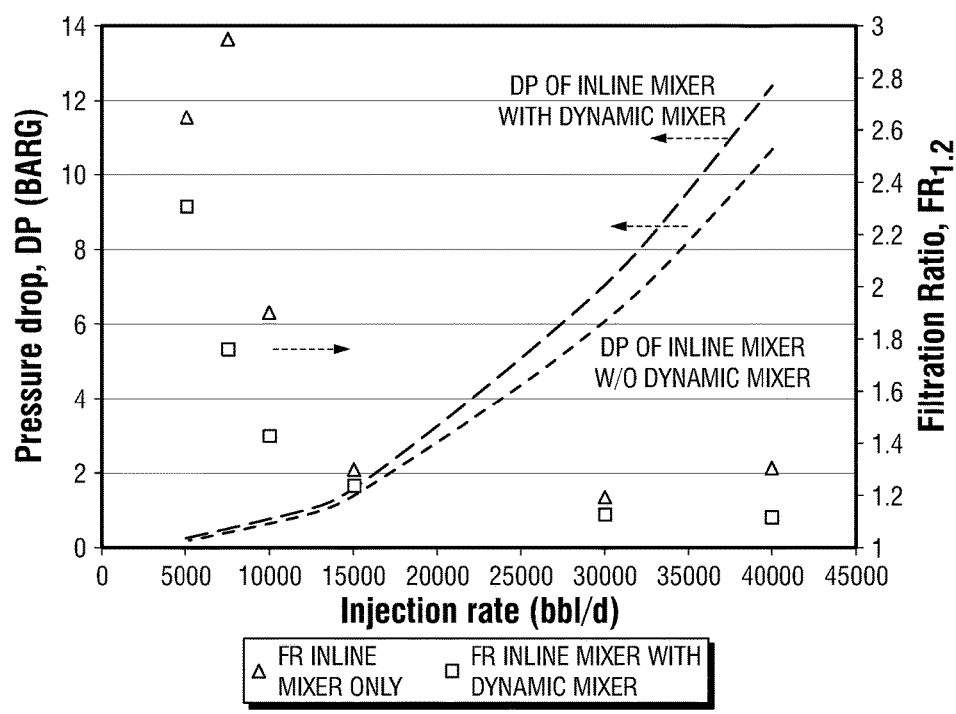
FIG. 23 is a plot showing the variation of pressure drop (DP) and filtration ratio (FR) as a function of injection rate using the mixer configuration shown in FIG. 2 at 2" yard test scale. Dotted lines indicate the DP across the static mixer with and without the dynamic mixer. Solids symbols indicate the filtration ratio of the aqueous polymer solutions at each corresponding injection rates. Filtration ratio was measured using 1.2 micron filter under 15 psi.

FIG. 23 shows that DP and FR varied with injection rate when using the single stage mixing process at 2" yard test scale. The dotted lines indicate the pressure drop (DP) across the static mixer with and without the dynamic mixer. Solids symbols indicate the filtration ratio of the inverted aqueous polymer solutions at each corresponding injection rate. Filtration ratio was measured at 1.2 micron filter under 15 psi. The single stage mixing process also produced inverted aqueous polymer solutions that met the FR specification of ≤1.5 at an injection rate equivalent to ca. 30,000 bpd in a 6" system. This performance was sustained as the velocity across the mixers was reduced to the equivalent of 10,000 BPD.

Figure 24:
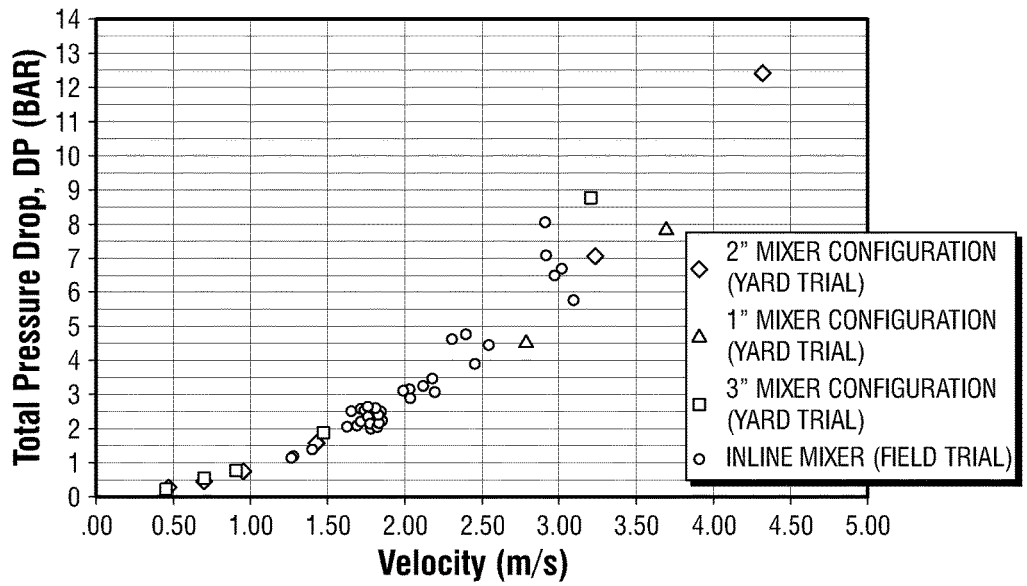
FIG. 24 is a plot showing the correlation between yard test and field scale DP as a function of fluid velocity.

FIG. 24 shows the relationship between DP and fluid velocity for the combined dynamic/static mixer configuration with 1", 2" and 3" units. The results associated with the three sizes show a strong correlation and demonstrate that a velocity of greater than ca. 1.0 m/s provides a minimum DP of ca. 1.0 bar over the two mixers.

Figure 25:
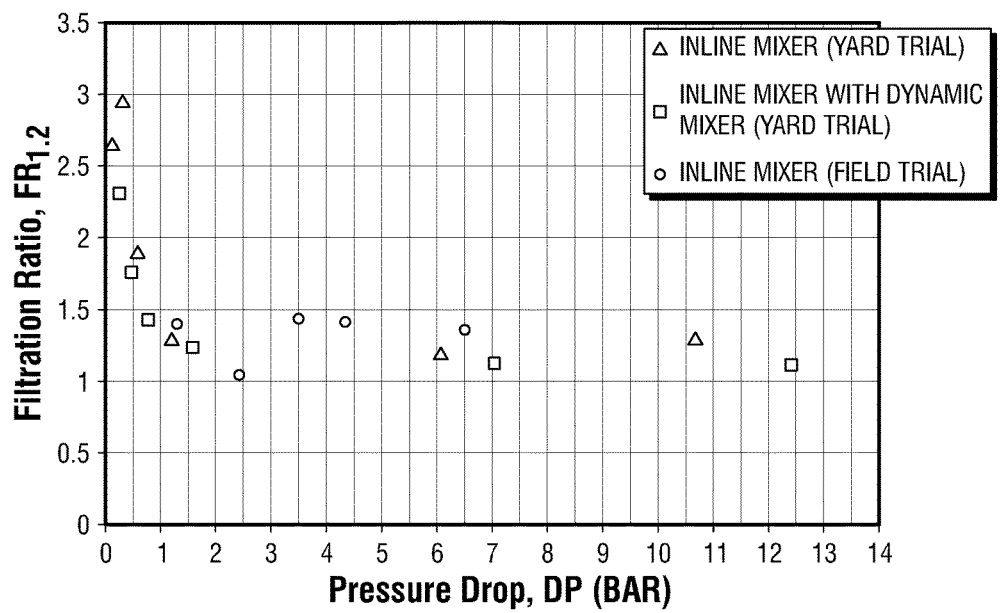
FIG. 25 is a plot showing the correlation between yard test and field scale FR as a function of DP.

FIG. 25 shows the relationship between DP and FR. Maintaining a DP of greater than 1 bar across the mixing configuration ensured that the <1.5 FR specification was met.

FIGS. 24 and 25 also demonstrate the impact of removing the dynamic mixer. At high flowrates, the impact is negligible but below ca. 12,500 bpd there was insufficient pressure drop to achieve the FR specification.

From the analysis above; it was concluded that, for the single stage mixing process: (1) an FR of <1.5 could be achieved at a maximum injection solution velocity of 3.8 m/s to avoid excessive shearing; and (2) solution injection velocity could be maintained at >1.0 m/s to ensure sufficient mixing and achieve an FR≤1.5.

The field design was based on 6" mixers; however, strategically located Removable Spool Pieces (RSPs) were incorporated as shown in FIG. 20 to allow mixers to be changed out to increase turndown capability. The use of RSPs also provided flexibility in the number of mixer elements and therefore the differential pressure achieved.

In addition to meeting key reservoir FR and viscosity specifications, the proposed single stage mixing configuration proved robust in preventing mixer blockages. In an offshore environment, operational excursions leading to over injection of polyacrylamide can occur. Previous excursions in the oil field have led to plugging of the inversion mixer. Although, this plugging can be cleared by increasing water flow through the inversion mixer, there is no alternative routing available to prevent injection of the resulting highly concentrated polymer slug. Furthermore, installation of alternate disposal facilities is impractical.

In the yard environment, water injection rates equivalent to 5000 bpd were mixed with hPAM-based liquid polymer to form a ca. 7000 ppm solution. Even though the resulting solution failed to meet FR and viscosity specifications, no mixer blockages were observed. By comparison, field and yard scale experience has demonstrated that mixing the same 7000 ppm solution using a two-stage mixer configuration would immediately result in mixer blockages. It is believe that by disposing of the two-stage mixing, the process fluid is restricted to a single flow path, thereby increasing available backpressure and reducing the frequency of blockages.

Analysis of Specific Mixing Energy:

The combination of target viscosity effects and filtration ratio improvement to evaluate mixing energy is possible via the application of Specific Mixing Energy (SME):

$$E/M = \frac{k\omega^2 t}{V} \left[\frac{kJ}{kg}\right]$$

where k is a constant (6.4×10$^{-12}$ kNm/kg*m$^3$/rpm), ω is the rotational speed (rpm), t is the mixing time of the polymer solution in the blender (min) and V is the volume of solution (m3). The constant and values were recalculated for the current study from the values provided in the literature (see SPE 25147-PA and SPE-15578, each of which is incorporated herein by reference in its entirety).

SME attempts to quantify the amount of energy consumed during the process of mixing a fluid. As such, SME can be used to find trends against key fluid performance parameters.

Analysis of the equation for SME demonstrates that equivalent mixing energy values can be achieved by increasing and decreasing simultaneously the upper terms in the equation. For instance, in the case of field equipment, the same value of mixing energy can be achieved using a high-power machine and a short residence time, or a low power machine and a long residence time.

For an in-line static mixer, the mixing energy per unit mass can be estimated from:

$$E/M = 6.894\Delta p/\rho \left[\frac{kJ}{kg}\right]$$

or $$E/M = \frac{Pt}{\rho V} \left[\frac{kJ}{kg}\right]$$

where (Δp) is the pressure loss (psi), ρ is density (kg/m³), P is power (kW), and t is residence time (sec).

Figure 26A:
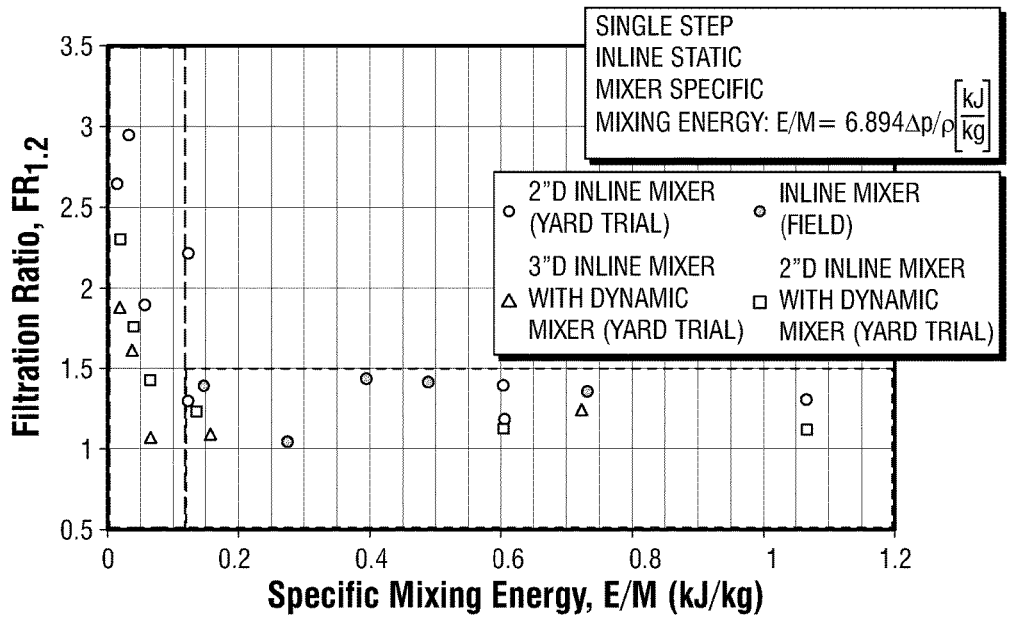
FIG. 26A is a plot of filtration ratio as a function of specific mixing energy for various single stage mixing configurations employing in-line static mixers in yard tests and field scale pilot tests.
Figure 26B:
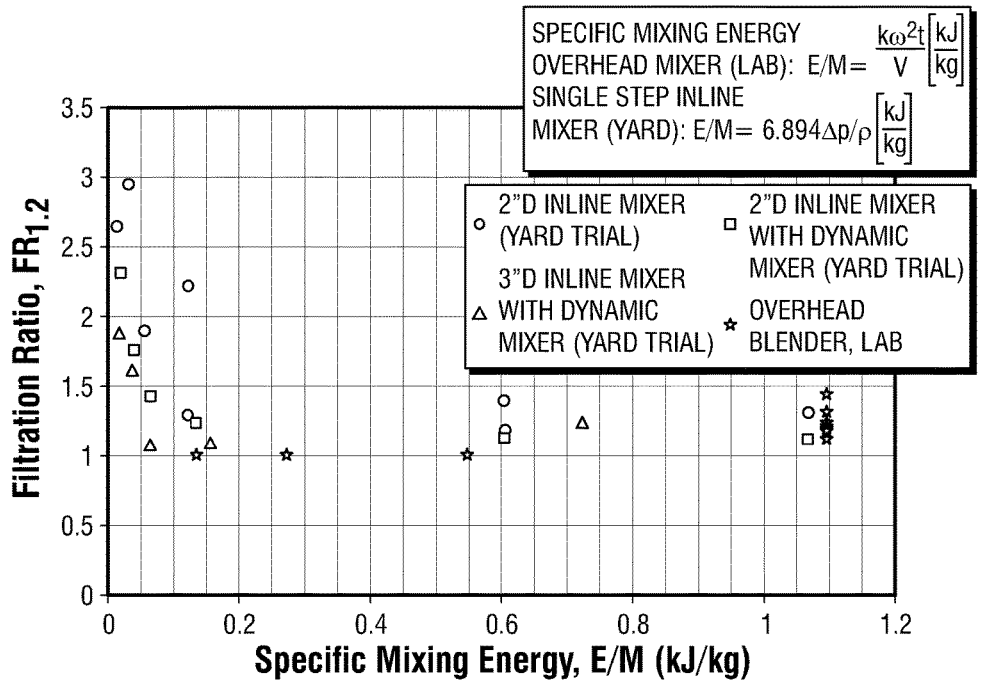
FIG. 26B is a plot of filtration ratio as a function of specific mixing energy for various single stage mixing configurations employing in-line static mixers in yard tests and lab scale overhead mixing tests.

FIG. 26A is a plot illustrating filtration ratio as a function of specific mixing energy for various configurations of static mixers including single stage mixing in yard test and field pilot test. Above 0.15 kJ/kg of specific mixing energy, a filtration ratio of less than 1.5 could be achieved. Below the low mixing energy (E/M<0.15 kJ/kg), FRs greater than 1.5 began to be observed. FIG. 26B is a plot illustrating the filtration ratio as a function of specific mixing energy for various configurations of static mixers in yard tests and Lab-scale overhead mixing tests. As mentioned above, the trends in FR observed in lab-scale mixing correlate will with the trends observed in yard-scale mixing. Note that the mixing time in the laboratory was approximately 15 minutes to 24 hours, while the mixing time in yard test was less than a few seconds in the static mixer.

Figure 27:
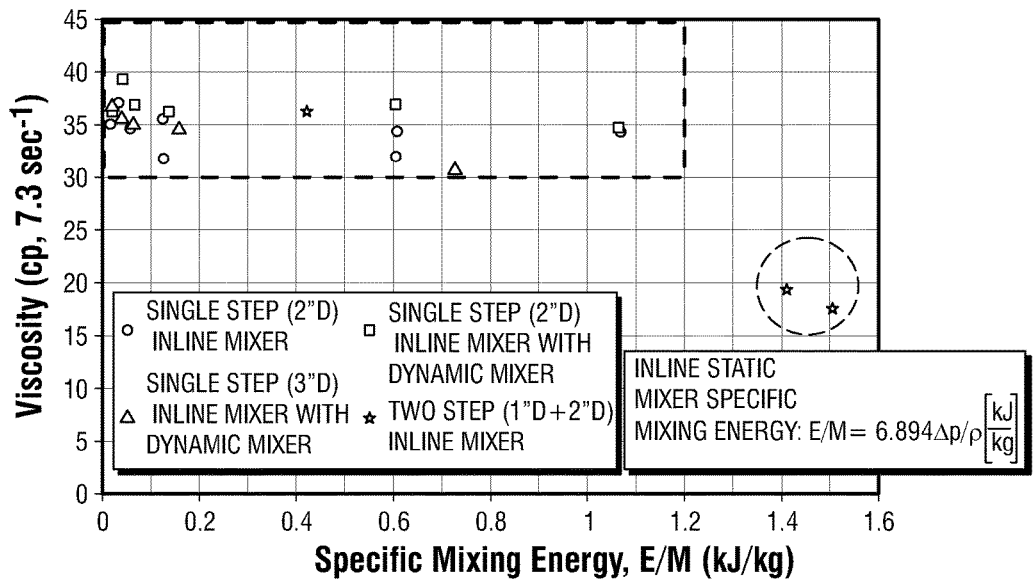
FIG. 27 is a plot of viscosity as a function of mixing energy for single stage and dual stage mixing configurations employing in-line static mixers.

FIG. 27 is a plot illustrating the viscosity as a function of specific mixing energy for single stage and dual stage mixing configurations employing in-line static mixers. As shown in FIG. 22 and FIG. 27, the expected viscosity yield could be achieved when the specific mixing energy was below 1.2 kJ/kg in the system. The viscosity dropped above 1.4 kJ/kg. These results suggest that specific mixing energies between 0.15 and 1.4 kJ/kg provide for both the specified viscosity with a good filterability (FR less than 1.5).

Calculated specific mixing energy values associated with all trials are included in Tables 6-9.

On-Site Injectivity Test in the Field Using a PMU:

Aqueous polymer solutions prepared using field-scale single stage mixing methods were qualified using a PMU.

Figure 28:
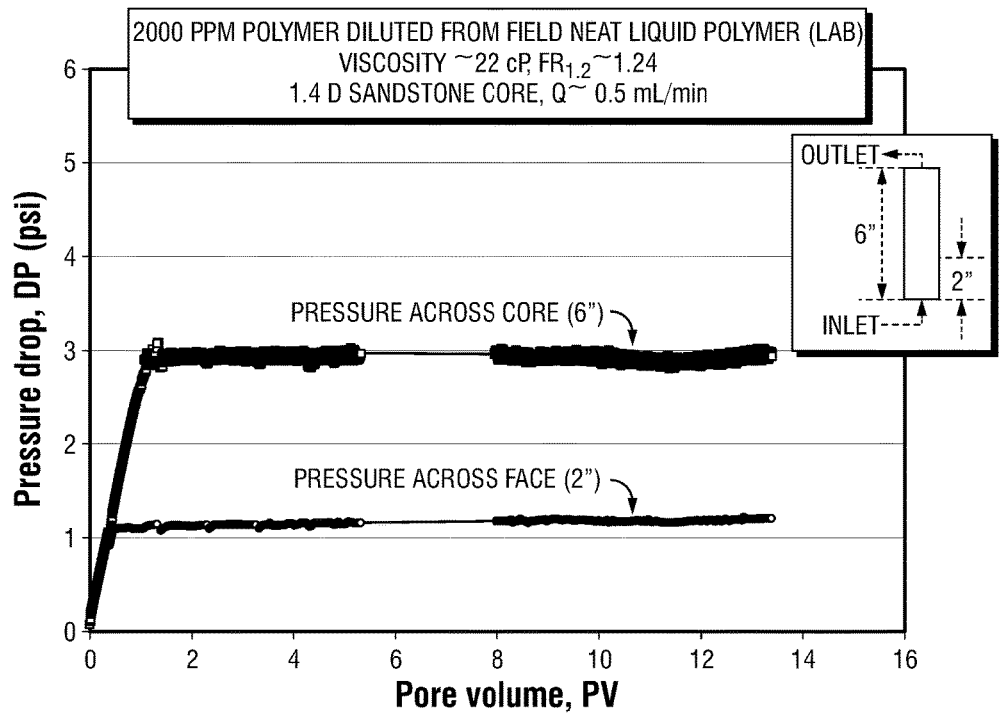
FIG. 28 is a plot of a field core flood (CF1) performed using the aqueous polymer solution in laboratory. Polymer was prepared in the lab using field neat liquid polymer. The polymer flood was run at 0.5 ml/min in the sandstone (1.4 D)

FIG. 28 shows the field core flood (CF1) using the field-prepared samples. Neat liquid polymer composition was collected in the tank and the inversion and dilution to 2000 ppm polymer solution was performed using the overhead mixer in the on-site laboratory. The viscosity and filtration ratio (FR) at 1.2 μm filter for the inverted aqueous polymer solution were found to be 22 cP and 1.24, respectively. The inverted aqueous polymer solution was injected at 0.5 mL/min into a 1.4 D sandstone core, and the pressure drop across the whole core (6") and injection face (2") were measured. The inverted aqueous polymer solution was prepared in the lab using neat liquid polymer. As shown in the FIG. 28, no significant plugging was observed during the coreflood up to 14 PV.

Figure 29:
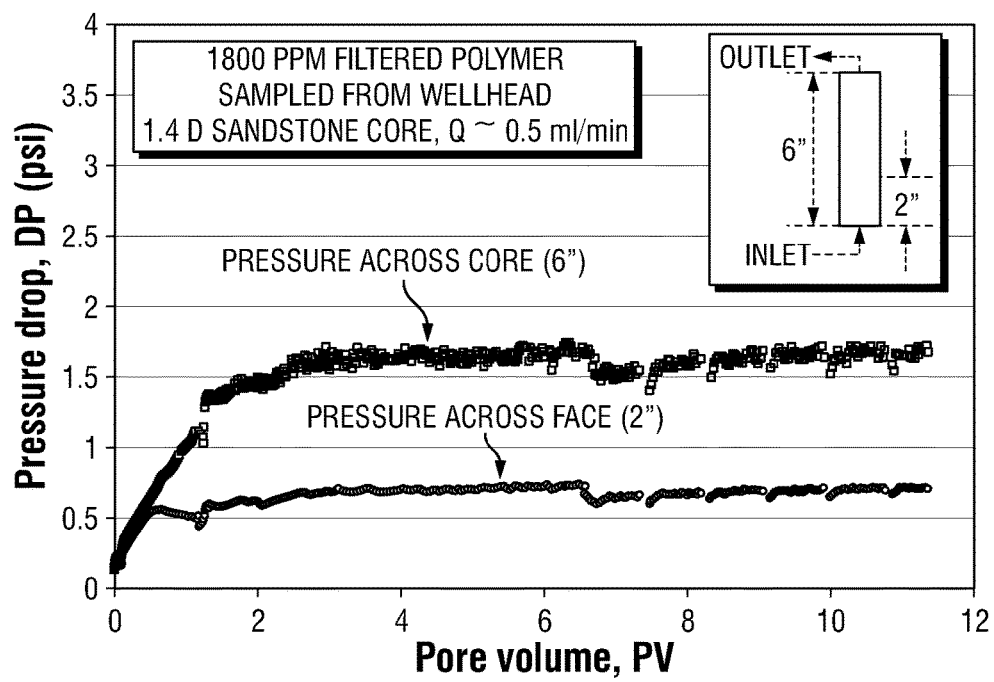
FIG. 29 is a plot of a field core flood (CF2) performed using aqueous polymer solution obtained from the wellhead. The LP composition was inverted using a single stage in-line mixer in the field, and a sample of the aqueous polymer solution was obtained from the wellhead. The polymer flood was run at 0.5 ml/min in the sandstone (1.4 D).
Figure 30:
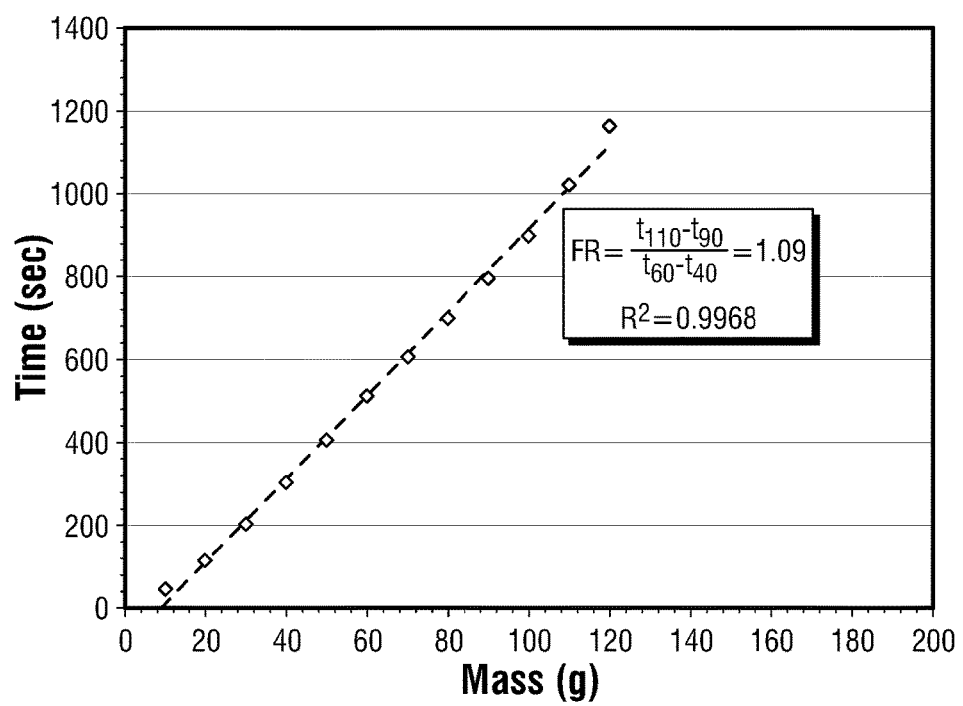
FIG. 30 shows the results of a filtration ratio test performed using samples of 1800 ppm aqueous polymer solution obtained from the wellhead. The filtration ratio test was performed using a 1.2 micron filter at 1 bar.

FIG. 29 shows another example of field core flood (CF2) performed using a wellhead sample mixed in the field using the single stage mixing process described above. The neat liquid polymer was inverted and diluted through the field inline mixer. The 1800 ppm inverted aqueous polymer solution sample was obtained from the wellhead. The polymer flood was run at 0.5 ml/min in the sandstone core (1.4 D). As shown in FIG. 29, no significant plugging was observed up to 11 PV, even though it took a little more to stabilize the pressure drop relative to trials performed using a lab-mixed aqueous polymer solution (see FIG. 28). FIG. 30 shows the filtration ratio test result at 1.2 micron under 1 bar for the wellhead-collected sample used for the CF2 flood. The sample exhibited very good filterability (FR of 1.09).

Figure 31:
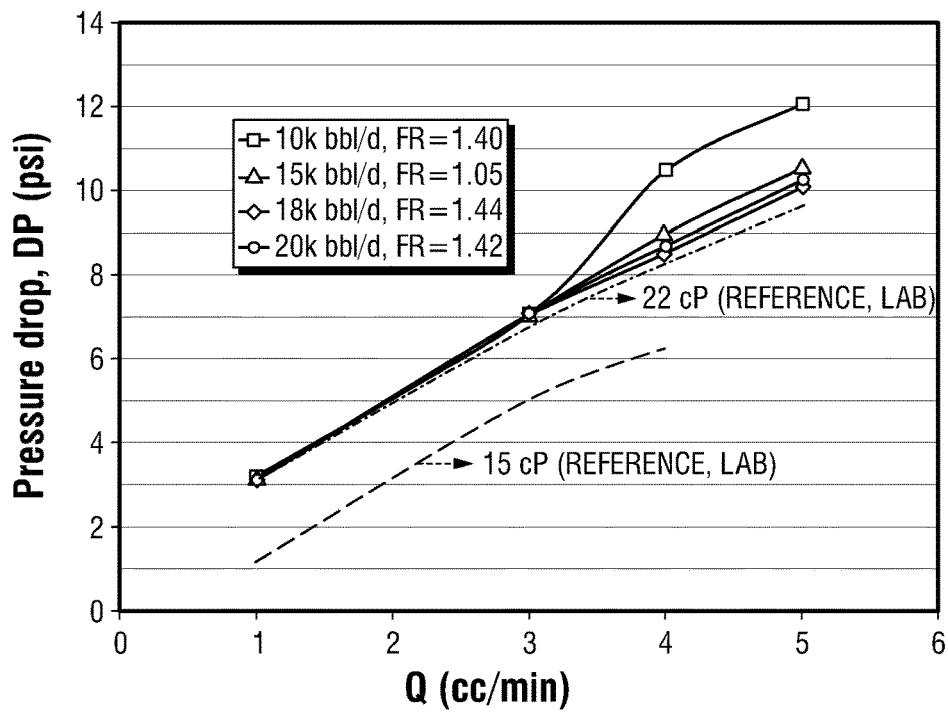
FIG. 31 is a plot of capillary viscosity measurements from an offshore field application showing the effect of changes in flow rate on coil viscometer measurements sampled from the wellhead. To estimate the viscosity of samples, pressure drop was measured through coil tubing on the core flood apparatus and data.

FIG. 31 shows the pressure drop along different flow rate to estimate the viscosity using a capillary viscometer in a portable polymer flood box. As shown in the box, the field samples from wellhead exhibited comparable viscosities above the specified viscosity of 22 cP, which was measured in the laboratory as a reference. Filtration ratios of less than 1.5 were also observed a various different injection rates. These results indicate the achievement of good filterability and viscosity yield using a single stage mixing process in the field.

Darcy Friction Factor in the Static Mixer.

Liquid polymer can also be used as a friction reducer in pipe flow. The Darcy-Weisbach relation was used to estimate the friction reduction characteristic property of liquid polymer during the mixing in a static mixer. The Darcy-Weisbach equation is a phenomenological equation, which relates the head loss, or pressure loss, due to friction along a given length of pipe to the average velocity of the fluid flow for an incompressible fluid. The Darcy-Weisbach equation contains a dimensionless friction factor, known as the Darcy friction factor $$\frac{\Delta p}{L} = f_D \cdot \frac{\rho}{2} \cdot \frac{\langle v \rangle^2}{D}$$

where Δp, L and D is pressure drop (Pa), length (m) and Diameter (m) of a static mixer, $f_D$ is Darcy-Weisbach friction factor, <v> and ρ is mean flow velocity (m/s) and density (kg/m³) of fluid.

Figure 32:
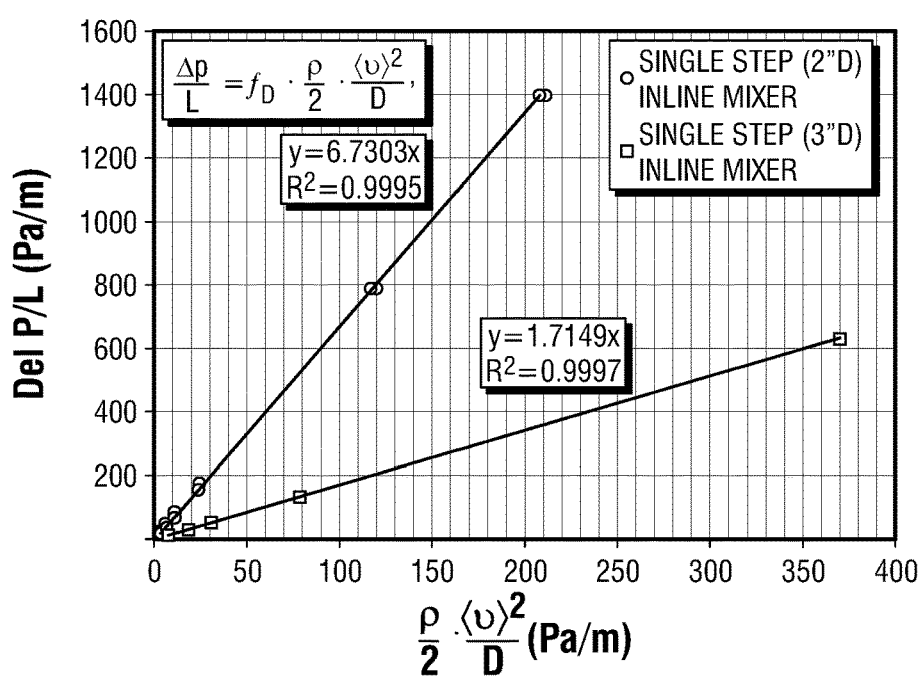
FIG. 32 is a plot showing the Darcy-Weisbach relation in a single stage inline mixer. The plot shows the correlation between pressure drop and flow rate, and the slope indicates the Darcy friction factor in the given system.
Figure 33:
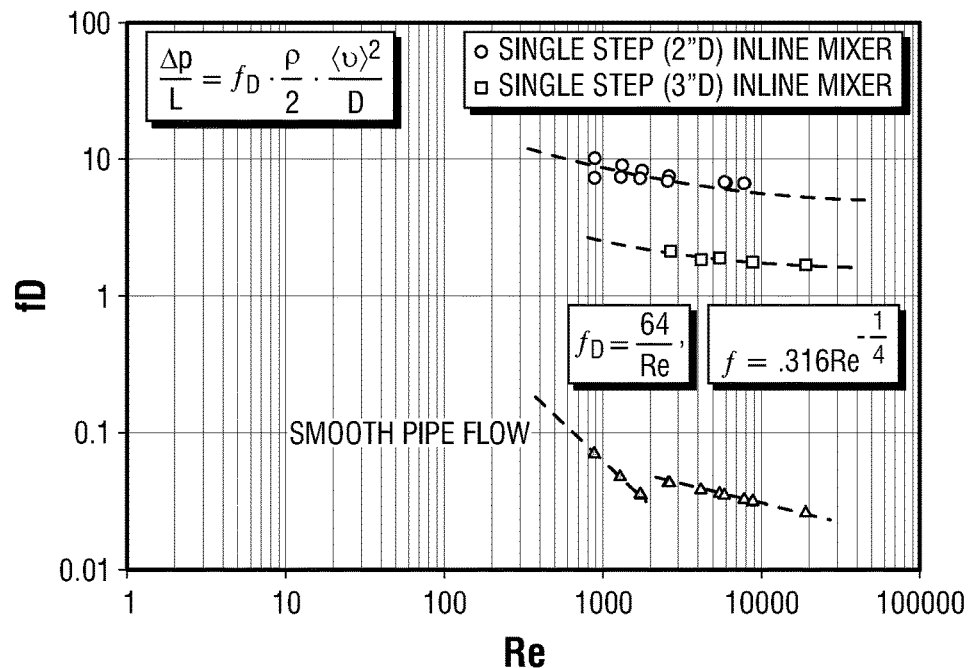
FIG. 33 is a plot of the Darcy friction factor vs. Reynolds number for 2"D and 3"D single step inline mixers. The Darcy friction factor in smooth pipe flow is marked as baseline.

FIG. 32 shows the correlation between pressure drop and flow rate across the static mixer with a diameter of 2" and 3" respectively. As shown in FIG. 32, pressure drop and flow rate shows a linear relationship and the slope is corresponding the Darcy-Weisbach friction factor. From these results, the pressure drop at different flow rates during mixing and hydration in the inline mixer can be estimated in field application. FIG. 33 shows Darcy-friction factor vs. Reynolds number. The Darcy-friction factor in smooth pipe flow is illustrated as a baseline. As shown in FIG. 33, the Darcy-friction factor in a turbulent flow is usually calculated in the order of 0.01~0.1 in a smooth pipe line and in the order of 0.1~1 in a rough pipe line (not shown in the plot). However, the Darcy-Weisbach friction factor in single step inline mixer is calculated in the order of 1~10 in the same range of Reynolds number due to the presence of mixing elements in the inline mixer.

Specific Mixing Energy for Powder HPAM Polymer.

The mixing of various powder polymer to apply the specific mixing energy concept. Various powder HPAM polymers from different vendors were mixed using a laboratory overhead mixer set at different mixing time and rpm. The measured performance of each polymer such as filtration ratio and viscosity have been correlated with the specific mixing energy. The results are shown in FIGS. 34A-36B.

Figure 34A:
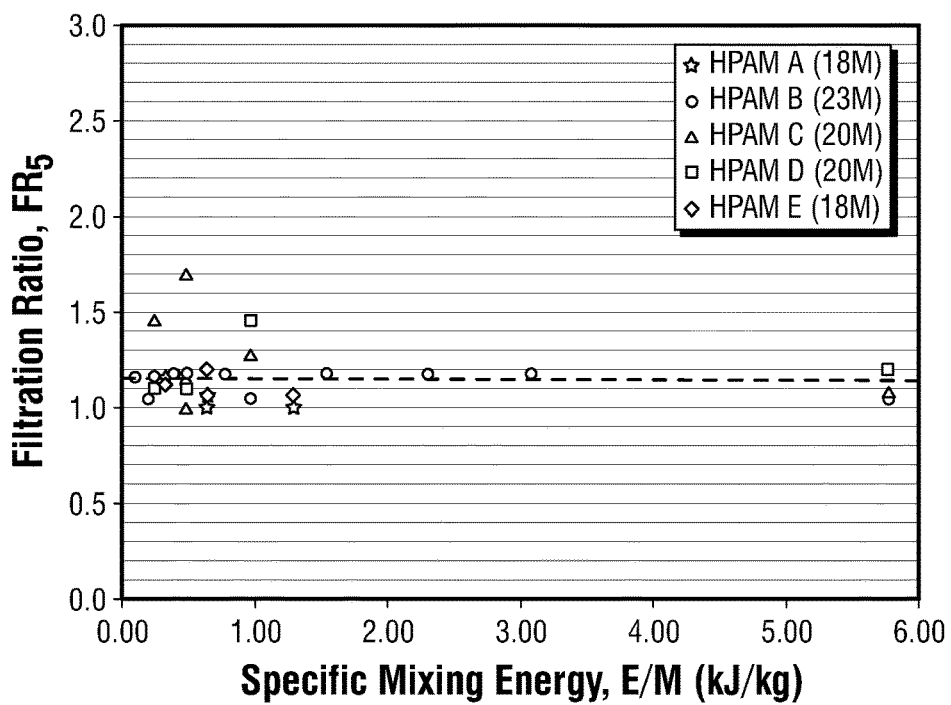
FIG. 34A is a plot of the specific mixing energy (SME) vs filtration ratio with powder HPAM polymer solution using a 5 micron filter.
Figure 34B:
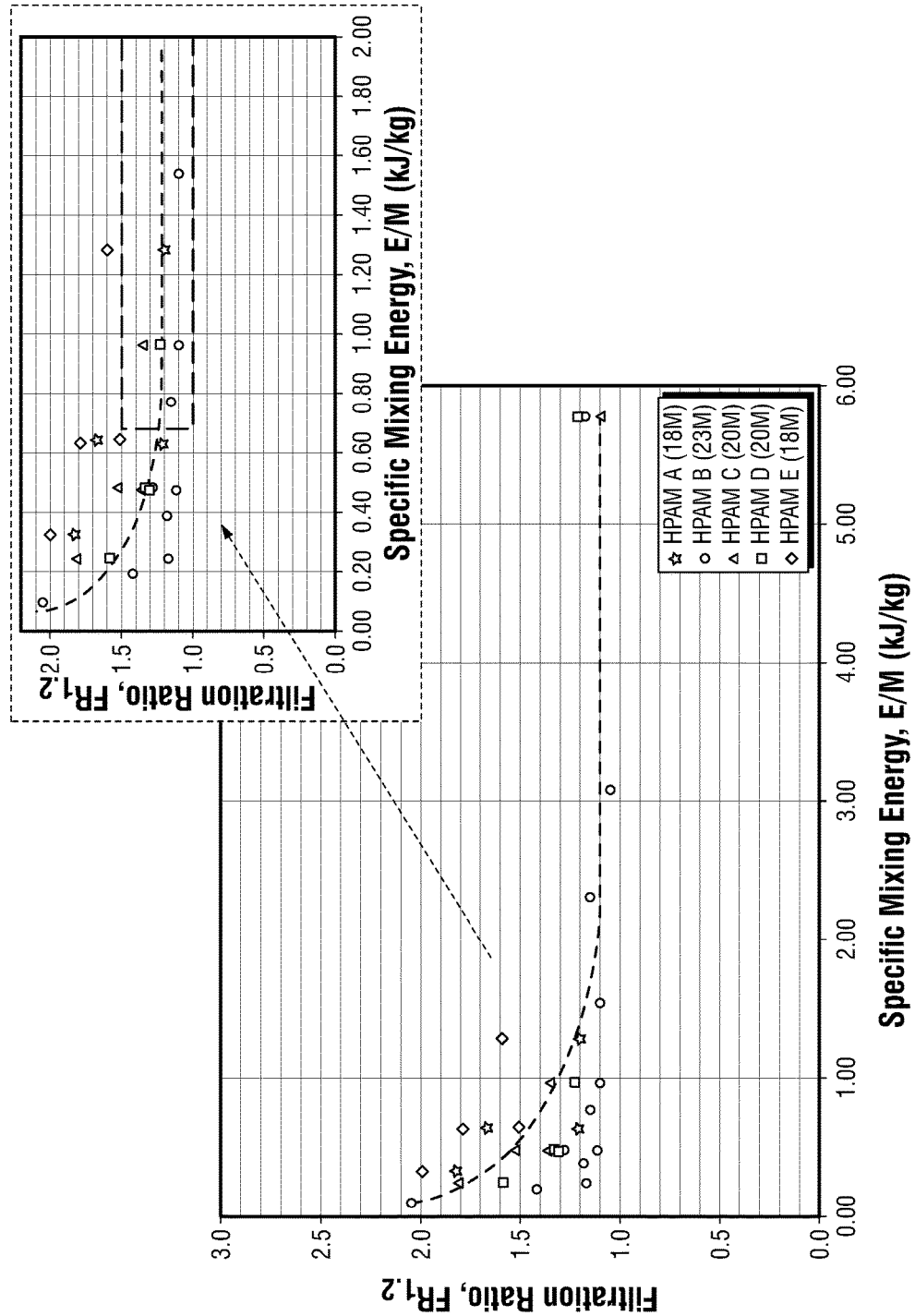
FIG. 34B is a plot of the specific mixing energy (SME) vs. filtration ratio with powder HPAM polymer solution using a 1.2 micron filter.

FIGS. 34A and 34B show the results of filtration ratio along the calculated specific mixing energy with 5 micron and 1.2 micron filter, respectively. As shown in FIGS. 34A and 34B, most of the polymers easily passed 5 micron filter even at low specific mixing energy while a few of polymers passed 1.2 micron filter at low specific mixing energy. Since powder polymers doesn't have any additives such as inversion surfactant which helps polymer hydration and mixing faster in liquid polymer, it requires somewhat higher mixing energy than those in liquid polymer.

Figure 35:
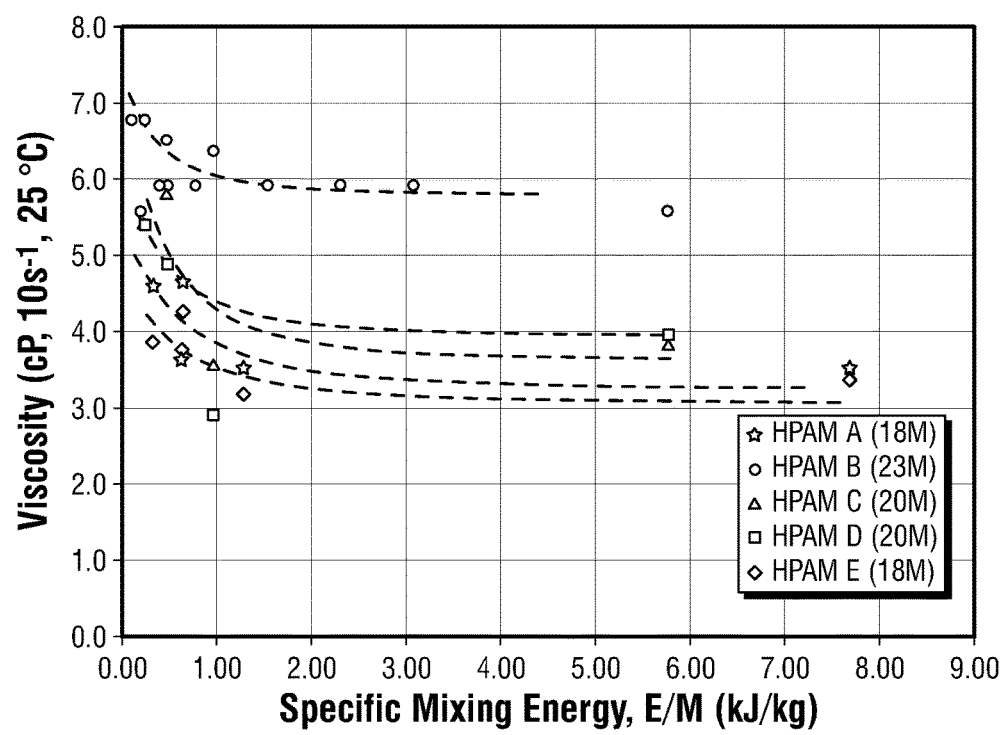
FIG. 35 is a plot of the specific mixing energy (SME) vs. viscosity with powder HPAM polymer solution: 1000 ppm polymer in synthetic seawater

FIG. 35 shows the viscosity along the specific mixing energy for powder HPAM polymers. Similar with liquid polymer, powder polymer also shows tendency of decreasing of its viscosity as specific mixing energy increases, that indicates the limit of specific mixing energy to minimize the mechanical degradation of polymer during the mixing/hydration process.

Figure 36A:
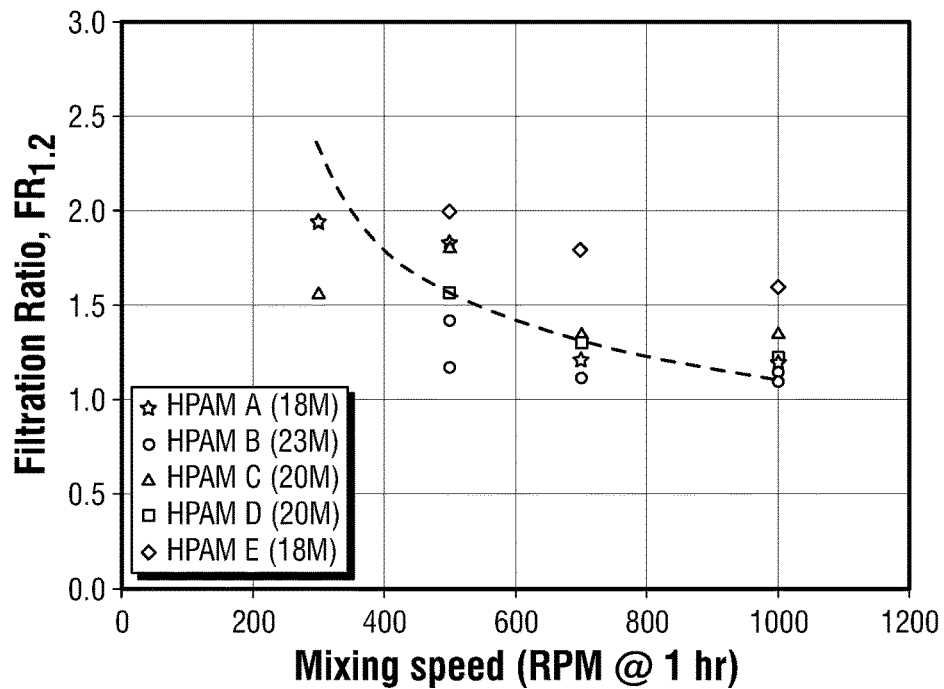
FIG. 36A is a sensitivity test performed using a powder polymer solution. Filtration ratio is plotted as a function of mixing speed.
Figure 36B:
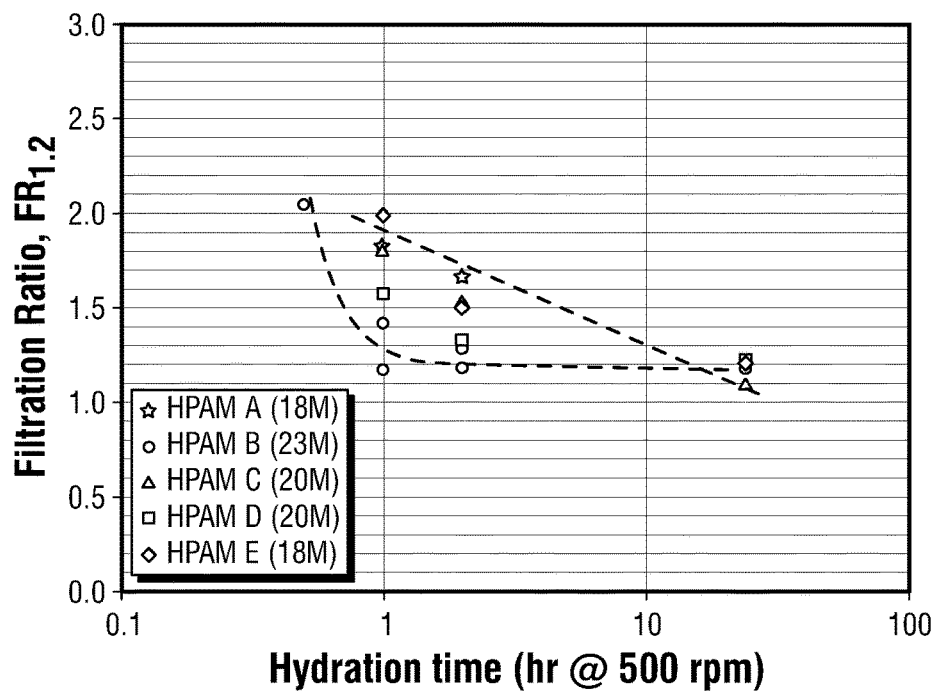
FIG. 36B is a sensitivity test performed using a powder polymer solution. Filtration ratio is plotted as a function of mixing hydration time.

FIGS. 36A and 36B show the sensitivity tests for each component to calculate the specific mixing energy such as mixing speed and mixing time, respectively. As shown above, better filtration ratio can be achieved by increasing mixing speed and hydration time proportional to the specific mixing energy. However, there is an operation limit of the specific mixing energy as discussed above, that imply the operation windows for hydration of powder polymers.

Rod-Climbing (Weissenberg Effect) During Hydration of Polymer.

Rod-climbing, so-called Weissenberg effect, is a well-known phenomenon that shows the viscoelastic property of non-Newtonian polymer solution. This phenomenon occurs due to the normal stress difference in polymer solution as described in equation below while vortex is observed in mixing of water $$\frac{d(p - \tau_{33})}{d \ln r} = -2\tau_{12} \frac{d(\tau_{22} - \tau_{33})}{d\tau_{12}} - (\tau_{11} - \tau_{22}) + \rho v_1^2$$

if >0; Newtonian fluids to generate vortex, if <0; non-Newtonian fluids (polymer solution) to generate rod-climbing where p is pressure, r is radius, $\tau_{11}$, $\tau_{22}$ and $\tau_{33}$ are normal stress tensors, $\tau_{12}$ is shear stress tensor $v_1$ is velocity of rotation.

Rod-climbing is an extension of the viscoelastic properties of a polymer solution, and depends on polymer molecular weight, concentration, brine salinity, brine hardness, and temperature. Rod-climbing behavior can be used as a visual indicator of quick or fast hydration of liquid polymer or powder polymer. To observe the rod-climbing and hydration clearly irrespective of the molecular weight of polymer molecules during the mixing, a 1% polymer solution was prepared in a synthetic brine (see Table 1). The rod-climbing along with hydration of polymer was observed as (1) a decrease in the surface level of vortex, and (2) increase of rod-climbing of the polymer solution. In the case of liquid polymers and powder polymers that show relatively quick hydration, the decrease in the surface level of the vortex and the onset of rod-climbing occur simultaneously. Other polymers show gradual decrease in surface level followed by a subsequent onset of rod-climbing. The observation of rod-climbing and resulting characteristic performance are summarized in Table 10 for a variety of polymers.

TABLE 10

Onset of rod-climbing of liquid polymer and powder polymers.

| | ON-SET OF ROD-CLIMBING (MIN) | HEIGHT OF ROD-CLIMBING (CM, MAX) | COMMENT |
|---|---|---|---|
| LP #1 | 0.25 | 5 | New LP, 50% active, Simultaneous rod-climbing after surface level-down |
| LP #2 | 3 | 2 | Conventional, 30% active, Delay of rod-climbing after surface level-down |

TABLE 10-continued

Onset of rod-climbing of liquid polymer and powder polymers.

| | ON-SET OF ROD-CLIMBING (MIN) | HEIGHT OF ROD-CLIMBING (CM, MAX) | COMMENT |
|---|---|---|---|
| HPAM#1 | 1.5 | 3.5 | Fast hydration ATBS-PAM terpolymer (20M), powder |
| HPAM#2 | 3.5 | 3.5 | Fast hydration HPAM (20M), powder |
| HPAM#3 | 18 | 1.5 | Delay of rod-climbing after surface level-down, powder |

Polymer Mixing Systems for Use in Subsea Mixing:

Currently, there are relatively few cases worldwide where subsea polymer injection has been employed in an Enhanced Oil Recovery (EOR) application. When conducted previously, polymer flooding solutions were mixed on the host facility and transported to the subsea wells via individual flowlines.

To provide polymer injection for EOR purposes, the polymer solution must be mixed on an offshore facility and transported on an individual basis to each of the injection wells. This increases the deck space, process and operations requirements for the host facility regardless of whether it is a new build or existing facility. Further, polymer solution injection systems are reliant on individual lines from the mixers to the injection wells. This is because traditional flow control valves are known to degrade the polymer solution properties. As a consequence, manifold-type arrangements can be incompatible with polymer solutions. This can significantly increase the specified infrastructure required to support each subsea injector.

There are no known designs which relocate the polymer mixing process from the host facility to subsea. To address this shortcoming, polymer mixing systems were developed that could be used to relocate the polymer mixing process from the host platform to a subsea area in an effort to reduce the size of the host platform and the number of flowlines in field.

The polymer mixing systems allow the relocation of the mixing equipment from the platform to the seabed at the subsea drill center(s). This allows polymer mixing to be conducted at a subsea area, not on a host facility.

Figure 37:
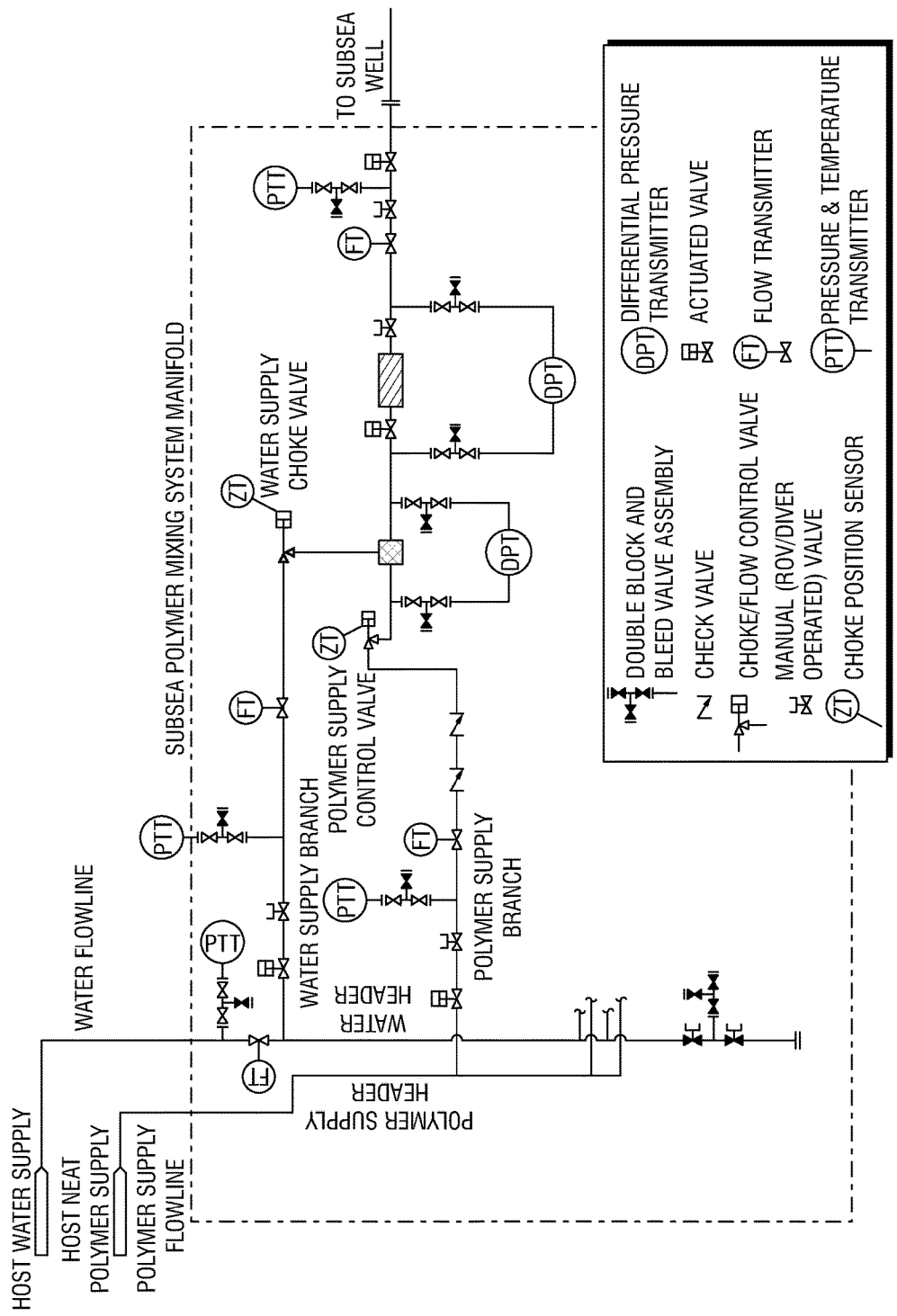
FIG. 37 is a schematic illustration of an example subsea polymer mixing system.
Figure 38:
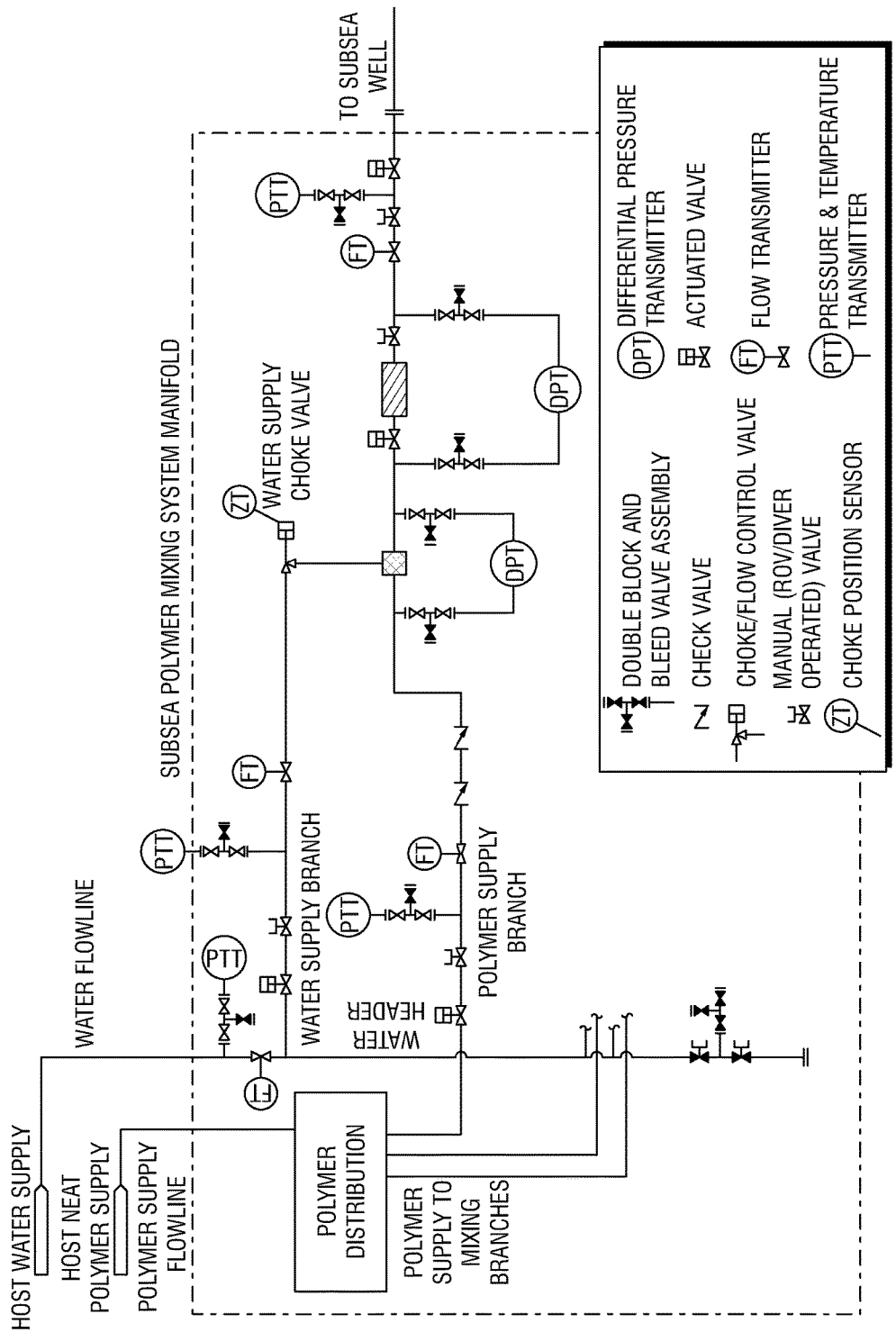
FIG. 38 is a schematic illustration of an example subsea polymer mixing system.

The polymer mixing systems employ field proven equipment to control and monitor the mixing process. Example polymer mixing systems are schematically illustrated in FIGS. 37 and 38. Each polymer mixing system receives two supplies. One supply is the neat polymer and the second is a separate water supply. These two products are combined in each manifold branch mixer arrangement in order to create the correct concentration of polymer solution for injection into each well. The system contains all mixing equipment, instrumentation, valves and other associated equipment to satisfactorily control and monitor the mixing process and to provide the polymer solution for injection at each of the subsea wells.

The overall process design is similar for the polymer mixing systems illustrated in FIGS. 37 and 38. However, one polymer mixing system (FIG. 37) utilizes two forms of flow control, one for water and the other for neat polymer. This mixing system can be used when polymer is supplied through a single conduit and manifolded to provide supply to multiple branches; similar to that of the water supply. The second polymer mixing system (FIG. 38) only controls the water throughput across the system. This system can be used in cases where multiple individual conduits supply polymer directly to each manifold branch. An appropriate polymer mixing system for a particular application can be selected based on properties of the polymer being mixed.

The polymer mixing systems receive water from the host facility via the water flowline that is connected to the header pipe where it manifolds out to the mixing system.

The branch pipework provides water through the piping up to the water control choke valve. As this valve position varies, the amount of water flowing through the branch is adjusted and thus controls the flow through the 1st stage mixer. The polymer is introduced to the water flow at the first stage mixer. The neat polymer to each branch is either provided via an individual conduit such as an umbilical core or flowline bundle (multiple feed) or is supplied via a neat polymer header and manifolded (individual feed). In the individual feed design, there is a second flow controlling valve on each branch which adjusts the neat polymer flow into the process. This valve can be either a low shearing choke valve, Chemical Injection Metering Valve (CIMV) or control valve depending on the neat polymer properties. The water and neat polymer are introduced at the first stage mixer, this is the initial point at which the solution formulates. The flow is then passed through the 2nd stage mixer where the mixing process is completed and the solution is ready for injection.

By relocating the polymer mixing from the host to a subsea location, a significant reduction in equipment sited on the host as well as a significant reduction in supporting subsea infrastructure can be achieved.

For example, by employing a polymer mixing system, the subsea flowline infrastructure associated with hydrocarbon recover can be reduced by around 50 to 60%. This will improve overall project expenditure, scheduling and exposure during installation and operation. The relocation of the mixing equipment from the host platform to the subsea area(s) will also allow a number of risers to be removed from the platform design and all associated mixing equipment. These systems may also obviate the need for new platforms in some settings.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2). In some embodiments, the composition described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the composition described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method for preparing an aqueous polymer solution, the method comprising:
   (i) providing a liquid polymer (LP) composition comprising one or more synthetic (co)polymers; and
   (ii) combining the LP composition with an aqueous fluid in a single stage mixing process to provide the aqueous polymer solution,
   wherein the single stage mixing process comprises applying a specific mixing energy of at least 0.10 kJ/kg to the LP composition and the aqueous fluid;
   wherein the aqueous polymer solution comprises a concentration of synthetic (co)polymer of from 50 to 15,000 ppm; and
   wherein the aqueous polymer solution has a filter ratio of 1.5 or less at 15 psi using a 1.2 µm filter.

2. The method of claim 1, wherein the LP composition comprises:
   one or more hydrophobic liquids having a boiling point of at least 100° C.;
   at least 39% by weight of the one or more synthetic (co)polymers;
   one or more emulsifier surfactants; and
   one or more inverting surfactants.

3. The method of claim 1, wherein the LP composition is in the form of an inverse emulsion comprising:
   one or more hydrophobic liquids having a boiling point of at least 100° C.;
   up to 38% by weight of one or more synthetic (co) polymers;
   one or more emulsifier surfactants; and
   one or more inverting surfactants.

4. The method of claim 1, wherein the LP composition comprises a substantially anhydrous polymer suspension, the substantially anhydrous polymer suspension comprising a powder polymer having an average molecular weight of from 0.5 to 30 million Daltons suspended in a carrier having an HLB of greater than or equal to 8,
   wherein the carrier comprises one or more surfactants, and
   wherein the powder polymer and the carrier are present in the substantially anhydrous polymer suspension at a weight ratio of from 20:80 to 80:20.

5. The method of claim 1, wherein the aqueous polymer solution has a filter ratio of from 1.1 to 1.3 at 15 psi using the 1.2 µm filter.

6. The method of claim 1, wherein step (ii) comprises a continuous process.

7. The method of claim 1, wherein the single stage mixing process comprises a single mixing step, wherein the single mixing step comprises passing the LP composition and the aqueous fluid through an in-line mixer having a mixer inlet and a mixer outlet to provide the aqueous polymer solution.

8. The method of claim 1, wherein the single stage mixing process comprises multiple mixing steps, wherein the single stage mixing process comprises
   as a first mixing step, passing the LP polymer composition and the aqueous fluid through a first in-line mixer having a first mixer inlet and a first mixer outlet to provide a partially mixed aqueous polymer solution; and
   as a second step, passing the partially mixed aqueous polymer solution through a second in-line mixer having a second mixer inlet and a second mixer outlet to provide the aqueous polymer solution.

9. The method of claim 1, wherein the single stage mixing process comprises parallel single mixing steps.

10. The method of claim 9, wherein the parallel single mixing steps comprise combining the LP composition with the aqueous fluid in a polymer mixing system, wherein the polymer mixing system comprises:
    (i) a main polymer feed line diverging to a plurality of polymer supply branches,
    (ii) a main aqueous feed line diverging to a plurality of aqueous supply branches,
    (iii) a plurality of mixer arrangements, each of which comprises an in-line mixer having a mixer inlet and a mixer outlet;
       wherein each of the plurality of mixer arrangements is supplied by one of the plurality of polymer supply branches and one of the plurality of aqueous supply branches; and
    wherein combining the LP composition with an aqueous fluid in a polymer mixing system comprises
    (a) passing the LP polymer composition through the main polymer feed line and the plurality of polymer supply branches to reach each of the plurality of mixer arrangements;
    (b) passing the aqueous fluid through the main aqueous feed line and the plurality of aqueous supply branches to reach each of the plurality of mixer arrangements;
    wherein the LP polymer composition and the aqueous fluid flow through the in-line mixer of each of the plurality of mixer arrangements to provide the aqueous polymer solution.

11. The method of claim 10, wherein the main polymer feed line is fluidly connected to the plurality of polymer supply branches via a polymer distribution manifold, wherein the polymer distribution manifold independently controls the fluid flow rate through each of the plurality of polymer supply branches.

12. The method of claim 10, wherein the mixing system is positioned subsea.

13. The method of claim 1, wherein the single stage mixing process comprises parallel multiple mixing steps.

14. The method of claim 13, wherein the parallel multiple mixing steps comprise combining the LP composition with the aqueous fluid in a polymer mixing system, wherein the polymer mixing system comprises:
    (i) a main polymer feed line diverging to a plurality of polymer supply branches,
    (ii) a main aqueous feed line diverging to a plurality of aqueous supply branches,
    (iii) a plurality of mixer arrangements, each of which comprises a first in-line mixer having a first mixer inlet and a first mixer outlet in series with a second in-line mixer having a second mixer inlet and a second mixer outlet;
       wherein each of the plurality of mixer arrangements is supplied by one of the plurality of polymer supply branches and one of the plurality of aqueous supply branches; and
    wherein combining the LP composition with an aqueous fluid in a polymer mixing system comprises
    (a) passing the LP composition through the main polymer feed line and the plurality of polymer supply branches to reach each of the plurality of mixer arrangements;
    (b) passing the aqueous fluid through the main aqueous feed line and the plurality of aqueous supply branches to reach each of the plurality of mixer arrangements;
    wherein the LP composition and the aqueous fluid flow through the first in-line mixer of each of the plurality of mixer arrangements to provide a partially mixed aqueous polymer solution, and then the partially mixed aqueous polymer solution flows through the second in-line mixer of each of the plurality of mixer arrangements to provide the aqueous polymer solution.

15. The method of claim 14, wherein the main polymer feed line is fluidly connected to the plurality of polymer supply branches via a polymer distribution manifold, wherein the polymer distribution manifold independently controls the fluid flow rate through each of the plurality of polymer supply branches.

16. The method of claim 14, wherein the mixing system is positioned subsea.

17. The method of claim 1, wherein the single stage mixing process comprises applying a specific mixing energy of from 0.10 kJ/kg to 1.50 kJ/kg to the LP composition and the aqueous fluid.

18. The method of claim 1, wherein the aqueous fluid further comprises a surfactant, an alkalinity agent, a co-solvent, a chelating agent, or any combination thereof.

19. The method of claim 1, wherein the one or more synthetic (co)polymers comprise one or more acrylamide (co)polymers.

20. A method for hydrocarbon recovery, comprising:
(a) providing a subsurface reservoir containing hydrocarbons there within;
(b) providing a wellbore in fluid communication with the subsurface reservoir;
(c) preparing an aqueous polymer solution according to the method of claim 1; and
(d) injecting the aqueous polymer solution through the wellbore into the subsurface reservoir.

21. A method for preparing an aqueous polymer solution, the method comprising combining a solid powder polymer with an aqueous fluid in a mixing process to provide the aqueous polymer solution,
wherein the mixing process comprises applying a specific mixing energy of at least 1.0 kJ/kg to the solid powder polymer and the aqueous fluid;
wherein the aqueous polymer solution comprises a concentration of polymer of from 50 to 15,000 ppm; and
wherein the aqueous polymer solution has a filter ratio of 1.5 or less at 15 psi using a 1.2 µm filter.

* * * * *